United States Patent
Ishii

(10) Patent No.: US 10,721,682 B2
(45) Date of Patent: Jul. 21, 2020

(54) ACCESS CONTROL METHODS AND APPARATUS FOR RADIO SYSTEMS

(71) Applicant: Sharp Kabushiki Kaisha, Sakai, Osaka (JP)

(72) Inventor: Atsushi Ishii, Vancouver, WA (US)

(73) Assignees: Sharp Kabushiki Kaisha, Sakai, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/281,231

(22) Filed: Feb. 21, 2019

(65) Prior Publication Data

US 2019/0261261 A1    Aug. 22, 2019

Related U.S. Application Data

(60) Provisional application No. 62/634,096, filed on Feb. 22, 2018.

(51) Int. Cl.
  *H04W 48/18* (2009.01)
  *H04W 48/06* (2009.01)
  (Continued)

(52) U.S. Cl.
  CPC .......... *H04W 48/18* (2013.01); *H04W 48/06* (2013.01); *H04W 48/16* (2013.01);
  (Continued)

(58) Field of Classification Search
  CPC ..... H04W 48/16; H04W 48/18; H04W 88/06; H04W 24/02; H04W 48/06; H04W 28/08;
  (Continued)

(56) References Cited

U.S. PATENT DOCUMENTS

2010/0260139 A1  10/2010  Backstrom et al.
2016/0073450 A1   3/2016  Vikberg et al.
(Continued)

FOREIGN PATENT DOCUMENTS

WO   WO-2019075717 A1 *  4/2019  ............ H04W 48/10

OTHER PUBLICATIONS

R2-1800458, 3GPP TSG-RAN WG2 NR Ad hoc 1801, ZTE, Sanechips, "Consideration on access control in NR", Vancouver, Canada, Jan. 22-26, 2018.
(Continued)

*Primary Examiner* — Magdi Elhag
(74) *Attorney, Agent, or Firm* — Nixon & Vanderhye P.C.

(57) ABSTRACT

A wireless terminal initiates an inter-system change procedure to switch from a first core network to second when an access attempt to the first core network is barred. The processor circuitry configured to: register to a first core network; receive first access control information and second access control information from radio access node; upon an access attempt, determine if the access attempt is allowed for the first core network based on the first access control information; when the access attempt is barred for the first core network, determine if the access attempt is permitted by a second core network allows based on the second access control information; and, when the access attempt is allowed for the second core network, initiate an inter-system change procedure to designate the second core network as a registered network.

12 Claims, 25 Drawing Sheets

(51) Int. Cl.
| | |
|---|---|
| *H04W 48/16* | (2009.01) |
| *H04W 76/18* | (2018.01) |
| *H04W 60/00* | (2009.01) |
| *H04W 76/27* | (2018.01) |
| *H04W 28/02* | (2009.01) |
| *H04W 48/12* | (2009.01) |

(52) U.S. Cl.
CPC ......... *H04W 60/005* (2013.01); *H04W 76/18* (2018.02); *H04W 28/0289* (2013.01); *H04W 48/12* (2013.01); *H04W 76/27* (2018.02)

(58) Field of Classification Search
CPC ..... H04W 48/08; H04W 48/02; H04W 48/10; H04W 76/18; H04W 60/005; H04W 36/0022; H04L 12/5692
See application file for complete search history.

(56) References Cited

U.S. PATENT DOCUMENTS

| | | | |
|---|---|---|---|
| 2016/0249278 A1 | 8/2016 | Qi et al. | |
| 2016/0255674 A1* | 9/2016 | Niemi | H04W 76/18 455/435.1 |
| 2018/0020417 A1* | 1/2018 | Catovic | H04W 76/18 |
| 2019/0037436 A1* | 1/2019 | Wang | H04W 88/08 |
| 2019/0150061 A1* | 5/2019 | Ishii | H04W 48/06 370/329 |
| 2019/0223081 A1* | 7/2019 | Cheng | H04W 48/06 |
| 2019/0261264 A1* | 8/2019 | Lou | H04W 48/16 |
| 2020/0008134 A1* | 1/2020 | Wallentin | H04L 63/10 |

OTHER PUBLICATIONS

R2-1800460, 3GPP TSG-RAN WG2 NR Ad hoc 1801, ZTE, Sanechips, "Access category selection information provided by AS", Vancouver, Canada, Jan. 22-26, 2018.
R2-1800461, 3GPP TSG-RAN WG2 NR Ad hoc 1801, ZTE, "Draft Reply LS on requirements on unified access control for 5GS", Vancouver, Canada, Jan. 22-26, 2018.
R2-1800608, 3GPP TSG-RAN WG2 NR Ad Hoc #1801, KT Corp., "Consideration on Access Control in NR", Vancouver, Canada, Jan. 22-26, 2018.
R2-1800617, 3GPP TSG-RAN WG2 NR Ad hoc 1801, OPPO, "Discussion on Access Control for Network Slicing", Vancouver, Canada, Jan. 22-26, 2018.
R2-1800879, 3GPP TSG-RAN WG2 NR Ad hoc 1801, vivo, "Discussion on the access control of SI request", Vancouver, Canada, Jan. 22-26, 2018.
R2-1800921, 3GPP TSG-RAN WG2 NR Adhoc 1801, Intel Corporation, "RAN implications of 5G Access Control requirements", Vancouver, Canada, Jan. 22-26, 2018.
R2-1800922, 3GPP TSG-RAN WG2 NR Adhoc 1801, Intel Corporation, "5G access control mechanism in IDLE and INACTIVE", Vancouver, Canada, Jan. 22-26, 2018.
R2-1801054, 3GPP TSG-RAN WG2 NR Ad hoc 1801, Nokia, Nokia Shanghai Bell, "Access attempt categorization and barring check", Vancouver, Canada, Jan. 22-26, 2018.
R2-1801055, 3GPP TSG-RAN WG2 NR Adhoc 1801, Nokia, Nokia Shanghai Bell, "Draft Change Request Access attempt categorization and barring check in NG-RAN", Vancouver, Canada, Jan. 22-26, 2018.
R2-1801056, 3GPP TSG-RAN WG2 NR Ad hoc 1801, Nokia, Nokia Shanghai Bell, "Access Barring Control for RRC_INACTIVE", Vancouver, Canada, Jan. 22-26, 2018.
R2-1801057, 3GPP TSG-RAN WG2 NR Ad hoc 1801, Nokia, Nokia Shanghai Bell, "Change Request, Access control applicability to different RRC states", Vancouver, Canada, Jan. 22-26, 2018.
R2-1801095, 3GPP TSG-RAN WG2 NR AH 1801, Huawei HiSilicon, "Access Control for MT", Vancouver, Canada, Jan. 22-26, 2018.
R2-1801172, 3GPP TSG-RAN WG2 NR AH 1801, Huawei, HiSilicon, "Basic Access Control in NR", Vancouver, Canada, Jan. 22-26, 2018.
R2-1801173, 3GPP TSG-RAN WG2 NR AH 1801, Huawei, HiSilicon, "Access Control in RRC_INACTIVE", Vancouver, Canada, Jan. 22-26, 2018.
R2-1801175, 3GPP TSG-RAN WG2 NR #AH-1801, Huawei, HiSilicon, "Access control signaling design", Vancouver, Canada, Jan. 22-26, 2018.
R2-1801258, 3GPP TSG-RAN WG2 NR Ad hoc 1801, Samsung, "NR Access Control in Idle Mode", Vancouver, Canada, Jan. 22-26, 2018.
R2-1801375, 3GPP TSG-RAN WG2 NR Ad hoc 0118, LG Electronics Inc., "Access category based access barring for RRC_IDS and RRC_INACTIVE", Vancouver, Canada, Jan. 22-26, 2018.
R2-1801383, 3GPP TSG-RAN WG2 NR Ad hoc 0118, LG Electronics Inc., "Random Access Backoff and Access Barring", Vancouver, Canada, Jan. 22-26, 2018.
R2-1801527, 3GPP TSG-RAN WG2 NR Ad hoc 1801, vivo, "Change Request, CR on 38.331 for Notification of UEs in RRC_INACTIVE to Upper Layers (v040)", Vancouver, Canada, Jan. 22-26, 2018.
C1-180028, TSG-CT WG1 Meeting #108, Ericsson, NTT DOCOMO, MediaTek, "Change Request, 5G UAC—update of alternative 3", "",Gothenburg, Sweden, Jan. 22-26, 2018.
C1-180218, TSG-CT WG1 Meeting #108, Huawei, HiSilicon, "Change Request, Conclusion on alternatives on unified access control", Gothenburg, Sweden, Jan. 22-26, 2018.
C1-180347, TSG-CT WG1 Meeting #108, Intel Corporation, Qualcomm Incorporated, Vencore Labs, OEC, ZTE, Vivo, Samsung, LG Electronics, "Change Request, Unified Access Control—Merging alternative 2 and alternate1", Gothenburg, Sweden, Jan. 22-26, 2018.
C1-180358, TSG-CT WG1 Meeting #108, Ericsson, Nokia, Nokia Shanghai Bell, NTT DOCOMO, MediaTek, "Change Request, 5G UAC—new alternative", Gothenburg, Sweden, Jan. 22-26, 2018.
C1-180378, TSG-CT WG1 Meeting #108, Deutsche Telekom, "Discussion on UAC and slicing aspects", Gothenburg, Sweden, Jan. 22-26, 2018.
C1-180429, TSG-CT WG1 Meeting #108, Intel Corporation, Qualcomm Incorporated, Vencore Labs, OEC, ZTE, vivo, Samsung, LG Electronics, Sony, Telia Company, AT&T, Vodafone, Huawei, HiSilicon, CATT, Nokia, Nokia Shanghai Bell, NTT DoCoMo, Ericsson, "Change Request, Unified Access Control—Merging Alternative 2 and alternative1", Gothenburg, Sweden, Jan. 22-26, 2018.
C1-180432, TSG-CT WG1 Meeting #108, Huawei, HiSilicon, "Change Request, Conclusion on alternatives on unified access control", Gothenburg, Sweden, Jan. 22-26, 2018.
C1-180661, TSG-CT WG1 Meeting #108, Intel Corporation, Qualcomm Incorporated, Vencore Labs, OEC, ZTE, vivo, Samsung, LG Electronics, Sony, Telia Company, AT&T, Vodafone, Huawei, HiSilicon, CATT, Nokia, Nokia Shanghai Bell, NTT DoCoMo, Ericsson, MediaTek, "Change Request, Unified Access Control—Merging alternative 2 and alternative1", Gothenburg, Sweden, Jan. 22-26, 2018.
3GPP TS 36.331 V14.1.0, Technical Specification; $3^{rd}$ Generation Partnership Project; Technical Specification Group Radio Access Network; Evolved Universal Terrestrial Radio Access (E-UTRA); Radio Resource Control (RRC); Protocol specification (Release 14) (Dec. 2016).
3GPP TS 24.301 V14.2.0, Technical Specification; $3^{rd}$ Generation Partnership Project; Technical Specification Group Core Network and Terminals; Non-Access Stratum (NAS) protocol for Evolved Packet System (EPS); Stage 3 (Release 14) (Dec. 2016).
3GPP TS 24.501 V0.2.2, Technical Specification; $3^{rd}$ Generation Partnership Project; Technical Specification Group Core Network and Terminals; Non-Access Stratum (NAS) protocol for 5G System (5GS); Stage 3 (Release 15) (Dec. 2017).
R2-1710170, 3GPP TSG-RAN2#99, TCL, "QoS Flow based Access Control for CONNECTED Mode in NR", Prague, Czech Republic, Oct. 9-13, 2017.
R2-1710261, 3GPP TSG-RAN2 Meeting#99bis, OPPO, "Discussion on access control in NR", Prague, Czech Republic, Oct. 9-13, 2017.

(56) References Cited

OTHER PUBLICATIONS

R2-1710289, 3GPP TSG-RAN WG2 #99bis, CATT, "Consideration on access control", Prague, Czech Republic, Oct. 9-13, 2017.
R2-1710423, 3GPP TSG-RAN WG2 Meeting#99bis, ZTE Corporation, Sane chips, "Establishment cause and Cell type for NR access control", Prague, Czech Republic, Oct. 9-13, 2017.
R2-1710424, 3GPP TSG-RAN WG2 Meeting#99bis, ZTE Corporation, Sane chips, "Consideration on the access control in NR", Prague, Czech Republic, Oct. 9-13, 2017.
R2-1710477, 3GPP TSG RAN WG2 #99bis, Ericsson, "Signalling of Access Control Parameters", Prague, Czech Republic, Oct. 9-13, 2017.
R2-1710478, 3GPP TSG RAN WG2 #99bis, Ericsson, "Access Control for NR", Prague, Czech Republic, Oct. 9-13, 2017.
R2-1710479, 3GPP TSG RAN WG2 #99bis, Ericsson, "Access Control for RRC-initiated Access Attempts", Prague, Czech Republic, Oct. 9-13, 2017.
R2-1710480, 3GPP TSG RAN WG2 #99bis, Ericsson, "Establishment causes for NR", Prague, Czech Republic, Oct. 9-13, 2017.
R2-1710481, 3GPP TSG RAN WG2#99bis, Ericsson, "DRAFT LS on Establishment Causes in NR", Prague, Czech Republic, Oct. 9-13, 2017.
R2-1710482, 3GPP TSG RAN WG2#99bis, Ericsson, "DRAFT Reply LS on Unified Access Control for 5G NR", Prague, Czech Republic, Oct. 9-13, 2017.
R2-1710602, 3GPP TSG RAN WG2 Meeting #99bis, Intel Corporation, "RAN Implications of 5G Access Control requirements", Prague, Czech Republic, Oct. 9-13, 2017.
R2-1710603, 3GPP TSG RAN WG2 Meeting #99bis, Intel Corporation, "5G access control mechanism in IDLE and INACTIVE", Prague, Czech Republic, Oct. 9-13, 2017.
R2-1710604, 3GPP TSG RAN WG2 Meeting #99bis, Intel Corporation, "5G access control mechanism in CONNECTED", Prague, Czech Republic, Oct. 9-13, 2017.
R2-1710800, 3GPP TSG-RAN2 Meeting #99bis, Qualcomm Incorporated, "Unified Access Control in different RRC Modes", Prague, Czech Republic, Oct. 9-13, 2017.
R2-1710897, 3GPP TSG-RAN WG2 #99bis, KT Corp., "Considerations on Access Control in NR", Prague, Czech Republic, Oct. 9-13, 2017.
R2-1711273, 3GPP TSG-RAN WG2 Meeting #99bis, Nokia, Nokia Shanghai Bell, "Access Barring in NG-RAN", Prague, Czech Republic, Oct. 9-13, 2017.
R2-1711274, 3GPP TSG-RAN WG2 Meeting #99bis, Nokia, Alcatel-Lucent Shanghai Bell, "Access Control applicability to difference RRC states", Prague, Czech Republic, Oct. 9-13, 2017.
R2-1711275, 3GPP TSG-RAN WG2 Meeting #99bis, Nokia, Nokia Shanghai Bell, "Congestion Control for RRC_CONNECTED", Prague, Czech Republic, Oct. 9-13, 2017.
R2-1711385, 3GPP TSG-RAN WG2 #99bis, LG Electronics Inc., "Access category based access barring for RRC_IDLE and RRC_INACTIVE", Prague, Czech Republic, Oct. 9-13, 2017.
R2-1711394, 3GPP TSG-RAN WG2 #99bis, LG Electronics Inc., "Random Access Backoff and Access Barring", Prague, Czech Republic, Oct. 9-13, 2017.
R2-1711398, 3GPP TSG-RAN WG2 #99bis, LG Electronics Inc., "Access category based access barring mechanism for RRC_CONNECTED", Prague, Czech Republic, Oct. 9-13, 2017.
R2-1711487, 3GPP TSG-RAN WG2 #99bis, Huawei, HiSilicon, "Basic Access Control in NR", Prague, Czech Republic, Oct. 9-13, 2017.
R2-1711498, 3GPP TSG-RAN WG2 #99bis, Huawei, HiSilicon, "Access Control in NR for RRC_CONNECTED", Prague, Czech Republic, Oct. 9-13, 2017.
R2-1711499, 3GPP TSG-RAN WG2 #99bis, Huawei, HiSilicon, "Access Control in RRC_INACTIVE", Prague, Czech Republic, Oct. 9-13, 2017.
R2-1711500, 3GPP TSG-RAN WG2 #99bis, Huawei, HiSilicon, "Access Control for MT", Prague, Czech Republic, Oct. 9-13, 2017.
R2-1711624, 3GPP TSG-RAN WG2 Meeting #99bis, Samsung, "Way-forward for NR access control", Prague, Czech Republic, Oct. 9-13, 2017.
R2-1711625, 3GPP TSG-RAN WG2 Meeting #99bis, Samsung, "NR access control procedure", Prague, Czech Republic, Oct. 9-13, 2017.
R2-1711626, 3GPP TSG-RAN WG2 Meeting #99bis, Samsung, "On linking Establishment Cause and standardized access category", Prague, Czech Republic, Oct. 9-13, 2017.
R2-1711627, 3GPP TSG-RAN WG2 Meeting #99bis, Samsung, "Barring configuration in NR access control", Prague, Czech Republic, Oct. 9-13, 2017.
R2-1711628, 3GPP TSG-RAN WG2 Meeting #99bis, Samsung, "Barring skip indicator in NR", Prague, Czech Republic, Oct. 9-13, 2017.
R2-1711635, 3GPP TSG-RAN WG2 Meeting #99bis, MediaTek Inc., "Unified Access Control", Prague, Czech Republic, Oct. 9-13, 2017.
R2-1800317, 3GPP TSG-RAN WG2 NR AH#3, Ericsson, "AS-NAS functional division for Unified Access Control", Vancouver, Canada, Jan. 22-26, 2018.
R2-1800457, 3GPP TSG-RAN WG2 NR Ad Hoc 1801, ZTE, Sanechips, "Establishment cause and Call type for NR access control", Vancouver, Canada, Jan. 22-26, 2018.
R2-1800459, 3GPP TSG-RAN WG2 NR Ad Hoc 1801, ZTE, Sanechips, "Consideration on the barring parameters", Vancouver, Canada, Jan. 22-26, 2018.
R2-1800062, 3GPP TSG-RAN WG2 NR Ad Hoc 1801, OPPO, "Discussion on Access Control for On-Demand and SI Request", Vancouver, Canada, Jan. 22-26, 2018.
R2-1800064, 3GPP TSG-RAN WG2 NR Ad Hoc 1801, OPPO, "Discussion on NR Access Control for RRC_INACTIVE UEs", Vancouver, Canada, Jan. 22-26, 2018.
R2-1800111, 3GPP TSG-RAN WG2 NR AH#0118, Qualcomm Incorporated, "Unified Access Control in different RRC Modes", Vancouver, Canada, Jan. 22-26, 2018.
R2-1800272, 3GPP TSG-RAN WG2 NR Ad hoc 0118, Spreadtrum Communications, "Timer mechanisms for 5G unified access control", Vancouver, Canada, Jan. 22-26, 2018.
R2-1800273, 3GPP TSG-RAN WG2 NR Ad hoc 0118, Spreadtrum Communications, "Barring information encoding for 5G unified access control", Vancouver, Canada, Jan. 22-26, 2018.
R2-1800318, 3GPP TSG-RAN WG2 NR AH#3, Ericsson, "RRC initiated access attempts in RRC_IDSLE and RRC_INACTIVE", Vancouver, Canada, Jan. 22-26, 2018.
R2-1800320, 3GPP TSG-RAN WG2 NR AH#3, Ericsson, "Signaling of Access Control Parameters", Vancouver, Canada, Jan. 22-26, 2018.
R2-1800321, 3GPP TSG-RAN WG2 NR AH#3, Ericsson, "Establishment causes for NR", Vancouver, Canada, Jan. 22-26, 2018.
R2-1800322, 3GPP TSG-RAN WG2 NR AH#3, Ericsson, "[DRAFT] LS on Establishment Causes in NR", Vancouver, Canada, Jan. 22-26, 2018.
R2-1800323, 3GPP TSG-RAN WG2 NR AH#3, Ericsson, "[DRAFT] Reply LS on requirements on unified access control for 5GS", Vancouver, Canada, Jan. 22-26, 2018.
International Search Report and Written Opinion dated Jun. 10, 2019 in PCT application PCT/US19/18904.

* cited by examiner

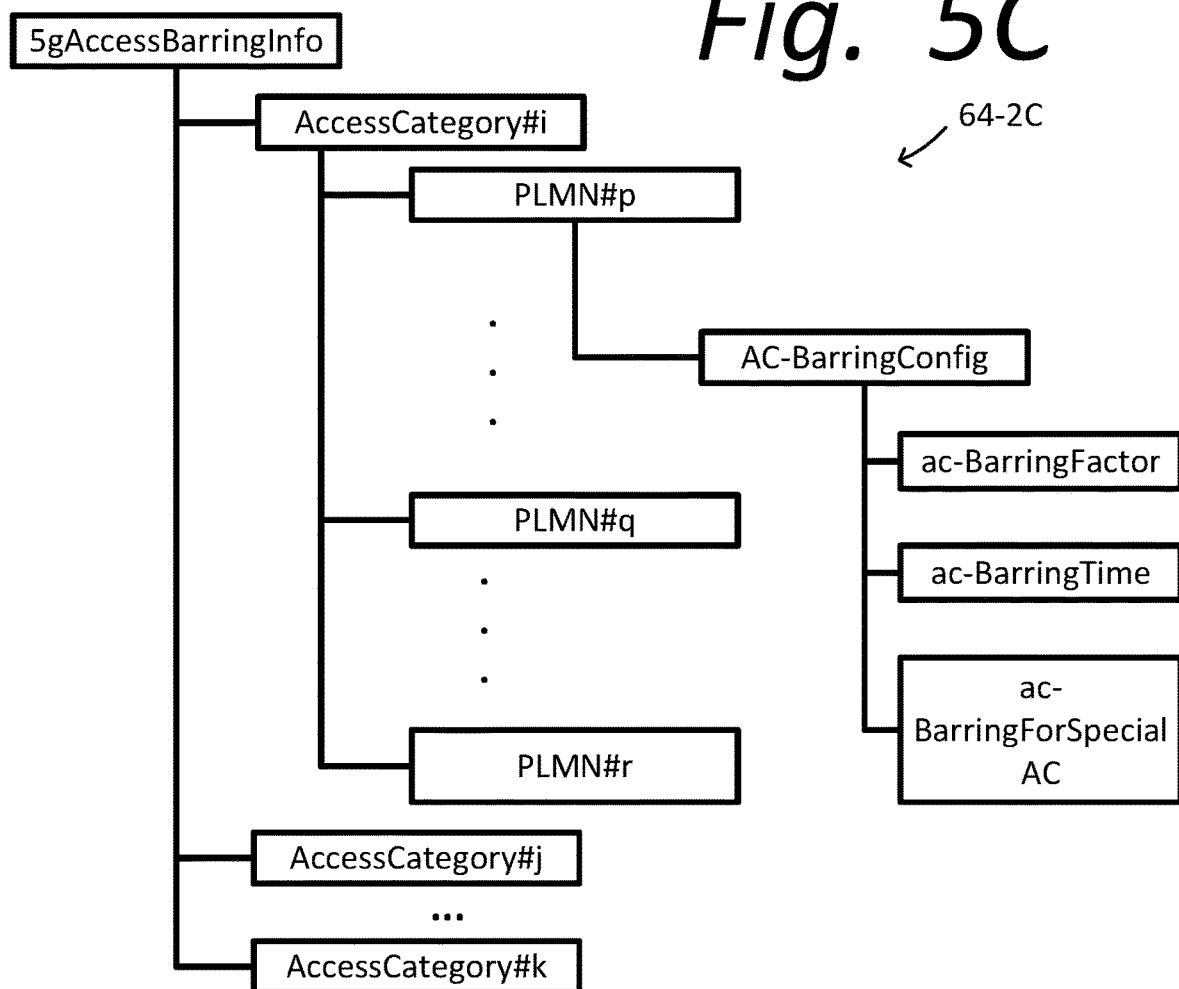

ACCESS CONTROL METHODS AND APPARATUS FOR RADIO SYSTEMS

This application claims the priority and benefit of U.S. provisional application 62/634,096 filed Feb. 22, 2018, entitled, "ACCESS CONTROL METHODS AND APPARATUS FOR RADIO SYSTEMS", which is incorporated by reference herein.

TECHNICAL FIELD

The technology relates to wireless communications, and particularly to methods and apparatus for controlling access to radio systems.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on the radio channels certain information which is required for mobile stations to access to the network. In Long-Term Evolution (LTE) and LTE Advanced (LTE-A), such information is called "system information" ("SI"). Each access node, such as an evolved NodeB ("eNB") or a gNB (for, e.g., New Radio [NR] technology), broadcasts such system information to its coverage area via several System Information Blocks (SIBs) on downlink radio resources allocated to the access node.

Typical radio communication systems employ the capability to restrict/control accesses from users when the network is congested, known as Access Control (AC). In Long-Term Evolution (LTE) and LTE Advanced (LTE-A) (a.k.a. 4G network), every user equipment (UE) maintains at least one Access Class, a classifier programmed and saved in the Universal Integrated Circuit Card (UICC) inserted in the UE. During a congestion, the network may broadcast access barring information for each of the Access Classes on which the access restrictions are necessary.

In one method of AC, the access barring information may configure UEs to restrict all types of access attempts per Access Class. This configuration is referred as Access Class Barring (ACB). Other access restriction configurations introduced in LTE/LTE-A include Service Specific Access Control (SSAC) (restricting certain types of access, such as voice calls), ACB for Circuit Switched Fallback (CSFB) (restricting falling back to 3G voice services), Smart Congestion Mitigation (SCM) (restricting data communications initiated background during a voice call), Extended Access Barring (EAB) (AC for Machine-Type Communications) and Access Control for general Data Connectivity (ACDC) (restrict access from specific user applications). The access barring information for these configurations may be broadcasted by eNBs (base stations) in System Information Block Type 2 (SIB2) or System Information Block Type 14 (SIB14).

3GPP is currently discussing introduction of a unified approach for the Access Control scheme to be adopted for 5G network. This unified approach may be applicable to not only gNBs (5G base stations) but also eNBs that connect to 5G core networks What is needed, therefore, and an example object of the technology disclosed herein, are methods, apparatus, and techniques for a wireless terminal to make access control decisions, in dependence upon type(s) of core networks for which the wireless terminal is configured.

SUMMARY

In one example aspect of the technology disclosed herein, a wireless terminal initiates an inter-system mode change procedure, also referred as an inter-system change procedure, an inter-system switching or an inter-system mode switching, to switch from a first core network to second when an access attempt to the first core network is barred.

Another example aspect of the technology disclosed herein concerns a wireless terminal comprising receiver circuitry and transmitter circuitry, and processor circuitry. The receiver circuitry and transmitter circuitry are configured to communicate across a radio interface with a radio access node and to one or more management entities of core networks via the radio access node. The processor circuitry is configured to register to a first core network; receive first access control information and second access control information from radio access node; upon an access attempt, determine if the access attempt is allowed for the first core network based on the first access control information; when the access attempt is barred for the first core network, determine if the access attempt is permitted by a second core network allows based on the second access control information; and, when the access attempt is allowed for the second core network, initiate an inter-system mode change procedure to designate the second core network as a registered network.

Another example aspect of the technology disclosed herein concerns a method in a wireless terminal. In a basic mode the method comprises registering to a first core network; receiving first access control information and second access control information from radio access nodes; upon an access attempt, determining if the access attempt is allowed for the first core network based on the first access control information; when the access attempt is barred for the first core network, determining if the access attempt is permitted for a second core network based on the second access control information; when the access attempt is allowed for the second core network, initiating an inter-system mode change procedure to designate the second core network as a registered network.

In another of its aspects the technology disclosed herein concerns a management entity in a core network. The management entity comprises receiver circuitry and transmitter circuitry, and processor circuitry. The receiver circuitry and transmitter circuitry are configured to communicate to a wireless terminal via at least one radio access node. The processor circuitry is configured to receive a message from the wireless terminal requesting an inter-system mode change; and switch the registered core network of the wireless terminal to the core network of the management entity.

In another of its aspects the technology disclosed herein concerns a method in a management entity in a core network. In a basic mode the method comprises receiving a message from the wireless terminal requesting an inter-system mode change; and switching the registered core network of the wireless terminal to the core network of the management entity.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 1-1 through FIG. 1-5 are diagrammatic views showing architectural configurations of differing radio communications systems according to different respective example embodiments and modes.

FIG. 2 is a schematic view of a generic example embodiment and mode of both an access node and a wireless terminal comprising a radio communications system for which access control is implemented; FIG. 2-1 through FIG. 2-5 are schematic views of access nodes and wireless terminals according to the different example embodiments and modes of FIG. 1-1 through FIG. 1-5, respectively.

FIG. 3 is a diagrammatic view of a generic access control program executed by an access controller of a wireless terminal in conjunction with access control information; FIG. 3-1 through FIG. 3-5 are diagrammatic views of access control programs according to the different example embodiments and modes of FIG. 1-1 through FIG. 1-5, respectively.

FIG. 4 is a diagrammatic view of a generic access control procedure performed upon execution of the generic access control program of FIG. 3; FIG. 4-1 through FIG. 4-5 are diagrammatic views of access control procedures performed upon execution of the access control programs of FIG. 3-1 through FIG. 3-5, respectively.

FIG. 5A, FIG. 5B, and FIG. 5C are diagrammatic views showing differing example, alternative formats of 5G access control information.

DETAILED DESCRIPTION

Figure 1:
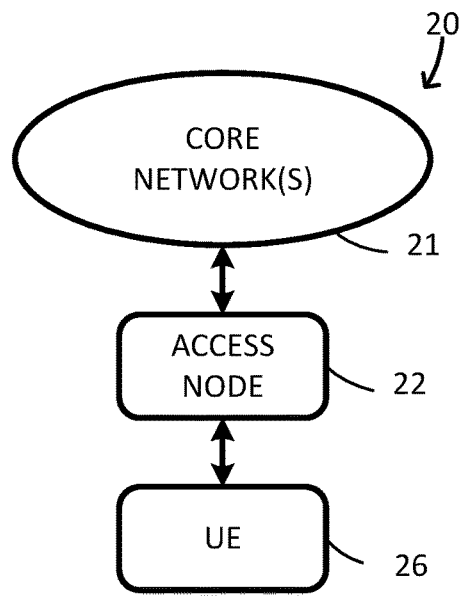
FIG. 1 is a diagrammatic view showing a generic architectural configuration of a radio communications system in which access control is implemented.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a gNB (for, e.g., New Radio [NR] technology), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12 and higher), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As illustrated by the high level generic view of FIG. 1, a typical radio communication system comprises a core network 20; a radio access network including one or more base stations or access nodes 22, and terminal devices 26 used by the end users. The Core Network (CN) 21 includes the central part of the radio communication system that provides various services to customers who are connected by the Radio Access Network. Example functions of a core network are discussed above. The core network in the 4G network is called Evolved Packet Core (EPC), whereas the core network in the 5G network is referred as 5G Core Network (5GCN). The Radio Access Network (RAN) comprises, e.g., is a part of, a radio communication system that resides between terminal devices and the core network. The RAN provides connectivity to the devices through radio interfaces via the base station(s) or access node(s) 22, e.g., via eNB (in LTE/LTE-A RAN) or via gNB (in 5G RAN). The terminal devices 26 which are used by end users are also referred to as wireless terminals or User Equipment (UE).

Figure 1:
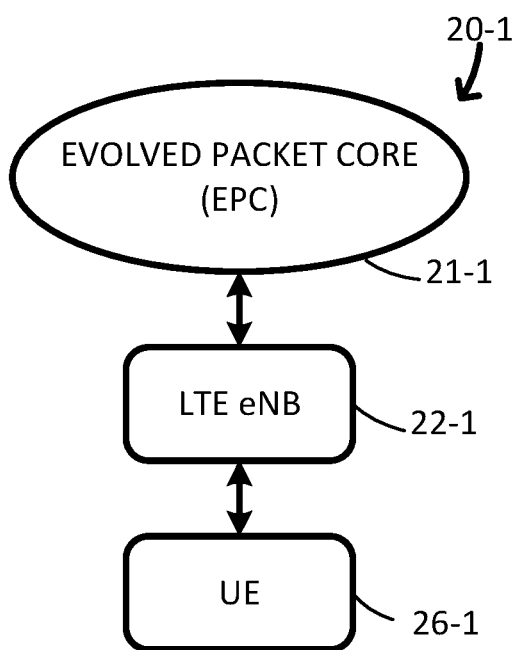
Figures 1, 2:
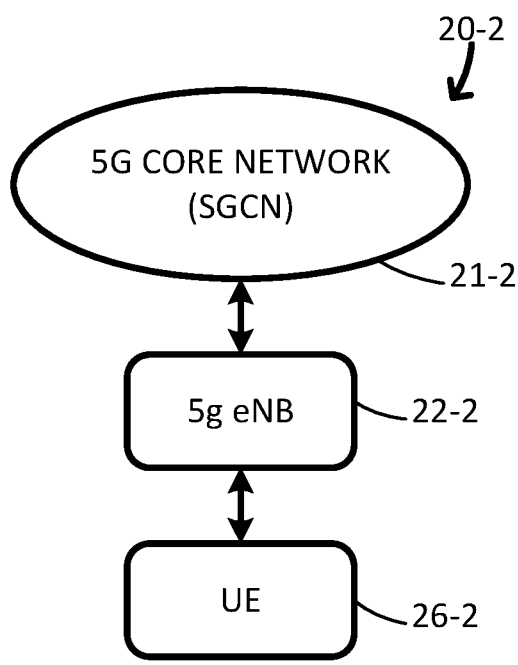
Figures 1, 2, 3:
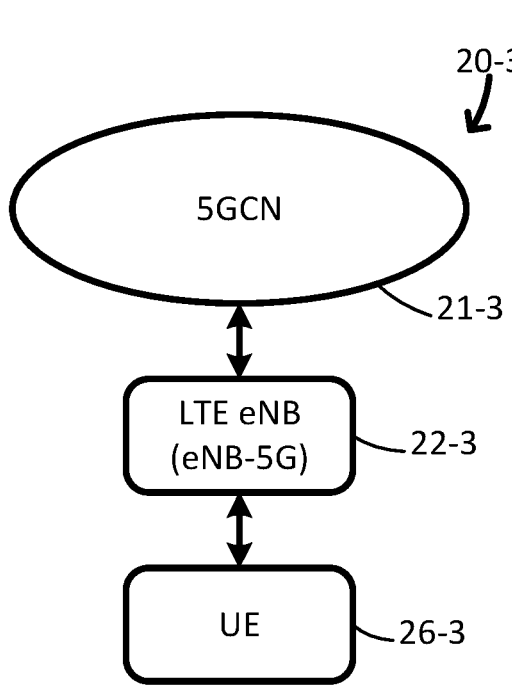
Figures 1, 2, 3, 4:
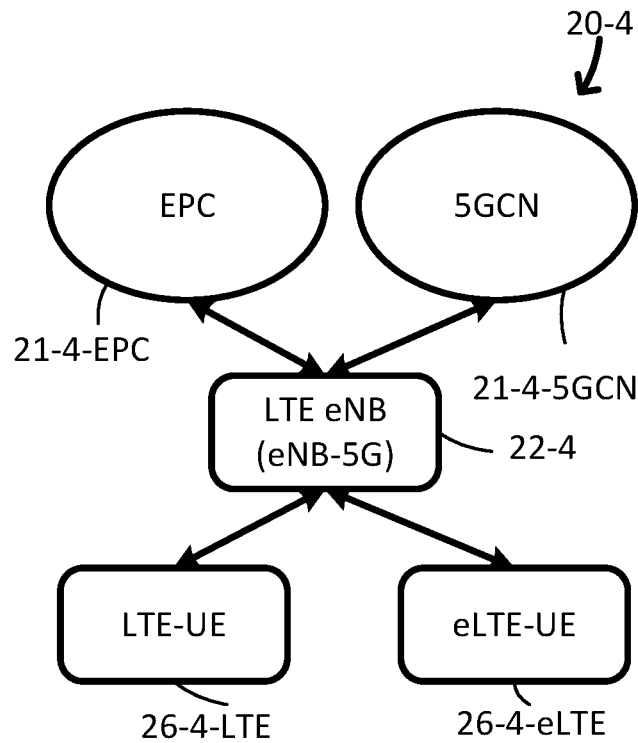

While FIG. 1 shows a generic radio communications system 20, FIG. 1-1 through FIG. 1-5 show architectural configurations of differing example embodiments and modes of respective radio communications systems 20-1 through 20-5. Each radio communications system 20 comprises one or more core networks 21, a base station or access node 22, and one or more wireless terminals or UEs 26. For example, radio communications system 20-1 comprises core network 21-1, access node 22-1, and wireless terminal 26-1; radio communications system 20-2 comprises core network 21-2, access node 22-2, and wireless terminal 26-2; and so forth. The example radio communications system 20-4 of FIG. 1-4 comprises two core networks, e.g., core network 21-4-EPC and core network 21-4-5GCN and two different types of wireless terminals, e.g., wireless terminal 26-4LTE and wireless terminal 26-4-eLTE. The example radio communications system 20-5 of FIG. 1-5 also comprises two core networks, e.g., core network 21-5-EPC and core network 21-5-5GCN One objective of various example embodiments and modes of the technology disclosed herein is to control access by the one or more wireless terminals 26 to the respective radio communications system 20, particularly but not exclusively in a situation of network congestion. FIG. 2 shows a generic example embodiment and mode of both an access node 22 and a wireless terminal 26 for which such access control is implemented. FIG. 2 shows, for example, that radio access node 22 communicates over air or radio interface 24 (e.g., Uu interface) with wireless terminal 26. As mentioned above, and depending upon which type of radio communications system 20 is employed, the radio access node 22 may be any suitable node for communicating with the wireless terminal 26, such as a base station node, an eNodeB ("eNB"), or a gNB (for, e.g., New Radio [NR] technology), for example. The node 22 comprises node processor circuitry ("node processor 30") and node transceiver circuitry 32. The node transceiver circuitry 32 typically comprises node transmitter circuitry 34 and node receiver circuitry 36, which are also called node transmitter 34 and node receiver 36, respectively.

The wireless terminal 26 comprises terminal processor circuitry 40 ("terminal processor 40") and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically but is not required to comprise user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s). The respective transmitter circuits 34 and 44 may comprise, e.g., amplifier(s), modulation circuitry and other conventional transmission equipment. The respective receiver circuits 36 and 46 may comprise, e.g., e.g., amplifiers, demodulation circuitry, and other conventional receiver equipment.

In general operation node, 22 and wireless terminal 26 communicate with each other across radio interface 24 using predefined configurations of information. By way of non-limiting example, the radio access node 22 and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between radio access node 22 and wireless terminal 26 over radio interface 24, the node processor 30 and terminal processor 40 of FIG. 2 are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52. It should be understood that, in differing technologies, the configurations of information may not necessarily be denominated as "frames" or have the LTE frame structure, but for such other differing technology the configurations of information may be otherwise structure and referenced.

The wireless terminal 26 also comprises a storage device or memory 54. As explained herein with reference to FIG. 17, for example, the memory 54 may take the form of read only memory (ROM), random access memory (RAM), cache memory, or semiconductor memory, just to name a few examples. One or more executable computer programs may be stored in program memory 56. One or more applications executed by the terminal processor 40 of wireless terminal 26 in conjunction with services rendered by or using wireless terminal 26 may be stored in applications memory 58.

Figure 3:
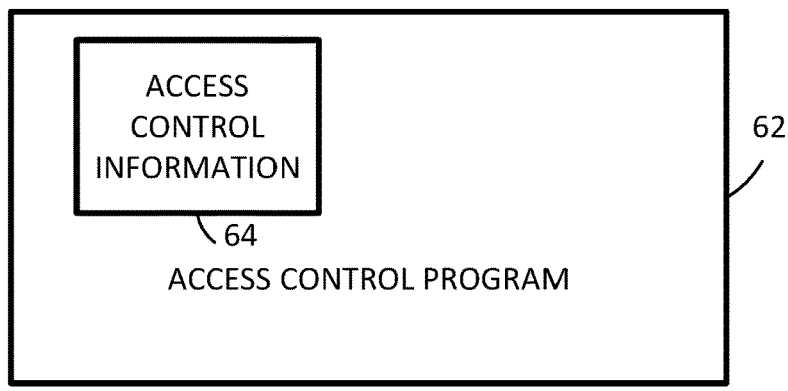

In the various example embodiments and modes described herein, the wireless terminal 26 comprises a terminal access controller 60, also known as access controller 60. As described herein, the access controller 60 executes an access control program 62 generically depicted by FIG. 3. The access control program 62 may be stored in program memory 56. FIG. 3 further shows that the access control program 62 generically employs access control information 64 obtained from the core network 21 in making access control checks. The execution of the access control program 62 results in performance of an access control procedure 65 which is generically shown in FIG. 4.

Figure 4:
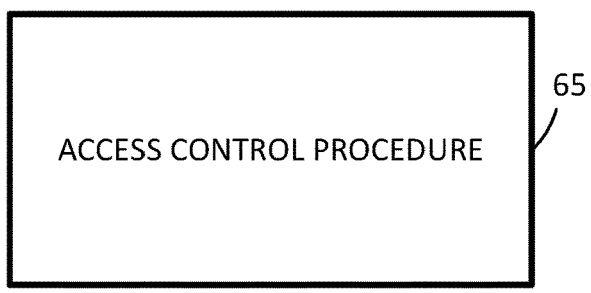

The access controller 60 may comprise or be realized by, for example, terminal processor 40. Thus, the wireless terminal 26 comprises a least one processor (e.g., terminal processor 40) and at least one memory 54 (e.g., program memory 56) including computer program code stored on non-transient memory. The memory 54 and the computer program code, e.g., of the access control program 62, are configured, working with the at least one processor, to perform access control operations of the generic access control procedure 65. Whereas FIG. 3 shows a generic access control program 62, FIG. 3-1 through FIG. 3-4 show respective other example access control programs 62-1 through 62-4 which may also be stored in memory and which, working with at least one processor, perform the access control operations of the respective access control procedures 65-1 through 65-4 shown in FIG. 4-1 through FIG. 4-4, respectively.

As mentioned above, the access control program 62 is performed in conjunction with access control information 64. The access control information 64, in at least some example embodiments and modes, is received from the radio communications system. In example embodiments and modes, the access control information 64 may be transmitted to the wireless terminal 26 in broadcast system information. The broadcast system information may be formatted in system information, such as (for example) in one or more system information blocks (SIBs). Thus, FIG. 2 also shows the access node 22 as comprising system information generator 66. The access control information 64, which may be included in the system information generated by system information generator 66, is transmitted by node transmitter 34 over radio interface premise 24 to the terminal receiver 46 of wireless terminal 26, where it is handled by system information processor 68 of wireless terminal 26.

Embodiment 1

A first example embodiment and mode is illustrated with reference to the radio communications system 20-1 of FIG. 1-1, the access node 22-1 and wireless terminal 26-1 of FIG. 2-1, the access control program 64-1 of FIG. 3-1; and the access control procedure 65-1 of FIG. 4-1. FIG. 1-1 particularly shows a network architecture for the 4G network, where the core network 21-1 is EPC, providing LTE/LTE-A services. In this case, the eNB 22-1 is capable of connecting only to EPC (not to 5GCN). The UE 26-1 shown in FIG. 1-1 is capable of receiving services provided by the 4G network and may also support 5G features. However, when connected to this eNB 22-1, the UE 26-1 may not activate such 5G features.

The access controller 60-1 of FIG. 2-1 is shown as making an access control decision based on EPC access control information comprising access control barring parameters. The EPC access control barring parameters may be obtained from broadcast system information obtained from the core network 21-1.

FIG. 3-1 shows that the access control program 62-1 executed by access controller 60 of FIG. 2-1 comprises an EPC access control check main routine 70-1; access barring check subroutine 72; extended access barring (EAB) check subroutine 74; and access barring check for ACDC subroutine 76. The EPC access control check main routine 70-1 utilizes EPC access control information 64-1 which, as shown in FIG. 3-1, comprises access control barring parameters.

The access control procedure 65-1 performed upon execution of the EPC access control check main routine 70-1 is shown in FIG. 4-1. As act 4-1-1, an indication of an access attempt is received by the EPC access control check main routine 70-1. As used herein, an indication of an access attempt may be received when an access attempt is generated for any reason, such as (for example) by an application (stored in applications memory 58), e.g., upon requesting a service or connection for performance of the application, or for other reason associated with operation of the wireless terminal 26 (such as, for example, a tracking area update). Upon receiving an access attempt, as act 4-1-2 the EPC access control check main routine 70-1 determines whether the access attempt is barred. If the decision of act 4-1-2 is that the access request is not barred, then as act 4-1-3 the access is permitted. Otherwise, if the decision of act 4-1-2 is that the access request is barred, then as act 4-1-4 the access is not permitted.

If the access control check of act 4-1-2 results in "access to the cell as barred" (act 4-1-4), the wireless terminal may stop the access attempt. In some implementations in which the wireless terminal performs the access barring check upon receipt of an access attempt (connection establishment request) from the upper layer (e.g. Non-Access Stratum (NAS)), and the RRC responds back to the upper layer with the result of the access check, the upper layer may suspend the service request that has triggered the access attempt, while the wireless terminal may stay in the current serving cell and may apply a normal cell reselection process. The service request procedure may be started if it is still necessary when the access attempt is granted (e.g. change on access control information in the system information) or because of a cell change.

When detecting network congestions, or some other conditions, the network may invoke access control to reduce the number of access attempts from wireless terminals. In order to do this, the node may broadcast EPC access control information. Listing 1 shows an example of the EPC access control information broadcasted on System Information Block Type 2 (SIB2) and System Information Block Type 14 (SIB14). In this case, the EPC access control information comprises multiple information elements.

A specific implementation of the access control program 62-1 of FIG. 3 and the access control procedure 65-1 of FIG. 4-1 is illustrated with reference to Listing 1 and Listing 2 provided below. Listing 1 shows the EPC access control information 64-1 for the first example embodiment and mode, Listing 2 describes in more detail example acts of the access control procedure 65-1 resulting from execution of access control program 62-1.

In Listing 1, the information element ac-BarringInfo comprises the information for Access Class Barring (ACB). The two information elements, ssac-BarringForMMTEL-Voice-r9 and ssac-BarringForMMTEL-Video-r9 comprise SSAC for restricting voice calls and video calls, respectively. ac-BarringForCSFB-r10 includes information for ACB for CSFB. ac-BarringSkipForMMTELVoice-r12, ac-BarringSkipForMMTELVideo-r12, ac-BarringSkipForSMS-r12 and ac-BarringPerPLMN-List-r12 information elements conveys barring parameters for SCM. acdc-BarringForCommon-r13 and acdc-BarringPerPLMN-List-r13 are the information elements for ACAD. Finally, SIB14 is dedicated for Extended Access Barring (EAB).

As indicated above, FIG. 4-1 shows a high level view of the UE access control procedure for the UE that has received SIB2/SIB14 for the first example embodiment and mode. The access control procedure 65-1 may be invoked when an event of an access attempt occurs in the UE. An access attempt is an action triggered by the UE to access the network for initiating services. Examples of such actions include (but not limited to) Radio Resource Control (RRC) connection establishment for a voice/video/data/emergency call, mobile-originated signaling messages and short message services (SMS). When such an access attempt occurs, the UE may perform Access Check shown in FIG. 2, which may derive an access decision indicating whether this access attempt is allowed (not barred) or not (barred).

In Listing 2, the acts of section 5.3.3.11 may comprise the access barring check subroutine 72; the acts of section 5.3.3.12 may comprise the extended access barring (EAB) check subroutine 74; and the acts of section 5.3.3.14 may comprise the access barring check for ACDC subroutine 76. The other acts of Listing 2 may comprise the EPC access control check main routine 70-1. The calls of the subroutines by EPC access control check main routine 70-1 may pass to the subroutines, or require the subroutines to utilize, a "Tbarring" and "AC barring parameter". The "Tbarring" is typically representative of a time value; the "AC barring parameter" typically comprises a value against which a number randomly generated by the subroutine is compared for determining if an access attempt is barred.

Listing 1 and Listing 2 refers to various timers, e.g., timer T302, timer T303, timer T305, timer T306 and timer T308. Timer T302 starts when receiving RRCConnectionReject while performing RRC connection establishment. In terms of Listing 1, if T302 is still running, this means that RRC connection establishment is not allowed until the timer expires. Timer T303 starts when an access gets barred while performing RRC connection establishment for mobile originating calls. If running, mobile originating calls are still considered to be barred. Timer T305 starts when an access gets barred while performing RRC connection establishment for mobile originating signaling. If running, mobile originating signaling is still considered to be barred. Timer T306 starts when an access gets barred while performing RRC connection establishment for mobile originating CS fallback. If running, mobile originating CS fallback is still considered to be barred. Timer T308 starts when an access gets barred due to Access Control for general Data Connectivity (ACDC). If running, the cell is still barred for an access attempt subject to ACDC.

Listing 1

```
-- ASN1START
SystemInformationBlockType2 ::=    SEQUENCE {
    ac-BarringInfo          SEQUENCE {
        ac-BarringForEmergency       BOOLEAN,
        ac-BarringForMO-Signalling   AC-BarringConfig    OPTIONAL, -- Need OP
        ac-BarringForMO-Data         AC-BarringConfig    OPTIONAL, -- Need OP
    }                                                    OPTIONAL, -- Need OP
    radioResourceConfigCommon    RadioResourceConfigCommonSIB,
    ue-TimersAndConstants        UE-TimersAndConstants,
    freqInfo                     SEQUENCE {
        ul-CarrierFreq           ARFCN-ValueEUTRA        OPTIONAL, -- Need OP
        ul-Bandwidth             ENUMERATED {n6, n15, n25, n50, n75, n100}
                                                         OPTIONAL, -- Need OP
        additionalSpectrumEmission   AdditionalSpectrumEmission
    },
```

Listing 1

```
        mbsfn-SubframeConfigList      MBSFN-SubframeConfigList      OPTIONAL, -- Need OR
        timeAlignmentTimerCommon      TimeAlignmentTimer,
        ...,
        lateNonCriticalExtension OCTET STRING (CONTAINING
SystemInformationBlockType2-v8h0-IEs)                              OPTIONAL,
        [[ ssac-BarringForMMTEL-Voice-r9      AC-BarringConfig      OPTIONAL, -- Need OP
           ssac-BarringForMMTEL-Video-r9      AC-BarringConfig      OPTIONAL -- Need OP
        ]],
        [[ ac-BarringForCSFB-r10              AC-BarringConfig      OPTIONAL --
Need OP
        ]],
        [[ ac-BarringSkipForMMTELVoice-r12        ENUMERATED {true}    OPTIONAL, --
Need OP
           ac-BarringSkipForMMTELVideo-r12        ENUMERATED {true}    OPTIONAL, --
Need OP
           ac-BarringSkipForSMS-r12               ENUMERATED {true}    OPTIONAL, --
Need OP
           ac-BarringPerPLMN-List-r12    AC-BarringPerPLMN-List-r12   OPTIONAL --
Need OP
        ]],
        [[ voiceServiceCauseIndication-r12      ENUMERATED {true}     OPTIONAL     --
Need OP
        ]],
        [[ acdc-BarringForCommon-r13          ACDC-BarringForCommon-r13     OPTIONAL, --
Need OP
           acdc-BarringPerPLMN-List-r13    ACDC-BarringPerPLMN-List-r13     OPTIONAL --
Need OP
        ]],
        [[
           udt-RestrictingForCommon-r13         UDT-Restricting-r13
OPTIONAL, -- Need OR
           udt-RestrictingPerPLMN-List-r13      UDT-RestrictingPerPLMN-List-r13
OPTIONAL, -- Need OR
           cIoT-EPS-OptimisationInfo-r13    CIOT-EPS-OptimisationInfo-r13    OPTIONAL, --
Need OP
           useFullResumeID-r13                  ENUMERATED {true}     OPTIONAL     --
Need OP
        ]]
}
SystemInformationBlockType2-v8h0-IEs ::=         SEQUENCE {
        multiBandInfoList           SEQUENCE (SIZE (1..maxMultiBands)) OF
AdditionalSpectrumEmission       OPTIONAL, -- Need OR
        nonCriticalExtension        SystemInformationBlockType2-v9e0-IEs          OPTIONAL
}
SystemInformationBlockType2-v9e0-IEs ::= SEQUENCE {
        ul-CarrierFreq-v9e0             ARFCN-ValueEUTRA-v9e0 OPTIONAL, -- Cond ul-
FreqMax
        nonCriticalExtension        SEQUENCE { }                OPTIONAL
}
AC-BarringConfig ::=        SEQUENCE {
        ac-BarringFactor            ENUMERATED {
                                    p00, p05, p10, p15, p20, p25, p30, p40,
                                    p50, p60, p70, p75, p80, p85, p90, p95},
        ac-BarringTime              ENUMERATED {s4, s8, s16, s32, s64, s128, s256,
s512},
        ac-BarringForSpecialAC      BIT STRING (SIZE(5))
}
MBSFN-SubframeConfigList ::= SEQUENCE (SIZE (1..maxMBSFN-Allocations)) OF
MBSFN-SubframeConfig
AC-BarringPerPLMN-List-r12 ::= SEQUENCE (SIZE (1.. maxPLMN-r11)) OF AC-
BarringPerPLMN-r12
AC-BarringPerPLMN-r12 ::=          SEQUENCE {
        plmn-IdentityIndex-r12             INTEGER (1..maxPLMN-r11),
        ac-BarringInfo-r12                 SEQUENCE {
           ac-BarringForEmergency-r12          BOOLEAN,
           ac-BarringForMO-Signalling-r12      AC-BarringConfig    OPTIONAL, -- Need OP
           ac-BarringForMO-Data-r12            AC-BarringConfig    OPTIONAL -- Need OP
        }                                      OPTIONAL, -- Need OP
        ac-BarringSkipForMMTELVoice-r12        ENUMERATED {true}   OPTIONAL, --
Need OP
        ac-BarringSkipForMMTELVideo-r12        ENUMERATED {true}   OPTIONAL, --
Need OP
        ac-BarringSkipForSMS-r12               ENUMERATED {true}   OPTIONAL, -- Need OP
        ac-BarringForCSFB-r12                  AC-BarringConfig    OPTIONAL, -- Need OP
```

Listing 1

```
        ssac-BarringForMMTEL-Voice-r12    AC-BarringConfig        OPTIONAL, -- Need OP
        ssac-BarringForMMTEL-Video-r12    AC-BarringConfig        OPTIONAL  -- Need OP
}
ACDC-BarringForCommon-r13 ::=         SEQUENCE {
    acdc-HPLMNonly-r13                BOOLEAN,
    barringPerACDC-CategoryList-r13           BarringPerACDC-CategoryList-r13
}
ACDC-BarringPerPLMN-List-r13 ::=      SEQUENCE (SIZE (1.. maxPLMN-r11)) OF
ACDC-BarringPerPLMN-r13
ACDC-BarringPerPLMN-r13 ::=           SEQUENCE {
    plmn-IdentityIndex-r13            INTEGER (1..maxPLMN-r11),
    acdc-OnlyForHPLMN-r13                 BOOLEAN,
    barringPerACDC-CategoryList-r13           BarringPerACDC-CategoryList-r13
}
BarringPerACDC-CategoryList-r13 ::= SEQUENCE (SIZE (1..maxACDC-Cat-r13)) OF
BarringPerACDC-Category-r13
BarringPerACDC-Category-r13 ::= SEQUENCE {
    acdc-Category-r13       INTEGER (1..maxACDC-Cat-r13),
    acdc-BarringConfig-r13      SEQUENCE {
      ac-BarringFactor-r13      ENUMERATED {
                                  p00, p05, p10, p15, p20, p25, p30, p40,
                                  p50, p60, p70, p75, p80, p85, p90, p95},
      ac-BarringTime-r13        ENUMERATED {s4, s8, s16, s32, s64, s128, s256,
s512}
    }                           OPTIONAL -- Need OP
}
UDT-Restricting-r13 ::= SEQUENCE {
    udt-Restricting-r13       ENUMERATED {true}         OPTIONAL, --Need OR
    udt-RestrictingTime-r13   ENUMERATED {s4, s8, s16, s32, s64, s128, s256, s512}
OPTIONAL --Need OR
}
UDT-RestrictingPerPLMN-List-r13 ::=   SEQUENCE (SIZE (1..maxPLMN-r11)) OF UDT-
RestrictingPerPLMN-r13
UDT-RestrictingPerPLMN-r13 ::= SEQUENCE {
    plmn-IdentityIndex-r13              INTEGER (1..maxPLMN-r11),
    udt-Restricting-r13                 UDT-Restricting-r13    OPTIONAL   --Need OR
}
CIOT-EPS-OptimisationInfo-r13 ::= SEQUENCE (SIZE (1.. maxPLMN-r11)) OF CIOT-
OptimisationPLMN-r13
CIOT-OptimisationPLMN-r13::= SEQUENCE {
        up-CIoT-EPS-Optimisation-r13    ENUMERATED {true}     OPTIONAL, -- Need OP
        cp-CIoT-EPS-Optimisation-r13    ENUMERATED {true}     OPTIONAL, -- Need OP
        attachWithoutPDN-Connectivity-r13  ENUMERATED {true}     OPTIONAL-- Need OP
}
-- ASN1STOP
```

SystemInformationBlockType2 field descriptions ac-BarringFactor
If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
ac-BarringTime
Mean access barring time value in seconds.
acdc-BarringConfig
Barring configuration for an ACDC category. If the field is absent, access to the cell is considered as not barred for the ACDC category in accordance with subclause 5.3.3.13.
acdc-Category
Indicates the ACDC category as defined in TS 24.105 [72].
acdc-OnlyForHPLMN
Indicates whether ACDC is applicable for UEs not in their HPLMN for the corresponding PLMN. TRUE indicates that ACDC is applicable only for UEs in their HPLMN for the -continued

| SystemInformationBlockType2 field descriptions |
|---|
| corresponding PLMN. FALSE indicates that ACDC is applicable for both UEs in their HPLMN and UEs not in their HPLMN for the corresponding PLMN.<br>additionalSpectrumEmission<br>The UE requirements related to IE AdditionalSpectrumEmission are defined in TS 36.101 [42, table 6.2.4-1]. NOTE 1.<br>attachWithoutPDN-Connectivity<br>If present, the field indicates that attach without PDN connectivity as specified in TS 24.301 [35] is supported for this PLMN.<br>barringPerACDC-CategoryList<br>A list of barring information per ACDC category according to the order defined in TS 22.011 [10]. The first entry in the list corresponds to the highest ACDC category of which applications are the least restricted in access attempts at a cell, the second entry in the list corresponds to the ACDC category of which applications are restricted more than applications of the highest ACDC category in access attempts at a cell, and so on. The last entry in the list corresponds to the lowest ACDC category of which applications are the most restricted in access attempts at a cell.<br>cp-CIoT-EPS-Optimisation<br>This field indicates if the UE is allowed to establish the connection with Control plane CIoT EPS Optimisation, see TS 24.301 [35].<br>mbsfn-SubframeConfigList<br>Defines the subframes that are reserved for MBSFN in downlink. NOTE 1.<br>multiBandInfoList<br>A list of AdditionalSpectrumEmission i.e. one for each additional frequency band included in multiBandInfoList in SystemInformationBlockType1, listed in the same order.<br>plmn-IdentityIndex<br>Index of the PLMN in plmn-IdentityList included in SIB1. Value 1 indicates the PLMN listed 1st in plmn-IdentityList included in SIB1. Value 2 indicates the PLMN listed 2nd in plmn-IdentityList included in SIB1 and so on. NOTE 1.<br>ssac-BarringForMMTEL-Video<br>Service specific access class barring for MMTEL video originating calls.<br>ssac-BarringForMMTEL-Voice<br>Service specific access class barring for MMTEL voice originating calls.<br>udt-Restricting<br>Value TRUE indicates that the UE should indicate to the higher layers to restrict unattended data traffic TS 22.101 [77] irrespective of the UE being in RRC_IDLE or RRC_CONNECTED. The UE shall not indicate to the higher layers if the UE has one or more Access Classes, as stored on the USIM, with a value in the range 11 . . . 15, which is valid for the UE to use according to TS 22.011 [10] and TS 23.122 [11].<br>udt-RestrictingTime<br>If present and when the udt-Restricting changes from TRUE, the UE runs a timer for a period equal to rand * udt-RestrictingTime, where rand is a random number drawn that is uniformly distributed in the range 0 ≤ rand < 1 value in seconds. The timer stops if udt-Restricting changes to TRUE. Upon timer expiry, the UE indicates to the higher layers that the restriction is alleviated.<br>ul-Bandwidth<br>Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. NOTE 1.<br>ul-CarrierFreq<br>For FDD: If absent, the (default) value determined from the default TX-RX frequency separation defined in TS 36.101 [42, table 5.7.3-1] applies.<br>For TDD: This parameter is absent and it is equal to the downlink frequency. NOTE 1.<br>up-CIoT-EPS-Optimisation<br>This field indicates if the UE is allowed to resume the connection with User plane CIoT EPS Optimisation, see TS 24.301 [35].<br>useFullResumeID<br>This field indicates if the UE indicates full resume ID of 40 bits in RRCConnectionResumeRequest.<br>voiceServiceCauseIndication<br>Indicates whether UE is requested to use the establishment cause mo-VoiceCall for mobile originating MMTEL voice calls. |

```
-- ASN1START
SystemInformationBlockType14-r11 ::= SEQUENCE {
    eab-Param-r11                CHOICE {
        eab-Common-r11              EAB-Config-r11,
        eab-PerPLMN-List-r11        SEQUENCE (SIZE (1..maxPLMN-r11)) OF EAB-ConfigPLMN-r11
    }                                               OPTIONAL, -- Need OR
    lateNonCriticalExtension     OCTET STRING       OPTIONAL,
    ...
}
```

-continued

```
EAB-ConfigPLMN-r11 ::=        SEQUENCE {
    eab-Config-r11            EAB-Config-r11      OPTIONAL -- Need OR
}
EAB-Config-r11 ::=            SEQUENCE {
    eab-Category-r11          ENUMERATED {a, b, c},
    eab-BarringBitmap-r11     BIT STRING (SIZE (10))
}
-- ASN1STOP
```

| SystemInformationBlockType14 field descriptions |
|---|
| eab-BarringBitmap<br>Extended access class barring for AC 0-9. The first/leftmost bit is for AC 0, the second bit is for AC 1, and so on.<br>eab-Category<br>Indicates the category of UEs for which EAB applies. Value a corresponds to all UEs, value b corresponds to the UEs that are neither in their HPLMN nor in a PLMN that is equivalent to it, and value c corresponds to the UEs that are neither in the PLMN listed as most preferred PLMN of the country where the UEs are roaming in the operator-defined PLMN selector list on the USIM, nor in their HPLMN nor in a PLMN that is equivalent to their HPLMN, see TS 22.011 [10].<br>eab-Common<br>The EAB parameters applicable for all PLMN(s).<br>eab-PerPLMN-List<br>The EAB parameters per PLMN, listed in the same order as the PLMN(s) listed across the plmn-IdentityList fields in SystemInformationBlockType1. |

| Listing 2 |
|---|
| 1>if SystemInformationBlockType2 contains acdc-BarringPerPLMN-List and the acdc-BarringPerPLMN-List contains an ACDC-BarringPerPLMN entry with the plmn-IdentityIndex corresponding to the PLMN selected by upper layers (see TS 23.122 [11], TS 24.301 [35]):<br>  2>select the ACDC-BarringPerPLMN entry with the plmn-IdentityIndex corresponding to the PLMN selected by upper layers;<br>  2>in the remainder of this procedure, use the selected ACDC-BarringPerPLMN entry for ACDC barring check (i.e. presence or absence of access barring parameters in this entry) irrespective of the acdc-BarringForCommon parameters included in SystemInformationBlockType2;<br>1>else:<br>  2>in the remainder of this procedure use the acdc-BarringForCommon (i.e. presence or absence of these parameters) included in SystemInformationBlockType2 for ACDC barring check;<br>1>if upper layers indicate that the RRC connection is subject to EAB (see TS 24.301 [35]):<br>  2>if the result of the EAB check, as specified in 5.3.3.12, is that access to the cell is barred:<br>    3>inform upper layers about the failure to establish the RRC connection or failure to resume the RRC connection with suspend indication and that EAB is applicable, upon which the procedure ends;<br>1>if upper layers indicate that the RRC connection is subject to ACDC (see TS 24.301 [35]), SystemInformationBlockType2 contains BarringPerACDC-CategoryList, and acdc-HPLMNonly indicates that ACDC is applicable for the UE:<br>  2>if the BarringPerACDC-CategoryList contains a BarringPerACDC-Category entry corresponding to the ACDC category selected by upper layers:<br>    3>select the BarringPerACDC-Category entry corresponding to the ACDC category selected by upper layers;<br>  2>else:<br>    3>select the last BarringPerACDC-Category entry in the BarringPerACDC-CategoryList;<br>  2>stop timer T308, if running;<br>  2>perform access barring check as specified in 5.3.3.13, using T308 as "Tbarring" and acdc-BarringConfig in the BarringPerACDC-Category as "ACDC barring parameter";<br>  2>if access to the cell is barred:<br>    3>inform upper layers about the failure to establish the RRC connection or failure to resume the RRC connection with suspend indication and that access barring is applicable due to ACDC, upon which the procedure ends; |

Listing 2

```
1>else if the UE is establishing the RRC connection for mobile terminating calls:
   2>if timer T302 is running:
      3>inform upper layers about the failure to establish the RRC connection or failure
         to resume the RRC connection with suspend indication and that access barring
         for mobile terminating calls is applicable, upon which the procedure ends;
1>else if the UE is establishing the RRC connection for emergency calls:
   2>if SystemInformationBlockType2 includes the ac-BarringInfo:
      3>if the ac-BarringForEmergency is set to TRUE:
         4>if the UE has one or more Access Classes, as stored on the USIM, with a
            value in the range 11..15, which is valid for the UE to use according to TS
            22.011 [10] and TS 23.122 [11]:
NOTE 1:   ACs 12, 13, 14 are only valid for use in the home country and ACs 11, 15
are
            only valid for use in the HPLMN/ EHPLMN.
            5>if the ac-BarringInfo includes ac-BarringForMO-Data, and for all of these
               valid Access Classes for the UE, the corresponding bit in the ac-
               BarringForSpecialAC contained in ac-BarringForMO-Data is set to one:
               6>consider access to the cell as barred;
         4>else:
            5>consider access to the cell as barred;
   2>if access to the cell is barred:
      3>inform upper layers about the failure to establish the RRC connection or failure
         to resume the RRC connection with suspend indication, upon which the
         procedure ends;
1>else if the UE is establishing the RRC connection for mobile originating calls:
   2>perform access barring check as specified in 5.3.3.11, using T303 as "Tbarring" and
      ac-BarringForMO-Data as "AC barring parameter";
   2>if access to the cell is barred:
      3>if SystemInformationBlockType2 includes ac-BarringForCSFB or the UE does
         not support CS fallback:
         4>inform upper layers about the failure to establish the RRC connection or
            failure to resume the RRC connection with suspend indication and that access
            barring for mobile originating calls is applicable, upon which the procedure
            ends;
      3>else (SystemInformationBlockType2 does not include ac-BarringForCSFB and
         the UE supports CS fallback):
         4>if timer T306 is not running, start T306 with the timer value of T303;
         4>inform upper layers about the failure to establish the RRC connection or
            failure to resume the RRC connection with suspend indication and that access
            barring for mobile originating calls and mobile originating CS fallback is
            applicable, upon which the procedure ends;
1>else if the UE is establishing the RRC connection for mobile originating signalling:
   2>perform access barring check as specified in 5.3.3.11, using T305 as "Tbarring" and
      ac-BarringForMO-Signalling as "AC barring parameter";
   2>if access to the cell is barred:
      3>inform upper layers about the failure to establish the RRC connection or failure
         to resume the RRC connection with suspend indication and that access barring
         for mobile originating signalling is applicable, upon which the procedure ends;
1> else if the UE is establishing the RRC connection for mobile originating CS fallback:
   2>if SystemInformationBlockType2 includes ac-BarringForCSFB:
      3>perform access barring check as specified in 5.3.3.11, using T306 as "Tbarring"
         and ac-BarringForCSFB as "AC barring parameter";
      3>if access to the cell is barred:
         4>inform upper layers about the failure to establish the RRC connection or
            failure to resume the RRC connection with suspend indication and that access
            barring for mobile originating CS fallback is applicable, due to ac-
            BarringForCSFB, upon which the procedure ends;
   2>else:
      3>perform access barring check as specified in 5.3.3.11, using T306 as "Tbarring"
         and ac-BarringForMO-Data as "AC barring parameter";
      3>if access to the cell is barred:
         4>if timer T303 is not running, start T303 with the timer value of T306;
         4>inform upper layers about the failure to establish the RRC connection or
            failure to resume the RRC connection with suspend indication and that access
            barring for mobile originating CS fallback and mobile originating calls is
            applicable, due to ac-BarringForMO-Data, upon which the procedure ends;
1>else if the UE is establishing the RRC connection for mobile originating MMTEL
   voice, mobile originating MMTEL video, mobile originating SMSoIP or mobile
   originating SMS:
   2>if the UE is establishing the RRC connection for mobile originating MMTEL voice
      and SystemInformationBlockType2 includes ac-BarringSkipForMMTELVoice; or
   2>if the UE is establishing the RRC connection for mobile originating MMTEL video
      and SystemInformationBlockType2 includes ac-BarringSkipForMMTELVideo; or
```

Listing 2

2>if the UE is establishing the RRC connection for mobile originating SMSoIP or SMS and SystemInformationBlockType2 includes ac-BarringSkipForSMS:
    3>consider access to the cell as not barred;
  2>else:
    3>if establishmentCause received from higher layers is set to mo-Signalling (including the case that mo-Signalling is replaced by highPriorityAccess according to 3GPP TS 24.301 [35] or by mo-VoiceCall according to the subclause 5.3.3.3):
      4>perform access barring check as specified in 5.3.3.11, using T305 as "Tbarring" and ac-BarringForMO-Signalling as "AC barring parameter";
      4>if access to the cell is barred:
        5>inform upper layers about the failure to establish the RRC connection or failure to resume the RRC connection with suspend indication and that access barring for mobile originating signalling is applicable, upon which the procedure ends;
    3>if establishmentCause received from higher layers is set to mo-Data (including the case that mo-Data is replaced by highPriorityAccess according to 3GPP TS 24.301 [35] or by mo-VoiceCall according to the subclause 5.3.3.3):
      4>perform access barring check as specified in 5.3.3.11, using T303 as "Tbarring" and ac-BarringForMO-Data as "AC barring parameter";
      4>if access to the cell is barred:
        5>if SystemInformationBlockType2 includes ac-BarringForCSFB or the UE does not support CS fallback:
          6>inform upper layers about the failure to establish the RRC connection or failure to resume the RRC connection with suspend indication and that access barring for mobile originating calls is applicable, upon which the procedure ends;
        5>else (SystemInformationBlockType2 does not include ac-BarringForCSFB and the UE supports CS fallback):
          6>if timer T306 is not running, start T306 with the timer value of T303;
          6>inform upper layers about the failure to establish the RRC connection or failure to resume the RRC connection with suspend indication and that access barring for mobile originating calls and mobile originating CS fallback is applicable, upon which the procedure ends;
5.3.3.11      Access barring check
  1>if timer T302 or "Tbarring" is running:
    2>consider access to the cell as barred;
  1>else if SystemInformationBlockType2 includes "AC barring parameter":
    2>if the UE has one or more Access Classes, as stored on the USIM, with a value in the range 11..15, which is valid for the UE to use according to TS 22.011 [10] and TS 23.122 [11], and
  NOTE: ACs 12, 13, 14 are only valid for use in the home country and ACs 11, 15 are only valid for use in the HPLMN/EHPLMN.
    2>for at least one of these valid Access Classes the corresponding bit in the ac-BarringForSpecialAC contained in "AC barring parameter" is set to zero:
      3>consider access to the cell as not barred;
    2>else:
      3>draw a random number 'rand' uniformly distributed in the range: $0 \leq rand < 1$;
      3>if 'rand' is lower than the value indicated by ac-BarringFactor included in "AC barring parameter":
        4>consider access to the cell as not barred;
      3>else:
        4>consider access to the cell as barred;
  1>else:
    2>consider access to the cell as not barred;
  1>if access to the cell is barred and both timers T302 and "Tbarring" are not running:
    2>draw a random number 'rand' that is uniformly distributed in the range $0 \leq rand < 1$;
    2>start timer "Tbarring" with the timer value calculated as follows, using the ac-BarringTime included in "AC barring parameter":
      "Tbarring" = $(0.7 + 0.6 * rand) *$ ac-BarringTime;
5.3.3.12      EAB check
The UE shall:
  1>if SystemInformationBlockType 14 is present and includes the eab-Param:
    2>if the eab-Common is included in the eab-Param:
      3>if the UE belongs to the category of UEs as indicated in the eab-Category contained in eab-Common; and
      3>if for the Access Class of the UE, as stored on the USIM and with a value in the range 0..9, the corresponding bit in the eab-BarringBitmap contained in eab-Common is set to one:
        4>consider access to the cell as barred;
      3>else:
        4>consider access to the cell as not barred due to EAB;
    2>else (the eab-PerPLMN-List is included in the eab-Param):
      3>select the entry in the eab-PerPLMN-List corresponding to the PLMN selected by upper layers (see TS 23.122 [11], TS 24.301 [35]);

Listing 2

```
    3>if the eab-Config for that PLMN is included:
       4>if the UE belongs to the category of UEs as indicated in the eab-Category
          contained in eab-Config; and
       4>if for the Access Class of the UE, as stored on the USIM and with a value in
          the range 0..9, the corresponding bit in the eab-BarringBitmap contained in
          eab-Config is set to one:
          5>consider access to the cell as barred;
       4>else:
          5>consider access to the cell as not barred due to EAB;
    3>else:
       4>consider access to the cell as not barred due to EAB;
  1>else:
    2>consider access to the cell as not barred due to EAB;
5.3.3.13       Access barring check for ACDC
The UE shall:
  1>if timer T302 is running:
    2>consider access to the cell as barred;
  1>else if SystemInformationBlockType2 includes "ACDC barring parameter":
    2>draw a random number 'rand' uniformly distributed in the range: 0 ≤ rand < 1;
    2>if 'rand' is lower than the value indicated by ac-BarringFactor included in "ACDC
       barring parameter":
       3>consider access to the cell as not barred;
    2>else:
       3>consider access to the cell as barred;
  1>else:
    2>consider access to the cell as not barred;
  1>if access to the cell is barred and timer T302 is not running:
    2>draw a random number 'rand' that is uniformly distributed in the range 0 ≤ rand <
       1;
    2>start timer "Tbarring" with the timer value calculated as follows, using the ac-
       BarringTime included in "ACDC barring parameter":
       "Tbarring" = (0.7 + 0.6 * rand) * ac-BarringTime.
```

Embodiment 2

A second example embodiment and mode is illustrated with reference to the radio communications system 20-2 of FIG. 1-2, the access node 22-2 and wireless terminal 26-2 of FIG. 2-2, the access control program 64-2 of FIG. 3-2; and the access control procedure 65-2 of FIG. 4-2. FIG. 1-2 particularly shows a network architecture for the 5G network, where the core network is 5GCN, providing 5G services. In this case, the 5G gNB 22-2 is capable of connecting only to 5GCN (not to EPC). The UE 26-2 shown in FIG. 2-2 supports 5G features and may also support LTE/LTE-A capabilities. However, when connected to this gNB 22-2, the UE 26-2 may disable such LTE/LTE-A capabilities.

The access controller 60-2 of FIG. 2-2 is shown as making an access control decision using access control information included in broadcasted system information and an access category number. As described herein, the access category number is dependent upon both a type of access attempt and a condition related to the wireless terminal. Correspondingly, the system information generator 66 of FIG. 2-2 is shown as generating system information that includes access control information.

Figure 5A:
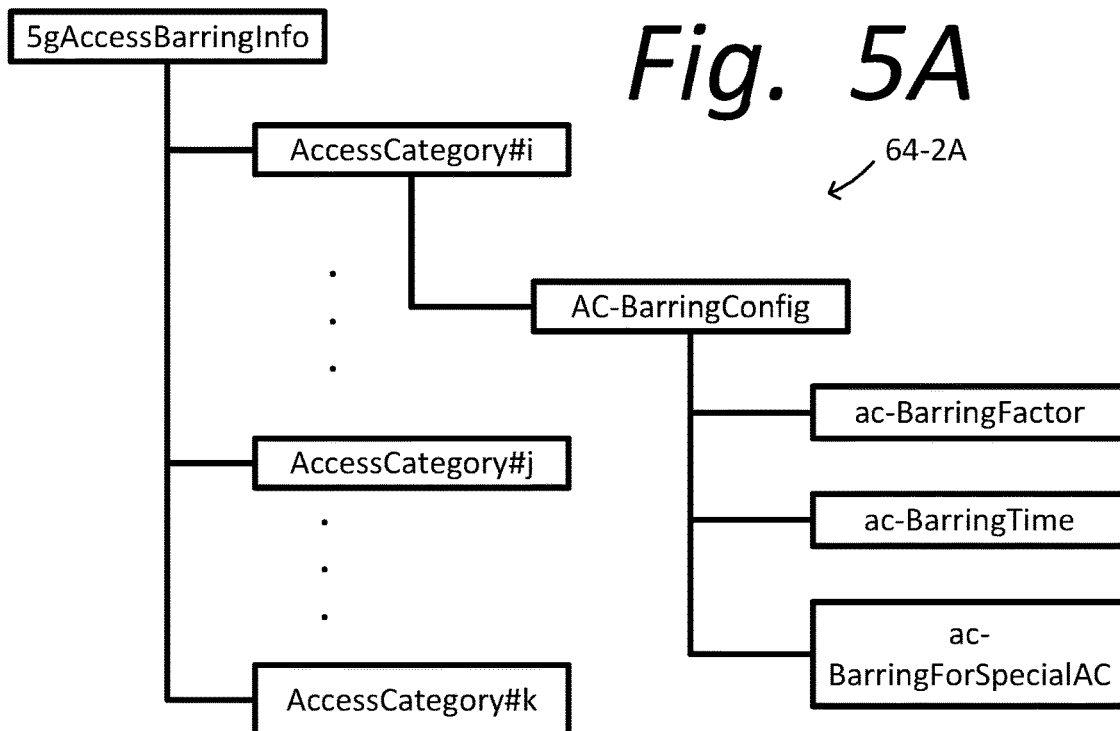
Figure 5B:
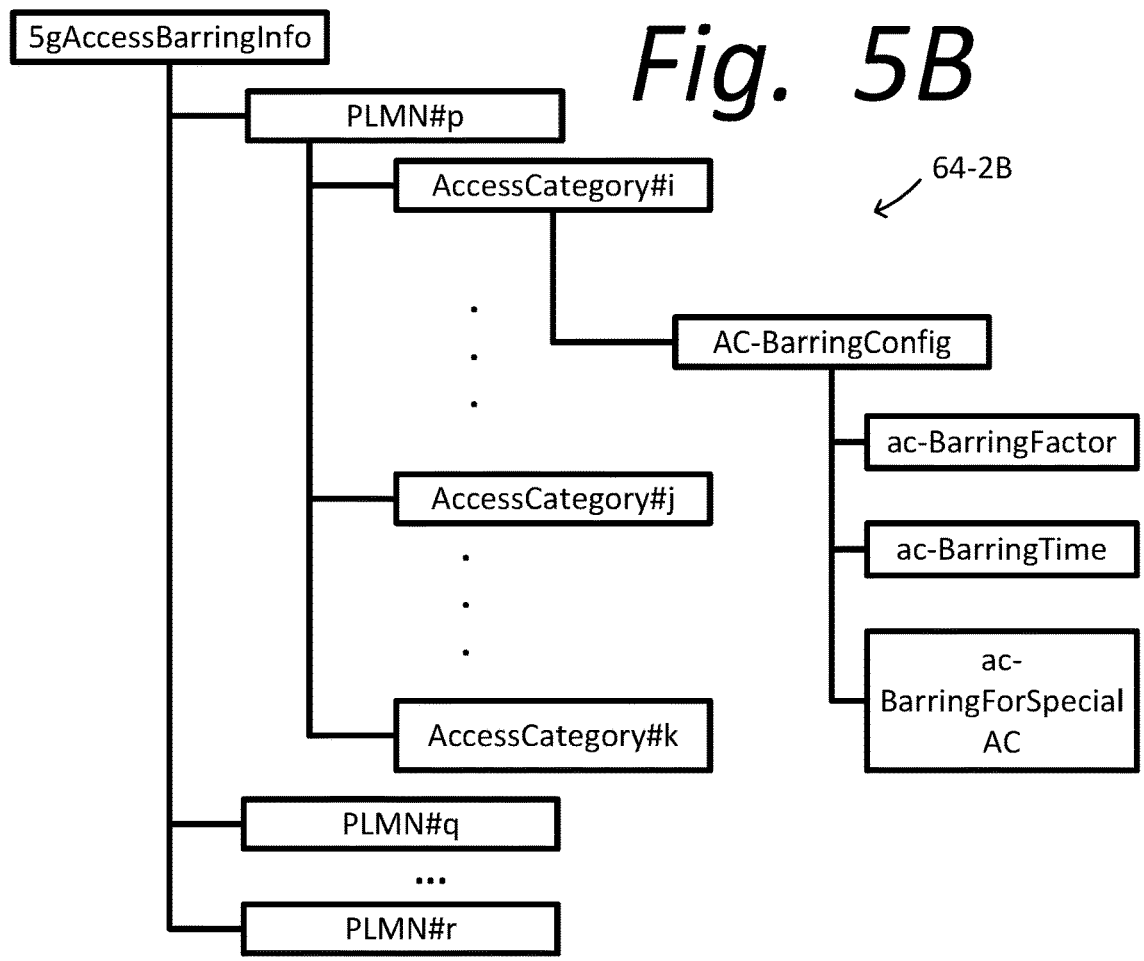

FIG. 3-2 shows that the access control program 62-2 executed by access controller 60-2 of FIG. 2-2 comprises 5G access control check main routine 70-2 and access barring check subroutine 72. The 5G access control check main routine 70-2 utilizes 5G access control information 64-2. Differing example, alternative formats of the 5G access control information 64-2 are shown in FIG. 5A, FIG. 5B, and FIG. 5C.

The access control program 62-2 shown in FIG. 3-2 for the second example embodiment and mode also includes categorization routine 80. The categorization routine 80 utilizes 5G category configuration information 82. In an example implementation, the 5G category configuration information 82 comprises both type of access attempt information and information concerning conditions related to the UE (wireless terminal). Table 1-1 below shows a generic implementation of the 5G category configuration information 82, while Table 1-2 below shows a specific example implementation of the generic Table 1-1 with sample entries for the type of access attempts and the conditions related to the UE.

In more detail, the access control procedure 65-2 performed upon execution of the 5G access control check main routine 70-2 is shown in FIG. 4-2. As act 4-2-0, an indication of an access attempt is received by the access control program 62-2. As used herein, an indication of an access attempt may be received when an access attempt is generated for any reason, such as (for example) by an application (stored in applications memory 58), e.g., upon requesting a service or connection for performance of the application, or for other reason associated with operation of the wireless terminal 26-2 (such as, for example, a tracking area update). Upon receiving an access attempt, as act 4-2-1 the categorization routine 80 categorizes the access attempt using the 5G category configuration information 82. In an example implementation, the categorization routine 80 uses both the type of access attempt information and information concerning conditions related to the UE as understood with reference, for example, to Table 1-1 and Table 1-2. As a result of act 4-2-1, the categorization routine 80 outputs an access category number. As act 4-2-2 the 5G access control check main routine 70-2 uses both the access category number and the access control information 64-2 to determine whether the access attempt is barred. If the decision of act 4-2-2 is that the access request is not barred, then as act 4-2-3 the access is permitted, e.g., not barred. Otherwise, if the decision of act 4-2-2 is that the access request is barred, then as act 4-2-4 the access is not permitted.

If the access control check of act 4-2-2 results in "access to the cell as barred" (reflected by act 4-2-4), the wireless terminal may stop the access attempt. In some implementations in which the wireless terminal RRC performs the access barring check upon receipt of an access attempt (connection establishment request) from the upper layer (e.g. Non-Access Stratum (NAS)), and the RRC responses back to the upper layer with the result of the access check, the upper layer may suspend the service request that has triggered the access attempt, while the wireless terminal may stay in the current serving cell and may apply normal cell reselection process. The service request procedure may be started if it is still necessary when the access attempt for is granted (e.g. change on access control information in the system information) or because of a cell change.

As mentioned above, Table 1-1 is a generic structure of the 5G access category configuration information 82. In Table 1-1, the column "type of access attempt" specifies the classification of the access attempt (such as, for sake of example, "emergency call", and "mobile-originated signaling") and the column "Conditions related to UE" may indicate any additional conditions that apply to classify the access attempt. When an access attempt is generated, the UE may use a table such as Table 1-1 or Table 1-2 to determine the access category by finding the suitable access category number whose "Conditions related to UE" and "Type of access attempt" both match.

TABLE 1-1

| Access category number | Conditions related to UE | Type of access attempt |
|---|---|---|
| 0 | (condition for access category 0) | (attempt type for access category 0) |
| 1 | (condition for access category 1) | (attempt type for access category 1) |
| 2 | (condition for access category 2) | (attempt type for access category 2) |
| 3 | (condition for access category 3) | (attempt type for access category 3) |
| 4 | (condition for access category 4) | (attempt type for access category 4) |
| 5 | (condition for access category 5) | (attempt type for access category 5) |
| ... | | |
| N | (condition for access category n) | (attempt type for access category n) |

The operation of categorizing an access attempt may be explained using an exemplary implementation of the 5G access category configuration information shown in Table 21-2. Suppose, for example, that the access attempt is a short message service (SMS), that the UE is not configured for delay tolerant service, and the Access Class of the UE is 5. In such case the Access category number is 7. As another example case, if the access attempt is for an emergency call and one of the Access Classes is 11, then the Access category number is 1.

TABLE 1-2

| Access category number | Conditions related to UE | Type of access attempt |
|---|---|---|
| 0 (NOTE 1) | All | MO signalling resulting from paging |
| 1 (NOTE 2) | One or some of Access Classes 11-15 are set. At least one of them is valid in the registered PLMN and justified its priority handling by the registered PLMN with regards to access control. | All |
| 2 (NOTE 3) | UE is configured for delay tolerant service and subject to access control for access category 2, which is judged based on relation of UE's HPLMN and the registered PLMN. | All |
| 3 | All except for the cases of access categories 1-2. | Emergency |
| 4 | All except for the cases of access categories 1-2. | MO signalling |
| 5 | All except for the cases of access categories 1-2. | MMTEL voice |
| 6 | All except for the cases of access categories 1-2. | MMTEL video |
| 7 | All except for the cases of access categories 1-2. | SMS |
| 8 | All except for the cases of access categories 1-2. | MO data that do not belong to any other access categories |
| 9-31 | | Reserved standardized access categories |

TABLE 1-2-continued

| Access category number | Conditions related to UE | Type of access attempt |
|---|---|---|
| 32-63 | All except for the cases of access categories 1-2 and except for roaming-UEs | Based on operator classification |

(NOTE 1):
Access category 0 is not barred.
(NOTE 2):
Access Classes 11 and 15 are valid in Home PLMN only if the EHPLMN list is not present or in any EHPLMN. Access Classes 12, 13 and 14 are valid in Home PLMN and visited PLMNs of home country only. For this purpose the home country is defined as the country of the MCC part of the IMSI. If the barring control information contains flag for "unbarred" for at least one of these valid Access Classes, all access attempts from the UE require priority handling and fall into access category 1. Otherwise the UE does not require priority handling with regards to access control and other access categories apply. Access category 1 is not barred.
(NOTE 3):
The barring parameter for access category 2 is accompanied with information on whether the access control applies to UEs registered in UE's HPLMN/EHPLMN, the most preferred VPLMN, or other PLMNs.

In the case there are more than one access category match, in one non-limiting example configuration, the UE 26-2 may choose the one in the highest order (e.g., listed earlier/higher in the Table 1-2, e.g., with smallest access category number), or alternatively the lowest order in the Table 1-2 (e.g., with the greatest access category number). In this case, choosing either the highest or lowest may be pre-configured or configured by the network through broadcast signal (such as System Information).

The UE 26-2 may then further perform AC Check shown as act 4-2-2 in FIG. 4-2 to determine whether the Access category is barred at this moment. In order to do so, the UE 26-2 may have already received 5G access control information 64-2 broadcasted by the gNB via System Information.

As used herein, the 5G access control information 64-2 is also known as 5gAccessBarringInfo. FIG. 5A shows a first example configuration of 5G access control information 64-2A wherein each access category that is subject to barring is associated with the access barring configuration (AC-BarringConfig). The access barring configuration (AC-BarringConfig) includes the ac-barring parameters such as ac-BarringFactor, ac-BarringTime, and ac-BarringForSpecialAC, all as previously described.

Only the access category numbers that are potentially subject to barring are included in the access control information 64-2: any access category that is not potentially subject to barring is not included. For example, FIG. 5A shows that each of AccessCategory # i, AccessCategory # j, and AccessCategory # k may be potentially subject to barring. It should be understood that for FIG. 5A each of AccessCategory # j, and AccessCategory # k have the AC-BarringConfig information elements in the same manner as shown in the tree like structure for AccessCategory # i, but with barring values for the respective AccessCategory # j, and AccessCategory # k.

By "potentially subject to barring" is meant that the access category may or may not be barred depending on the evaluation of the subroutine (access barring check subroutine 72) that may be invoked by the 5G access control check main routine 70-2. As such, whether the access category is barred may in turn depend on the ac-barring parameters such as ac-BarringFactor, ac-BarringTime, and ac-BarringForSpecialAC as evaluated by the appropriate subroutine. For example, when the determined access category is one of the access categories listed in the 5gAccessBarringInfo, the UE may apply (for example) the associated access barring configuration, per "5.3.3.11 Access barring check" in Listing 2 as discussed in conjunction with embodiment 1.

In view of the foregoing, it will be appreciated that access node 22-2 of FIG. 2-2 may generate access control information in a particular format. In particular, the system information generator 66 of access node 22-2 may generate an access control information element (e.g., AC-BarringConfig) comprising access control information. The access control information element may comprise: one or more access category numbered information elements (e.g., AccessCategory # i, AccessCategory # j, and AccessCategory # k) which identify respective one or more access categories which are subject to potential barring from access; and for each access category numbered information element, one or more access control parameter information elements (e.g., ac-BarringFactor, ac-BarringTime, and ac-BarringForSpecialAC) configured to be used for evaluation by a wireless terminal in making an access control decision. The node transmitter 34 is configured to transmit the access control information element over the radio interface to the wireless terminal 26-2.

In one network deployment configuration, the gNB/RAN may be shared by more than one operator. In order to support independent access control scheme for each operator, 5gAccessBarringInfo may be constructed in the manner shown in FIG. 5B, where for each Public Land Mobile Network (PLMN) identifying a network operator, barred access categories and associated access barring configurations are specified. Thus, in FIG. 5B, a first or upper tier grouping is based on PLMN number and the second tier grouping is based on access category number. FIG. 5B shows information elements for each of PLMN # p, PLMN # q, and PLMN # r. It should be understood that for FIG. 5B each of PLMN # p, PLMN # q, and PLMN # r have an associated one or more access category information elements, such as AccessCategory # i, AccessCategory # j, and AccessCategory # k shown only for PLMN # p. The access category numbers associated with different PLMNs may be different, but the same type of tree structure is applicable.

FIG. 5B thus illustrates that the access control information may comprise identifiers of plural public land mobile network (PLMN) identifiers, and that the one or more access category numbered information elements may be associated with one of the PLMN identifiers. FIG. 5B particularly shows that the one or more access category numbered information elements are associated with one of the PLMN identifiers by being sub-information elements of information elements for the respective PLMN identifiers.

FIG. 5C is an alternative implementation of FIG. 5B, wherein a first or upper tier grouping is based on access category number and the second tier grouping is based on PLMN number. It should be understood that for FIG. 5C each of AccessCategory # i, AccessCategory # j, and AccessCategory # k have an associated one or more access category information elements, such as PLMN # p, PLMN # q, and PLMN # r. Again, the PLMN numbers associated with different access categories may be different, but the same type of tree structure is applicable. FIG. 5C thus illustrates that the one or more access category numbered information elements are associated with one of the PLMN identifiers by information elements for the respective PLMN identifiers being sub-information elements of a respective one of the one or more access category numbered information elements.

The 5G gNB 22-2 may broadcast the 5gAccessBarringInfo information element shown in FIG. 5A, FIG. 5B, or FIG. 5C on its 5G (also referred as New Radio) radio interface. In one non-limiting example implementation, the 5gAccessBarringInfo information element may comprise (e.g., be a part of or included in) a SIB which may or may not be dedicated to access barring purposes. In another example non-limiting implementation the 5gAccessBarringInfo information element may comprise an independent SIB (SIBx) dedicated to access barring purposes.

Figure 6:
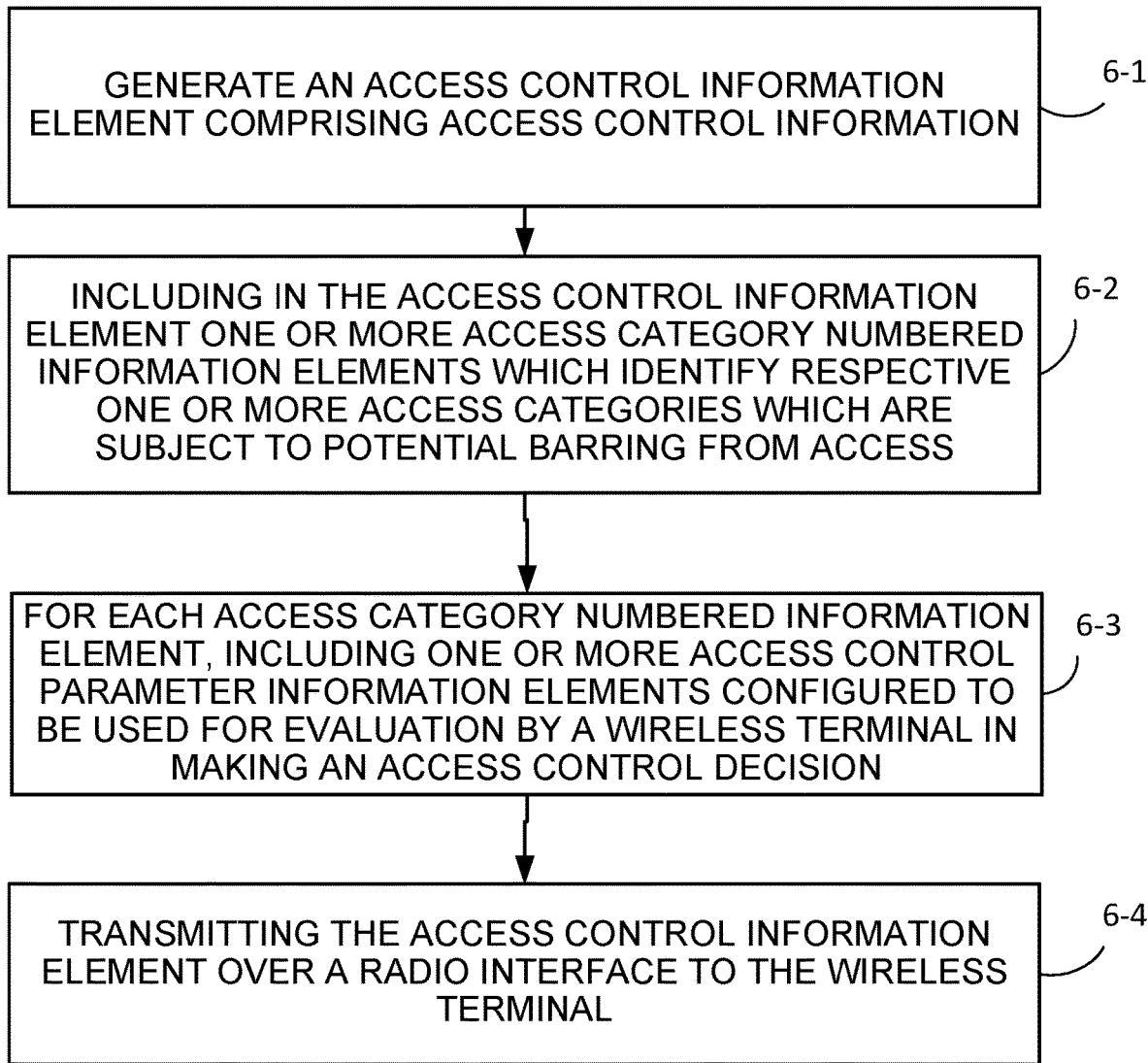
FIG. 6 is a flowchart showing basic, representative acts or steps performed by a 5G access node in accordance with the example embodiment and mode of FIG. 1-2, and particularly for generating an access control information element.

FIG. 6 shows basic, representative acts or steps performed by a 5G access node 22-2 in accordance with the example embodiment and mode of FIG. 1-2, and particularly for generating an access control information element. Act 6-1 comprises using processor circuitry (e.g., node processor 30) to generate an access control information element comprising access control information. Act 6-2 comprises including in the access control information element one or more access category numbered information elements which identify respective one or more access categories which are subject to potential barring from access. Act 6-3 comprises, for each access category numbered information element, including one or more access control parameter information elements configured to be used for evaluation by a wireless terminal in making an access control decision. Act 6-4 comprises transmitting the access control information element over a radio interface to the wireless terminal 26-2.

Embodiment 3

A third example embodiment and mode is illustrated with reference to the radio communications system 20-3 of FIG. 1-3, the access node 22-3 and wireless terminal 26-3 of FIG. 2-3, the access control program 64-3 of FIG. 3-3; and the access control procedure 65-3 of FIG. 4-3. FIG. 1-3 particularly shows a network architecture for embodiment 3, where the core network is 5GCN, providing 5G services. In this case, the LTE eNB 22-3 supports the LTE/LTE-A radio interface and is able to connect to 5GCN 21-3 (and thus also serves as eNB-5G). The UE 26-3 camping on this eNB-5G supports 5G protocols necessary for services provided by the 5GCN core network 21-3. In order to prevent UEs not supporting the 5G features/protocols from camping on this eNB-5B, the eNB-5G may transmit an indication of supported core network (e.g. EPC or 5GCN) via a broadcasted manner (e.g. in Master Information Block (MIB) or in at least one SIB) so that the UE that does not support 5G may be motivated to seek an LTE cell instead.

In the network configuration of FIG. 1-3 and in Embodiment 3, due to the core network capabilities, the 5G (unified) access control scheme disclosed in Embodiment 2 may be used. Namely, the eNB-5G 22-3 may broadcast the 5gAccessBarringInfo information element shown in FIG. 5A, FIG. 5B, or FIG. 5C on its LTE/LTE-A radio interface. In one configuration, the information element is a part of an existing LTE/LTE-A SIB, such as SIB2. In another configuration, it is included in an independent SIB (SIBx), e.g., another SIB, such as an SIB which is dedicated for access control information including access barring information. The UE procedure for receiving the SIB and the actions on an access attempt may be the same as described in Embodiment 2.

Like the second embodiment, the access controller 60-3 of FIG. 2-3 is shown as making an access control decision using access control information included in broadcasted system information and an access category number. As described herein, the access category number is dependent upon both a type of access attempt and a condition related to the wireless terminal.

FIG. 3-3 shows that the wireless terminal 26-3 of FIG. 2-3 may execute a network detection routine 84 to determine to which and what type of network the wireless terminal 26-3 is in communication. Execution of the network detection routine 84 may comprise receipt of an indication of supported core network (e.g. EPC or 5GCN) via a broadcasted manner (e.g. in Master Information Block (MIB) or in at least one SIB) from the eNB-5G.

The access control procedure 65-3 of FIG. 4-3 is essentially the same as the access control procedure 65-2 of FIG. 4-2. The acts of FIG. 4-3 are identified as 4-3-*x*, but are essentially the same as the acts 4-2-*x* of FIG. 4-2.

Embodiment 4

A fourth example embodiment and mode is illustrated with reference to the radio communications system 20-4 of FIG. 1-4, the access node 22-4 and wireless terminal 26-4-eLTE of FIG. 2-3, the access control program 64-4 of FIG. 3-4; and the access control procedure 65-4 of FIG. 4-4. FIG. 1-4 particularly shows the network architecture of the fourth embodiment, where the eNB-5G 22-4 is connected to both EPC CN 21-4-EPC and 5GCN 21-4-5GCN. Similar to Embodiment 3, the eNB-5G 22-4 may broadcast (e.g. in MIB or SIB) the indication of supported core networks (indicating support of both EPC and 5GCN). In some example, non-limiting configurations, the EPC CN 21-4-EPC and the 5GCN 21-4-5GCN shown in FIG. 1-4 may belong to different PLMNs. In other example, non-limiting configurations, the EPC CN 21-4-EPC and the 5GCN 21-4-5GCN shown in FIG. 1-4 may belong to a same PLMN.

In this embodiment, the eNB-5G 22-4 may broadcast the EPC access control information, such as SIB2 and/or SIB14 disclosed in the Embodiment 1, in order to support access control for EPC. In parallel, the eNB-5G 22-4 may also broadcast the 5G access category configuration information as disclosed in Embodiment 2 in order to support access control for 5GCN. Accordingly, to illustrate the parallel broadcast of different types of system information, the system information generator 66 of FIG. 2-4 as shown as comprising LTE system information generator 66-LTE and 5G system information generator 66-5G. The LTE system information may be included in an existing LTE/LTE-A SIB (e.g. SIB2). As described in Embodiment 3, the 5G access category configuration information may be incorporated into an existing LTE/LTE-A SIB (e.g. SIB2) or may be included in an independent SIB (SIBx).

As shown in FIG. 1-4, two types of UEs or wireless terminals that may camp on eNB-5G 22-4: UEs that support only EPC (such as UE 26-4-LTE of FIG. 1-4) and UEs that support both EPC and 5GCN (such as UE 26-4-eLTE of FIG. 1-4). Of these two UE types, the LTE-UE 26-4-LTE may be able to camp on the eNB-5G but may be able to receive only services from EPC. For this reason, the LTE-UE 26-4-LTE may process only the EPC access control information and follow the UE procedure upon an arrival of an access attempt as specified in Embodiment 1. On the other hand, due to its dual core network connectivity, the UE 26-4-eLTE may be subject to access control from either or both of EPC core network 21-4-EPC and core network 21-4-5GCN. Therefore, the wireless terminal 26-4-eLTE may process the EPC access control information as well as the 5G access category configuration information (for 5GCN). The access control program 62-4 of FIG. 3-4 and the access control procedure 65-4 of FIG. 4-4 described herein are thus program and procedure executed/performed by wireless terminal 26-4-eLTE.

The access controller 60-4 of the wireless terminal 26-4-eLTE of FIG. 2-4 is shown as making an aggregated access control decision. FIG. 3-4 shows that the access control program 62-4 executed by access controller 60-4 of FIG. 2-4 comprises the access control program 62-1 (shown in FIG. 3-1, which is an access control program for EPC), the access control program 62-2 (shown in FIG. 3-1, which is an access control program for 5G), and multicore network aggregated access control routine 90 (described below).

The access control procedure 65-1 performed upon execution of the access control program 62-4 of FIG. 3-4 is shown in FIG. 4-4. As act 4-4-1, an indication of an access attempt is received by access control program 62-4. As used herein, an indication of an access attempt may be received when an access attempt is generated for any reason, such as (for example) by an application (stored in applications memory 58), e.g., upon requesting a service or connection for performance of the application, or for other reason associated with operation of the wireless terminal 26 (such as, for example, a tracking area update). Upon receiving an access attempt, the access control program 62-4 executes both act 4-4-2 and 4-4-3, in parallel (either essentially simultaneously or consecutively). Act 4-4-2 comprises executing the EPC access control program 62-1; act 4-4-3 comprises executing the 5G access control program 62-2. Execution of the EPC access control program 62-1 results in an EPC access control decision, which EPC access control decision is either "barred" or "not barred". Likewise, execution of the 5G access control program 62-2 results in a 5G access control decision, which 5G access control decision is either "barred" or "not barred". Act 4-4-4 comprises execution of the multi core network aggregated access control routine 90. Execution of the multicore network aggregated access control routine 90 utilizes as inputs both the EPC access control decision and the 5G access control decision, and possibly/optionally other inputs (e.g., configured parameter(s) or configured information).

FIG. 4-4 thus illustrates the procedure for the wireless terminal 26-4-eLTE upon an arrival of an access attempt, wherein the access attempt is evaluated by two branches, the AC procedure for EPC (Embodiment 1) as act 4-4-2 and the AC procedure for 5GCN (Embodiment 2) as act 4-4-3. For this purpose, the wireless terminal 26-4-eLTE may have been pre-configured with the 5G access category configuration information as disclosed in Embodiment 2.

For such an access attempt, each of those two branches, e.g., access control program 62-1 of act 4-4-2 and access control program 62-2 of act 4-4-3, may generate their respective access decisions, such as access allowed (not barred) or access not allowed (barred). The decisions from the two branches may be fed into the multi core network aggregated access control routine 90, so that act 4-4-4 of FIG. 4-4 is performed in order to generate an aggregated access control decision.

There are the following four cases for the input of the Multi core network access decision:
Case 1: Barred both by EPC and 5GCN
Case 2: Barred by EPC, not barred by 5GCN
Case 3: Not barred by EPC, barred by 5GCN
Case 4: Not barred by either EPC or 5GCN In case of Case 1, the access attempt is barred. The wireless terminal 26-4-eLTE may cancel or postpone the attempt.

For Case 2 or Case 3, in one non-limiting example implementation, the 26-4-eLTE may fallback to whichever network allowed the access and proceed to initiating access through that allowing network. In another configuration, the wireless terminal 26-4-eLTE may be configured with a set of configuration parameters to determine if the allowed network is suitable. For example, access attempts for certain types of applications/services may be only available in 5GCN (or EPC). In this case, the configuration parameters may instruct the wireless terminal 26-4-eLTE the suitability of the core network per application/service. If suitable, the wireless terminal 26-4-eLTE may proceed in initiating access through that allowing network, otherwise, it may consider the access attempt is barred.

For Case 4, in one non-limiting example configuration, the choice of the core network may be pre-configured in the wireless terminal 26-4-eLTE. For instance, the wireless terminal 26-4-eLTE may automatically choose to access 5GCN (or EPC). In another example implementation, another set of configuration parameters may indicate the priorities of the core networks. In some example implementations, this set of configuration parameters may be also per application/service as described above.

The configuration parameters for Case 2, 3 or 4 may be preloaded into the wireless terminal 26-4-eLTE or transmitted (broadcast or unicast) by eNG-5G.

Thus, the terminal processor 40 (e.g., access controller 60-4) of wireless terminal 26-4-eLTE is configured to perform a first access control procedure configured for a first core network and to obtain therefrom a first access control decision; perform a second access control procedure configured for a second core network and to obtain therefrom a second access control decision; and then make an aggregated access control decision dependent at least in part on the first access control decision and the second access control decision, the aggregated access control decision determining an appropriate one of the first core network and the second core network. For example, with reference to FIG. 4-4 as a non-limiting example, the first access control procedure may result from execution of the LTE access control program 62-1 (e.g., act 4-4-2) and the first access control decision may an LTE access control decision of either barred or not barred; the second access control procedure may result from execution of the 5G access control program 62-2 (e.g., act 4-4-3) and the second access control decision may a 5G access control decision of either barred or not barred; and the aggregated access control decision may be obtained upon execution of multicore network aggregated access control routine 90. The terminal transmitter 44 of wireless terminal 26-4-eLTE is configured to transmit, over a radio interface, an access request to the appropriate core network.

It should be understood that, although FIG. 1-4 shows the first core network is being a 4G LTE core network and the second core network as being a 5G core network, that the network selection of the technology disclosed herein is not limited to any specific one or more types networks, but that the technology disclosed herein may be applicable to other types of existing or here-after developed core networks.

As understood from FIG. 4-4, and particularly the discussion of case 2 and case 3 above, when one of the first access control decision and the second access control decision is a negative decision and another of the first access control decision and the second access control decision is a positive decision (e.g., a case 2 or case 3 split decision), the access controller 60-4 is configured to make the aggregated access control decision to initiate the access request to whichever of the first core network and the second core network is the appropriate core network as indicated by the positive decision. Moreover, in a split decision situation such as case 2 or case 3, the access controller 60-4 may make the aggregated access control decision not only on the first access control decision and the second access control decision, but may also make the aggregated access control decision based on a parameter configured at the wireless terminal. For example, such parameter configured at the wireless terminal may indicate whether the appropriate core network, although passing the case 2/case 3 analysis, is nevertheless suitable for the access request. As mentioned above, it may be that, under certain circumstances, although one of the EPC access control program 62-1 and the 5G access control program 62-2 indicates that their respective core networks are appropriate, the configured parameter may nevertheless preclude or override sending an access request to the supposedly appropriate network at this particular point in time. Such preclusion or override may be based, for example, upon whether the appropriate core network is suitable for a service or application associated with the access request.

The multi core network aggregated access control routine 90 and act 4-4-4 may use configuration information for case 4 as well, e.g., when both the first access control decision and the second access control decision are positive decisions. For case 4 the access controller 60-4 upon executing the multi core network aggregated access control routine 90 as act 4-4-4 may make the aggregated access control decision based at least in part on configuration information. For example, as act 4-4-4 the access controller 60-4 may make the aggregated access control decision based on configuration information which indicates a relative priority of the first core network and the second core network. As a non-limiting example, when the first core network is a 4G LTE core network and the second core network is a 5G core network, the configuration information utilized by multicore network aggregated access control routine 90 in act 4-4-4 may indicate that the 5G core network is to be selected as the appropriate core network over the 4G core network.

As indicated above and illustrated in FIG. 3-4, the access control program 62-4 of embodiment 4 executes both the EPC access control program 62-1 and the 5G access control program 62-2. The access control program 62-4 may perform the first access control procedure (e.g., EPC access control program 62-1) using access control barring parameters, with the access control barring parameters being obtained from broadcasted system information obtained from the first core network (as described in embodiment 1). The access control program 62-4 perform the second access control procedure (e.g., 5G access control program 62-2) using access control information included in broadcasted system information and an access category number, with the access category number being dependent upon both a type of access attempt and a condition related to the wireless terminal (as described in embodiment 2).

It should be noted that the procedure illustrated in FIG. 4-4 may be implemented in a different manner but logically equivalent. Specifically, upon arrival of an access attempt 4-4-1, a first access procedure (one of the access procedures, act 4-4-2 or act 4-4-3) may be selected and performed, and then if the decision is positive (not barred), the wireless terminal 26-4-eLTE may proceed to initiating the access request to the core network corresponding the first access procedure. The wireless terminal 26-4-eLTE may perform the second access procedure (the access procedure not selected for the first access procedure) only if the first access procedure results in a negative decision. If the second access procedure results in a positive decision, the wireless terminal 26-4-eLTE may proceed to initiating the access request to the core network corresponding the second access procedure. Otherwise, the access attempt 4-4-1 may be considered to be barred. In one configuration, the order of performing the access procedures for multiple core networks may be pre-configured, or configured by eNB-5G 22-4 transmitting (unicast or broadcast) a set of configuration parameters. In addition, in some configuration the wireless terminal 26-4-eLTE may be pre-configured or configured by eNB-5G 22-4 to use a subset of the access control procedures for making an access control decision. In this case, the access control decision may be made only by the access control procedure(s) in this subset.

Figure 7:
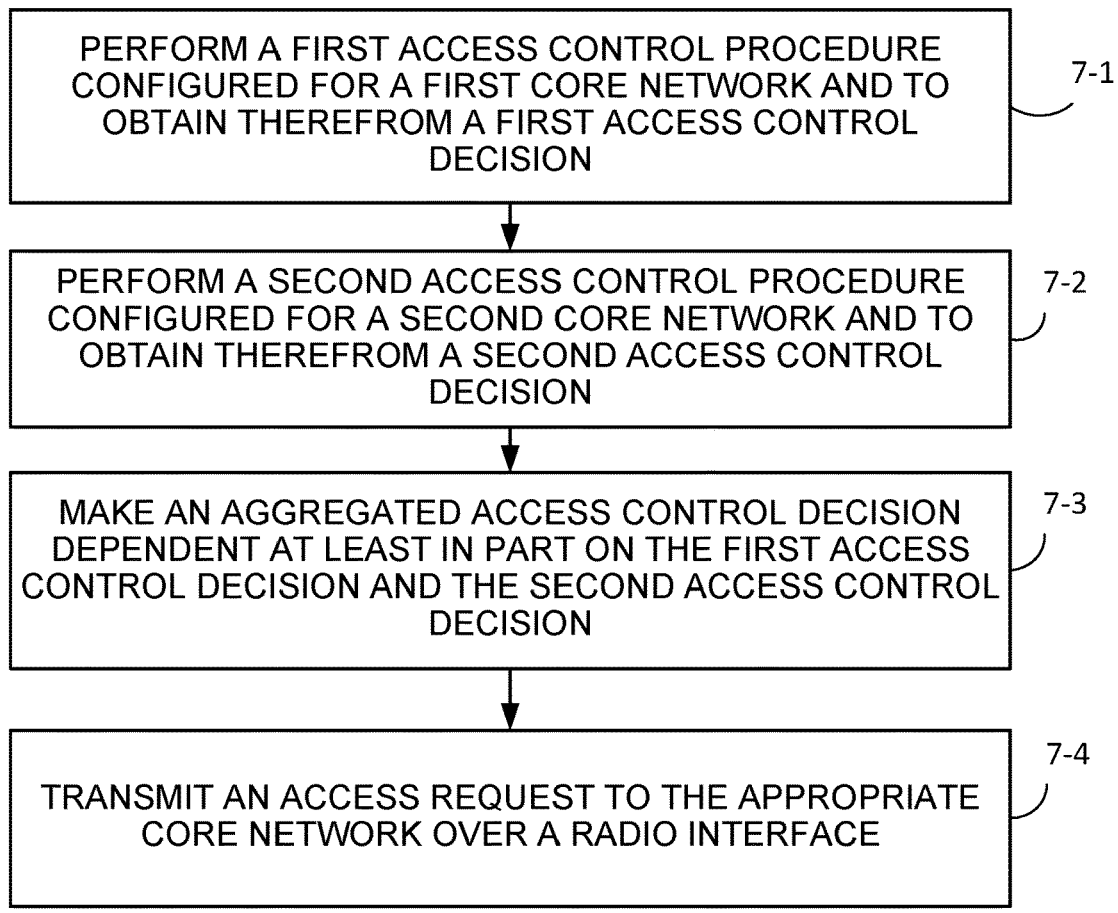
FIG. 7 is a flowchart showing basic, representative acts or steps performed by an eLTE wireless terminal in accordance with the example embodiment and mode of FIG. 1-4.

FIG. 7 shows example, representative acts or steps performed by the wireless terminal 26-4-eLTE in an example embodiment and mode. Act 7-1 comprises performing a first access control procedure configured for a first core network and to obtain therefrom a first access control decision. See, for example, act 4-4-2 of FIG. 4-4. Act 7-2 comprises performing a second access control procedure configured for a second core network and to obtain therefrom a second access control decision. See, for example, act 4-4-3 of FIG. 4-4. Act 7-3 comprises making an aggregated access control decision dependent at least in part on the first access control decision and the second access control decision, See, for example, act 4-4-4 of FIG. 4-4. The aggregated access control decision determines an appropriate one of the first core network and the second core network. Act 7-1 through act 7-3 may be performed by the processor circuitry of wireless terminal 26-4-eLTE, e.g., by access controller 60-4. Act 7-4 comprises transmitting, over a radio interface, an access request to the appropriate core network. The representative acts or steps of FIG. 7 are described as being performed by the wireless terminal 26-4-eLTE, but it should be understood that these basic acts or steps may be performed by any wireless terminal which is making an access control decision when any two or more core networks are involved. That is, the acts of FIG. 7 may be performed in conjunction with an access control decision between any two core networks, not just between LTE and 5G core networks.

In some example, non-limiting configurations, the procedure and mode disclosed in the fourth embodiment may be applicable when the UE registers to both EPC and 5GCN (dual registration).

Features of any one or more of the example embodiments and modes described herein may be combined with any other example embodiment(s) and mode(s) described herein.

Embodiment 5

A fifth example embodiment and mode is illustrated with reference to the radio communications system 20-5 of FIG. 1-5; the access node 22-5 and wireless terminal 26-5 of FIG.

Figures 1, 2, 3, 4, 5:
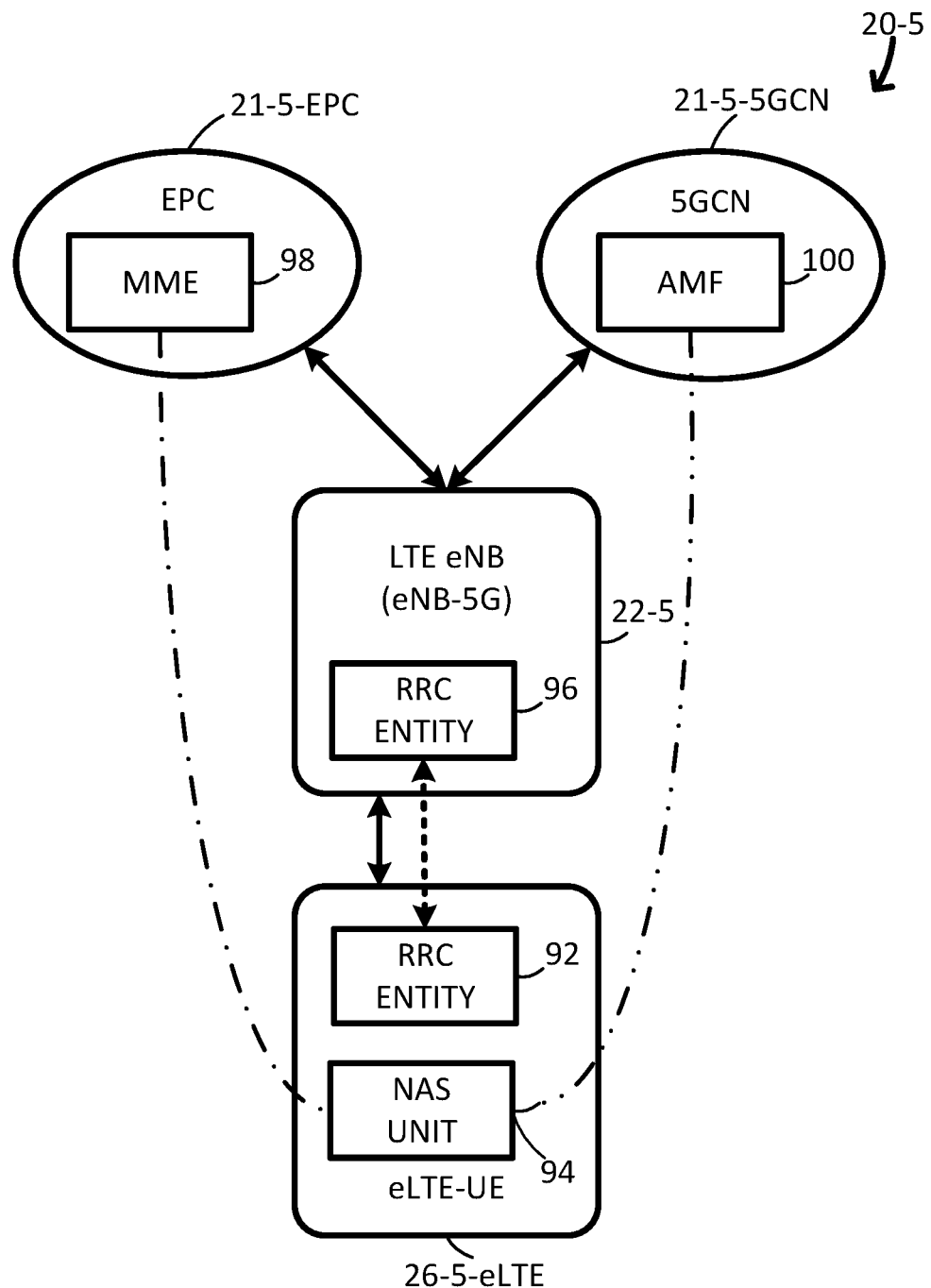
Figure 2:
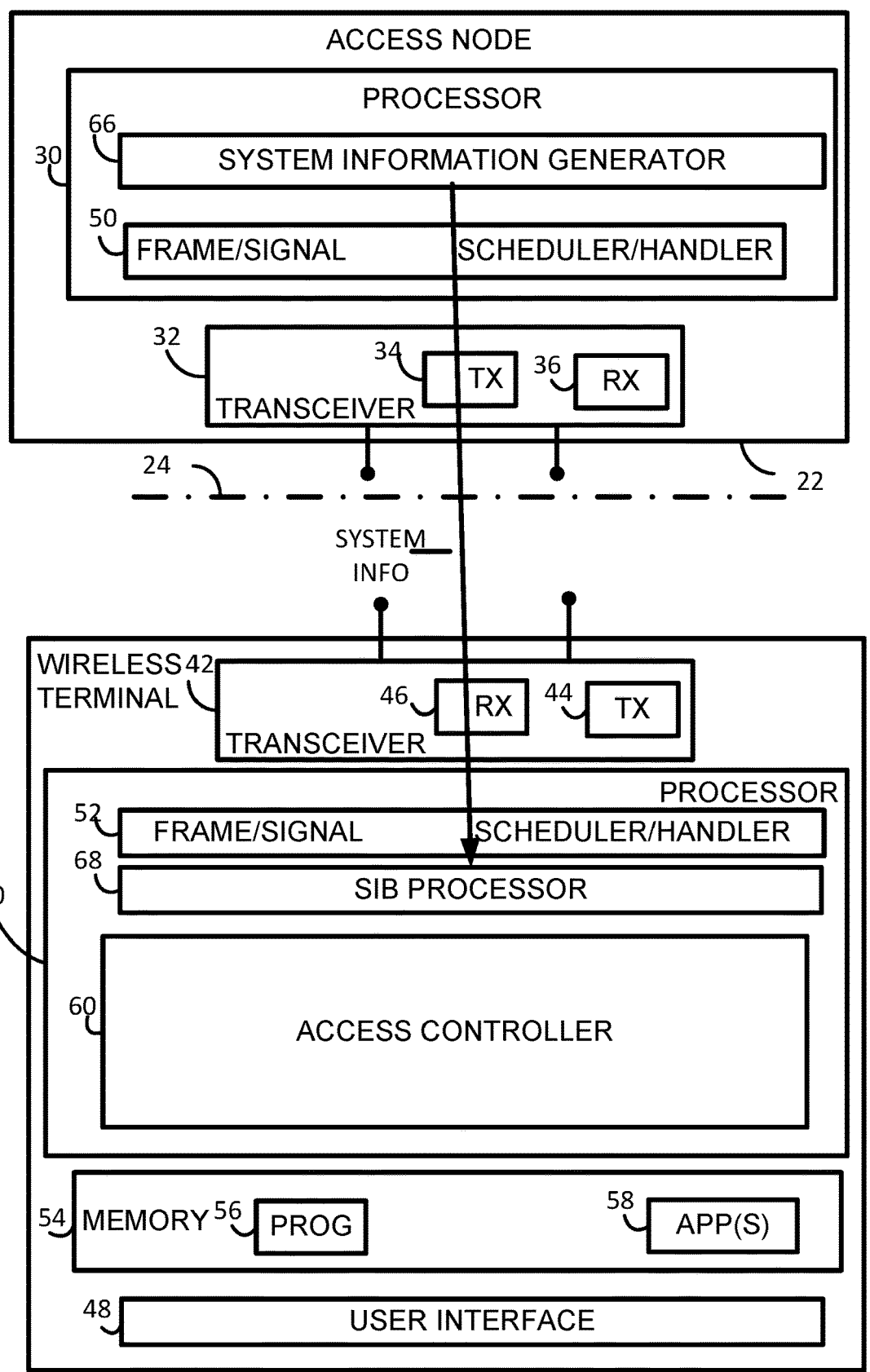
Figures 1, 2:
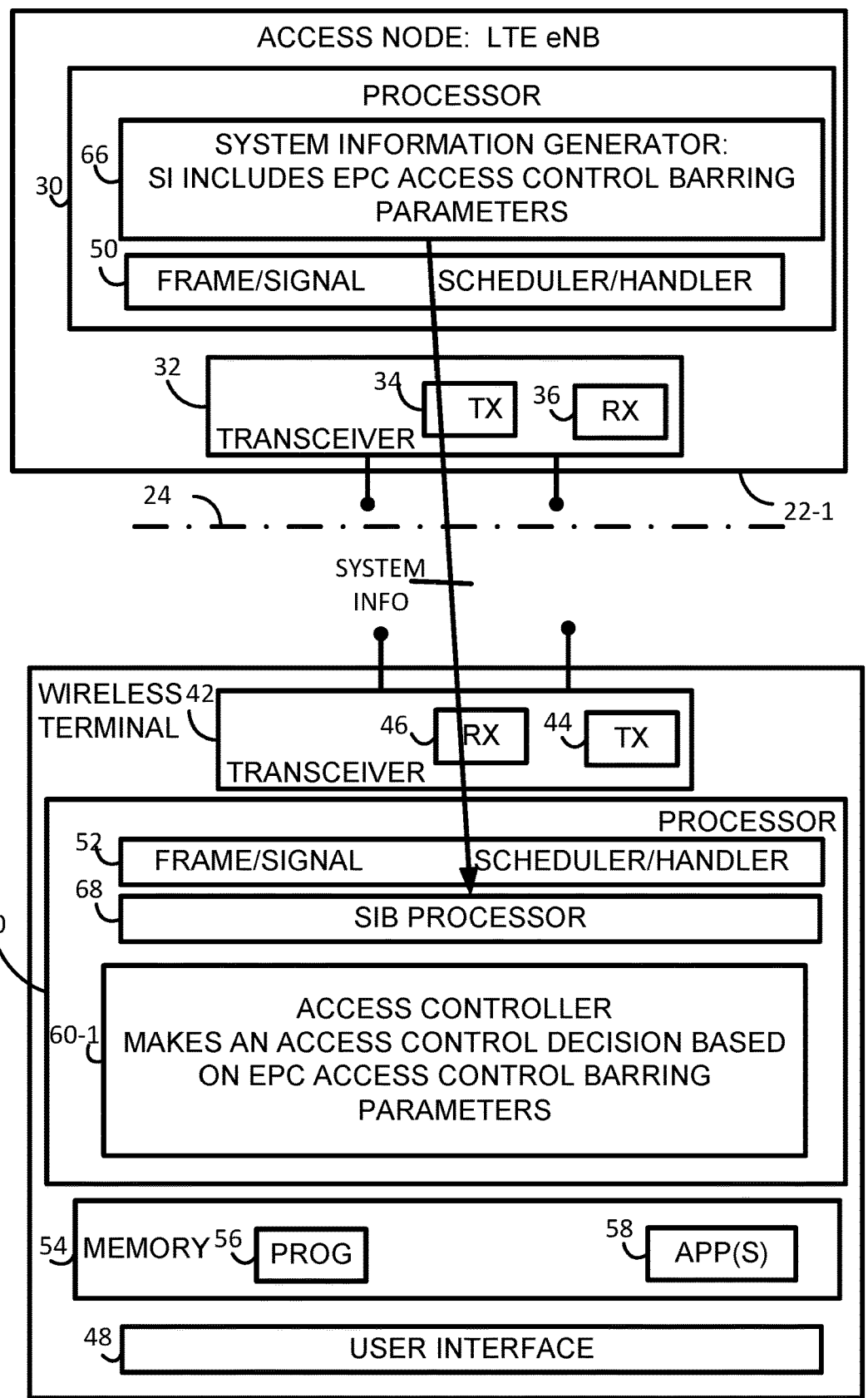
Figure 2:
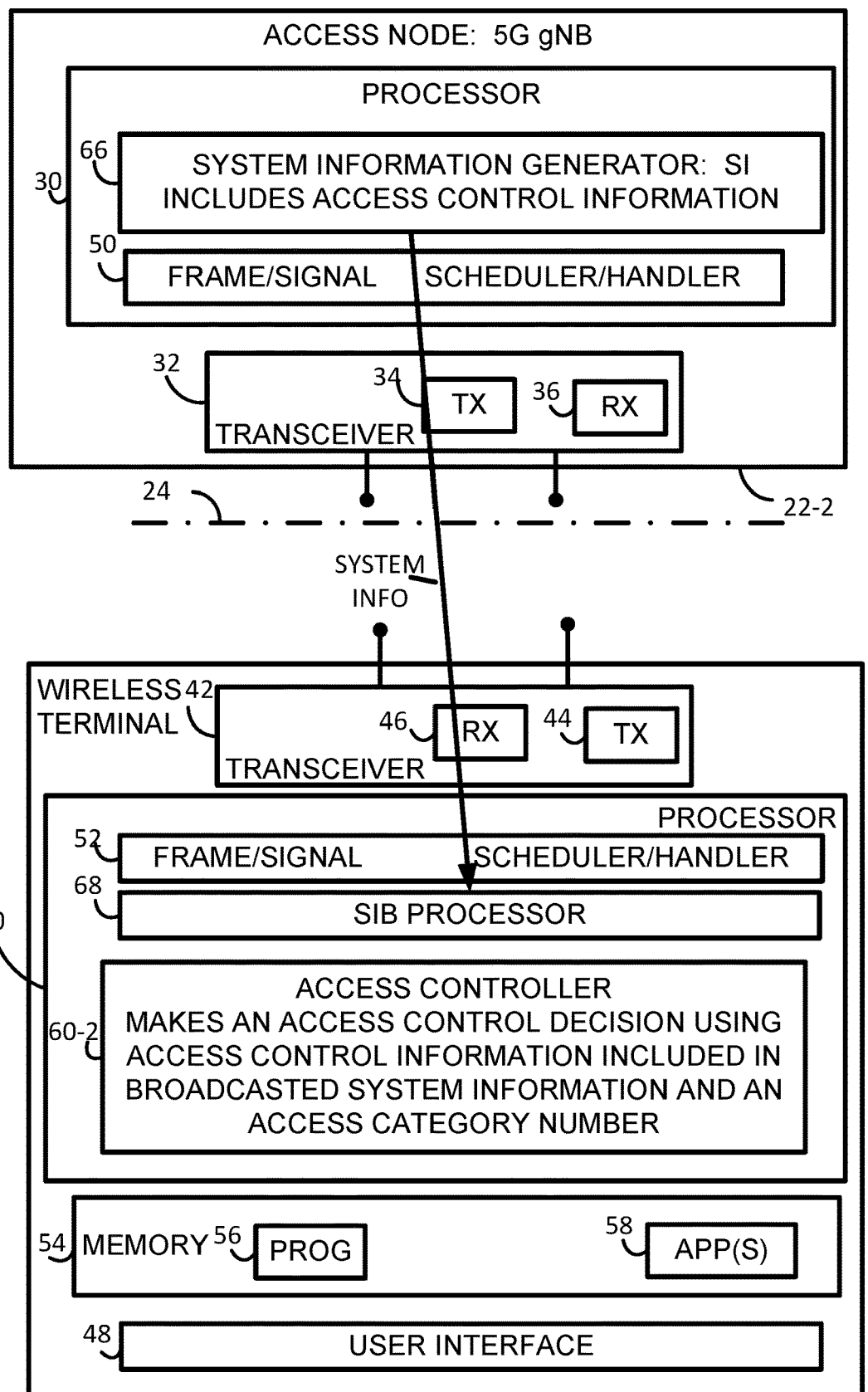
Figures 2, 3:
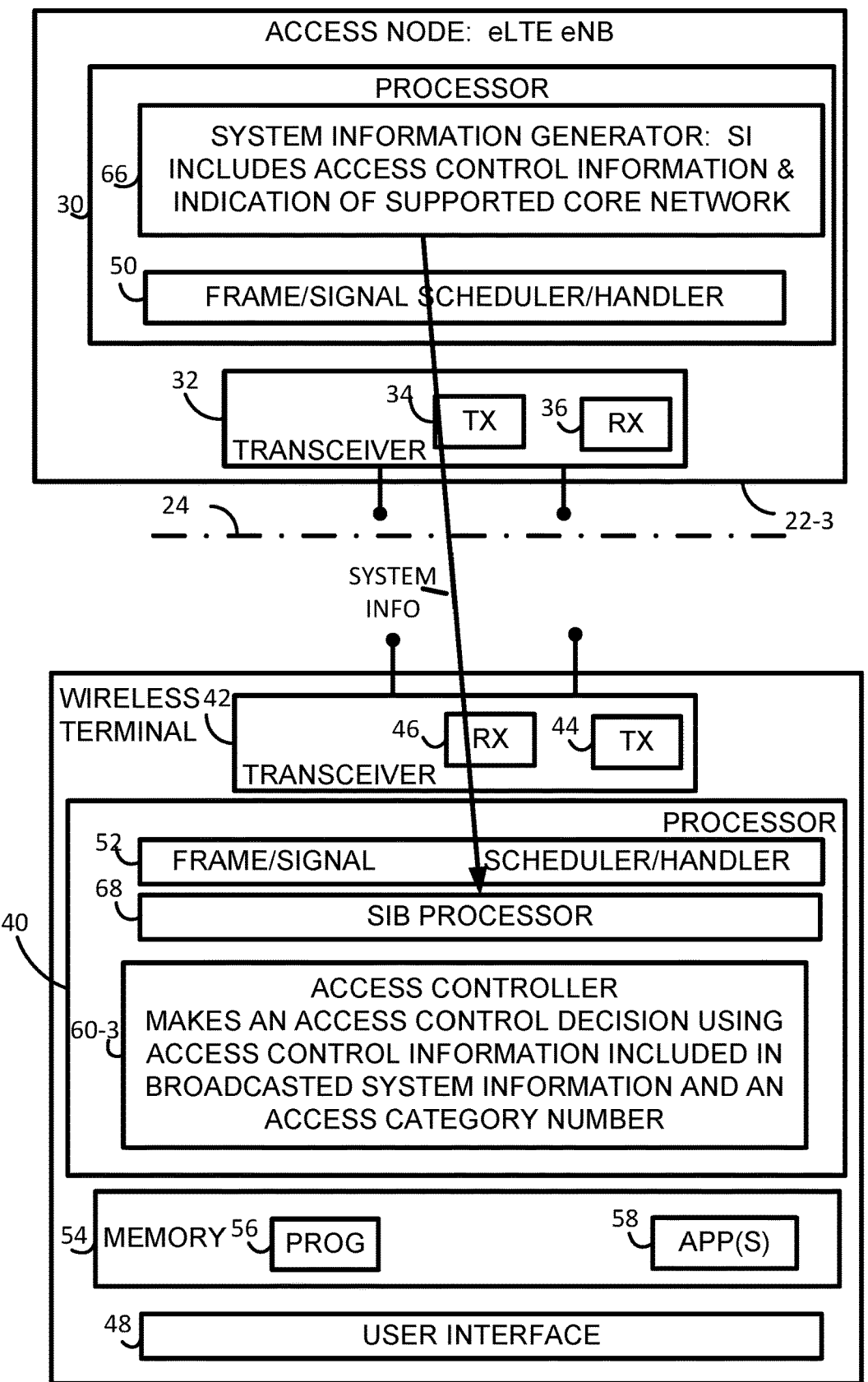
Figures 2, 3, 4:
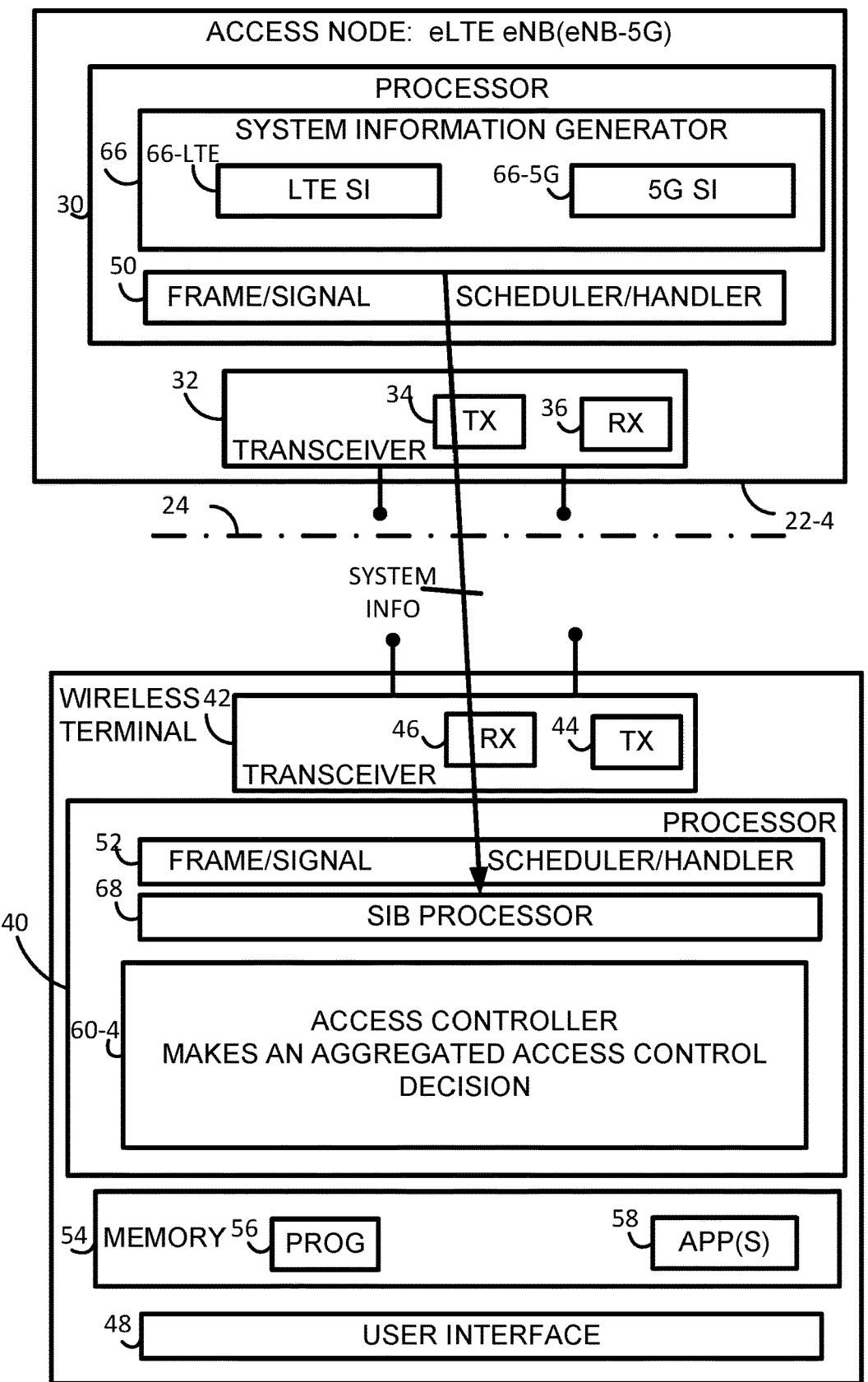
Figures 2, 3, 4, 5:
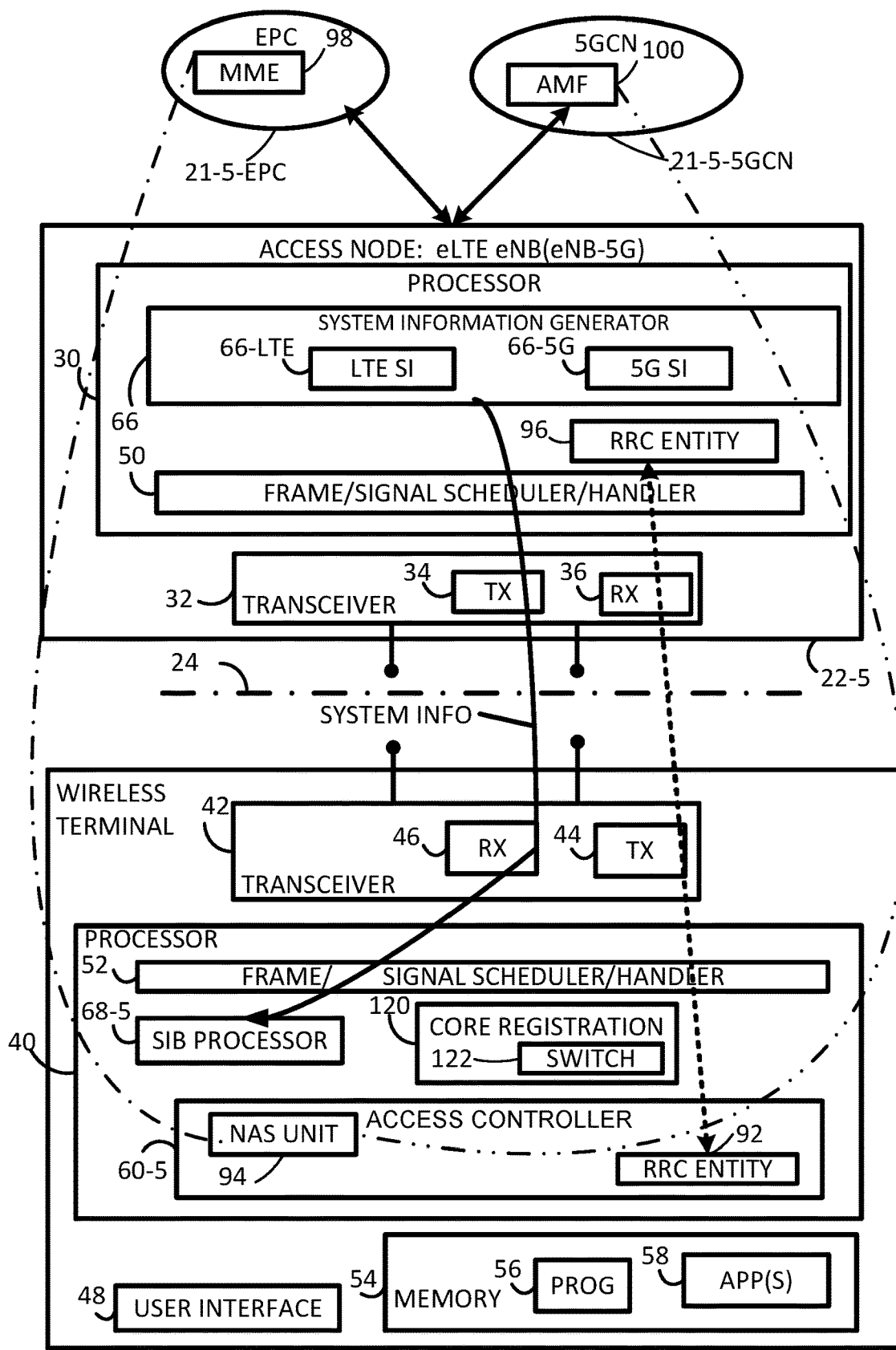
Figures 1, 3:
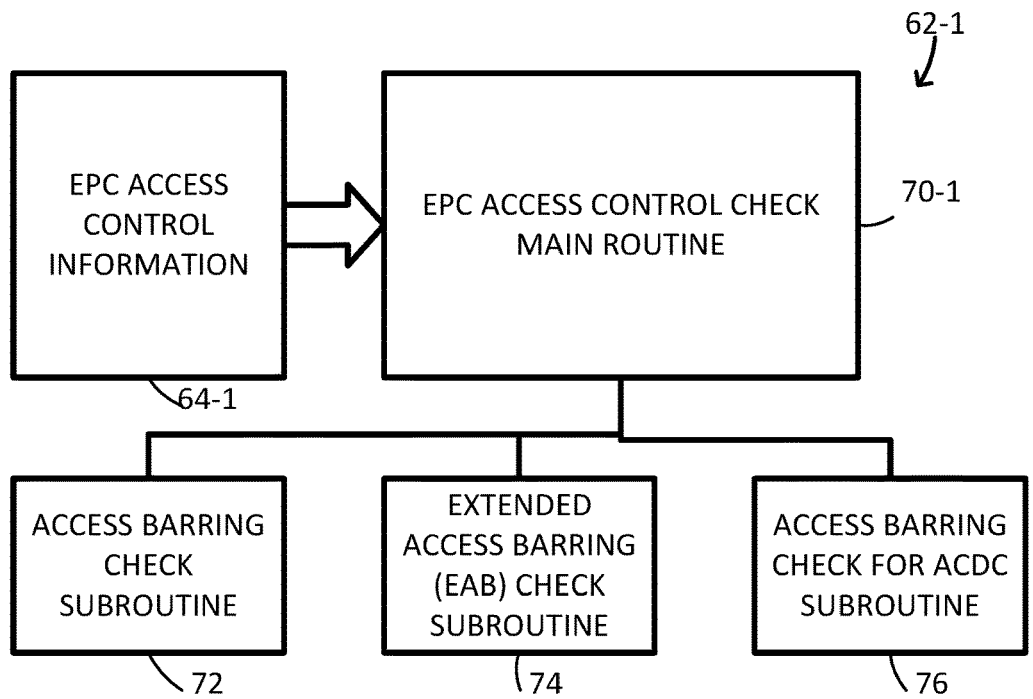
Figures 1, 4:
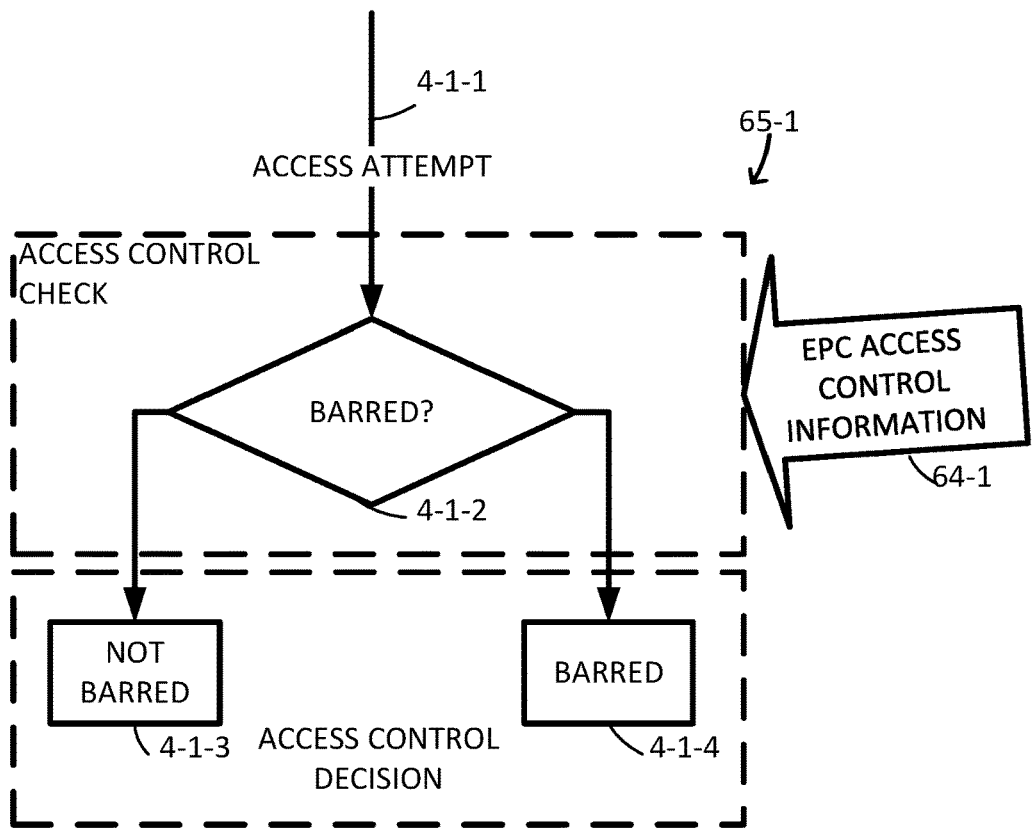
Figures 2, 3:
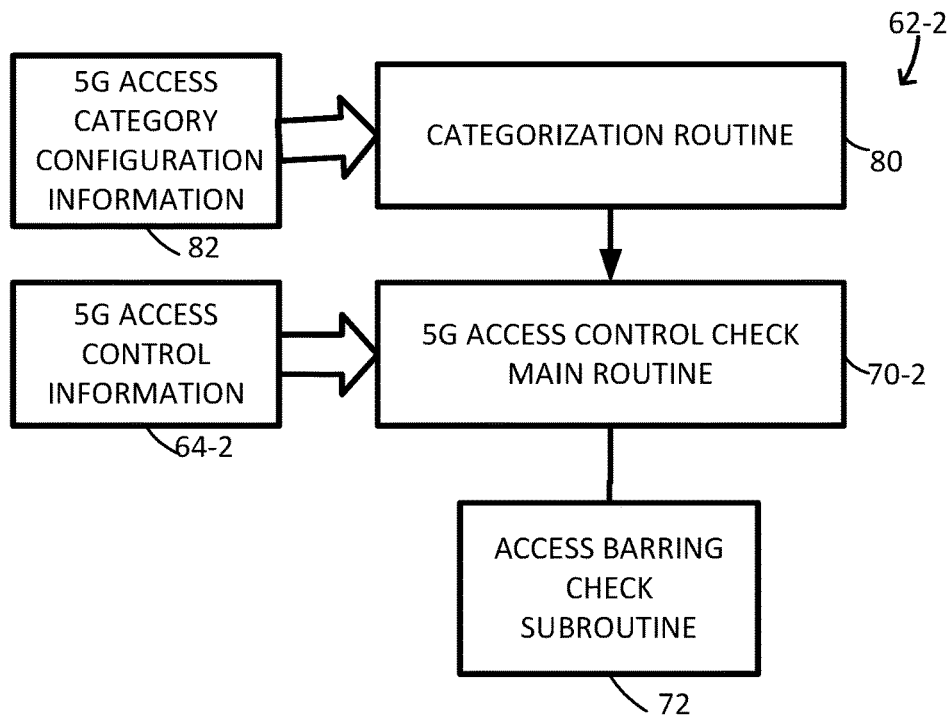
Figures 2, 4:
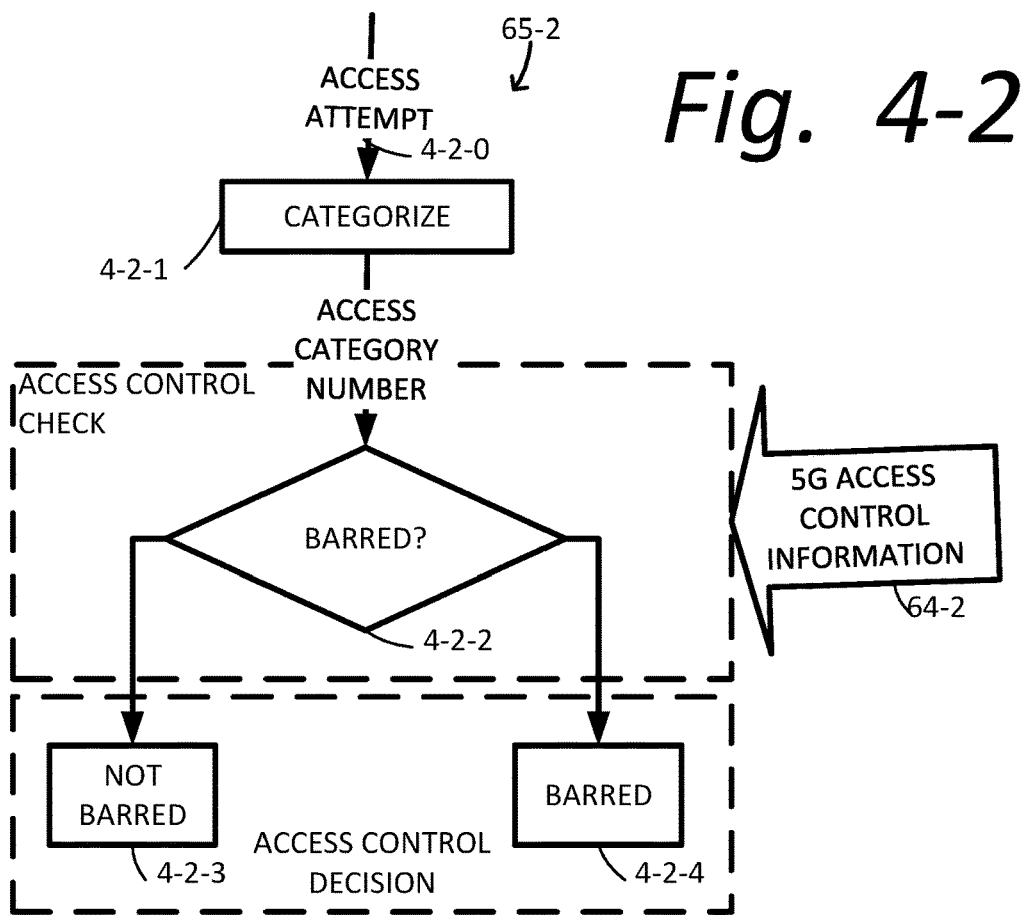
Figure 3:
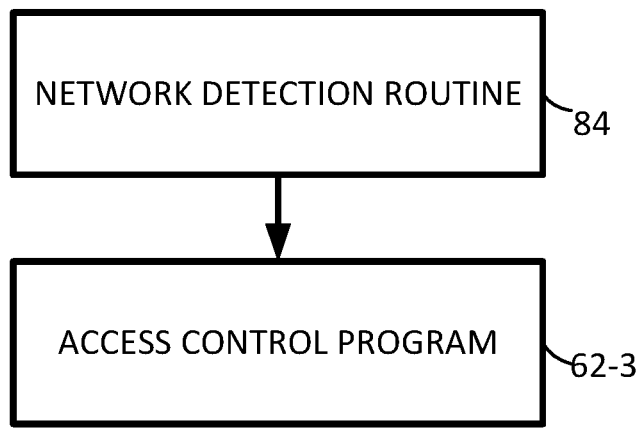
Figures 3, 4:
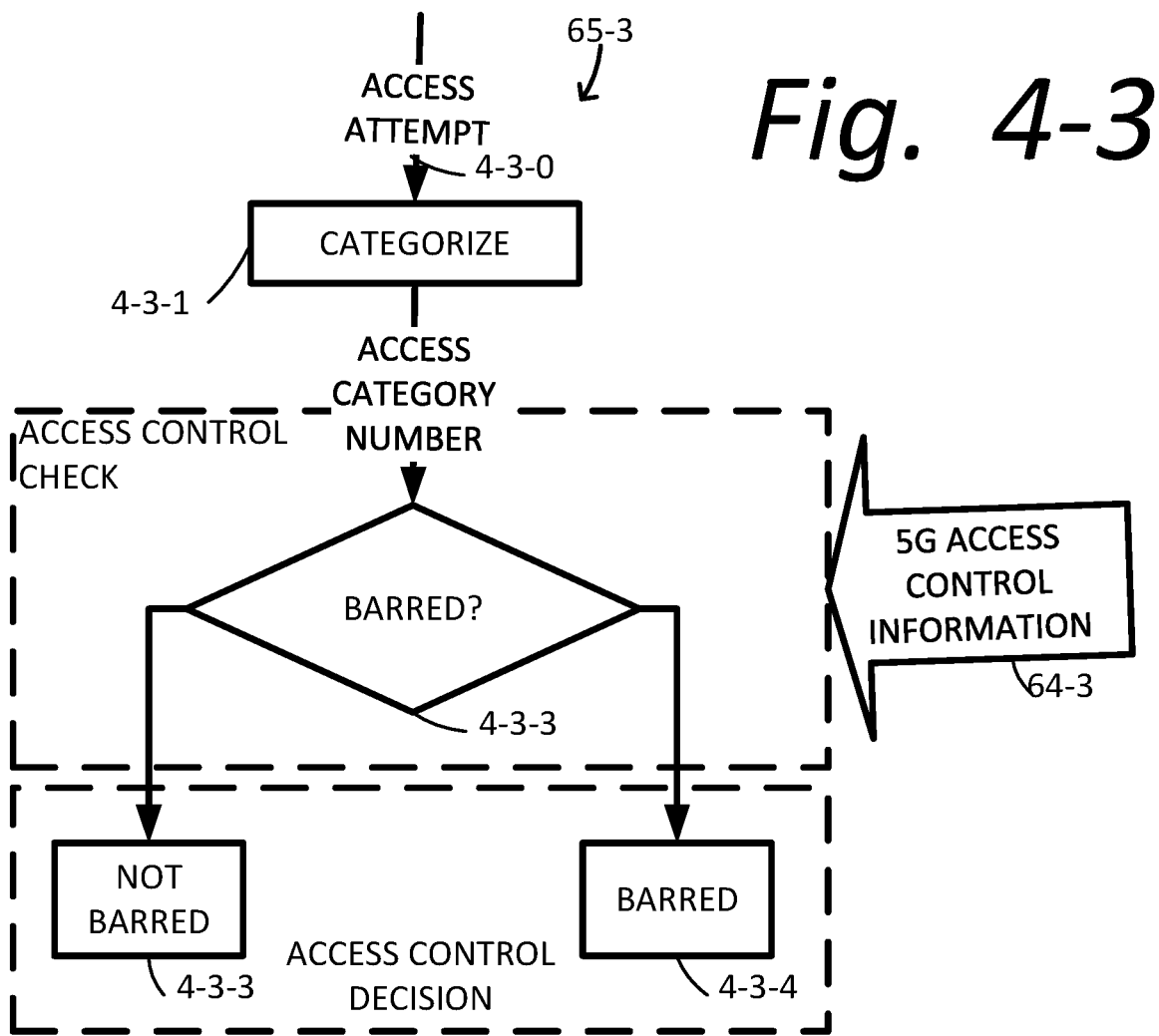
Figures 3, 4:
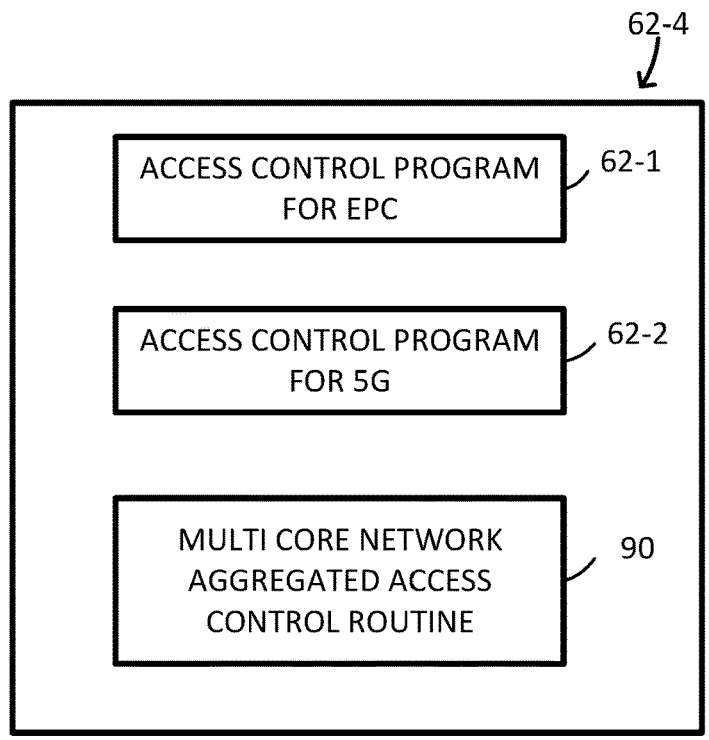
Figure 4:
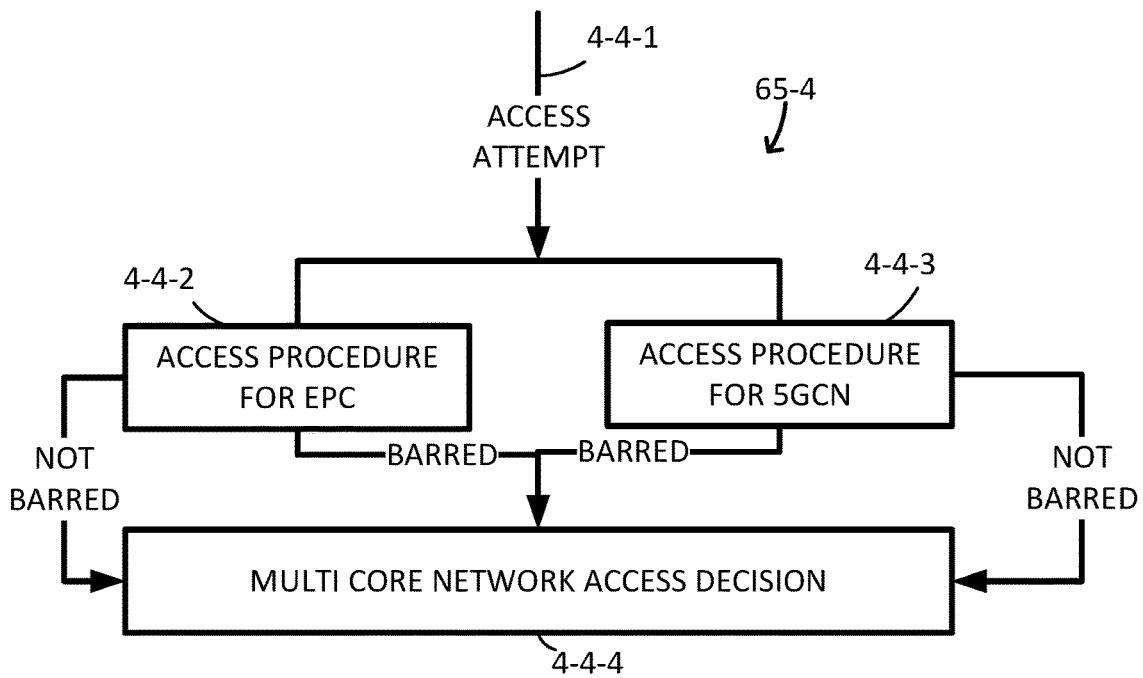
Figures 3, 4, 5:
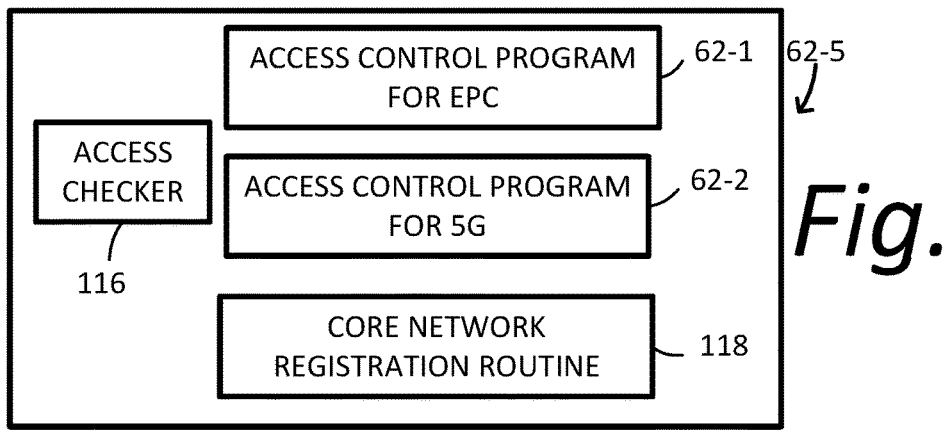
Figures 4, 5:
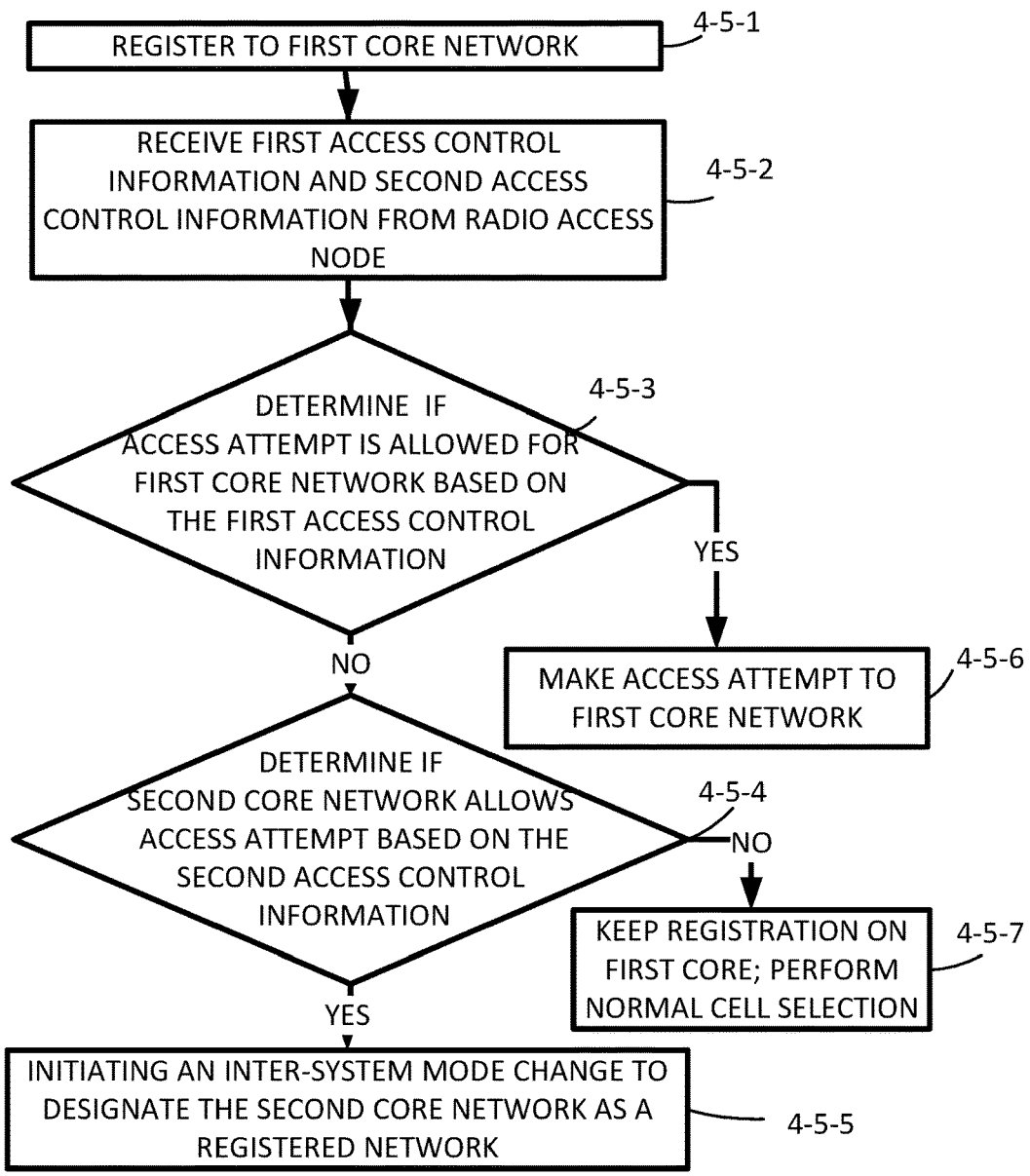
Figure 9:
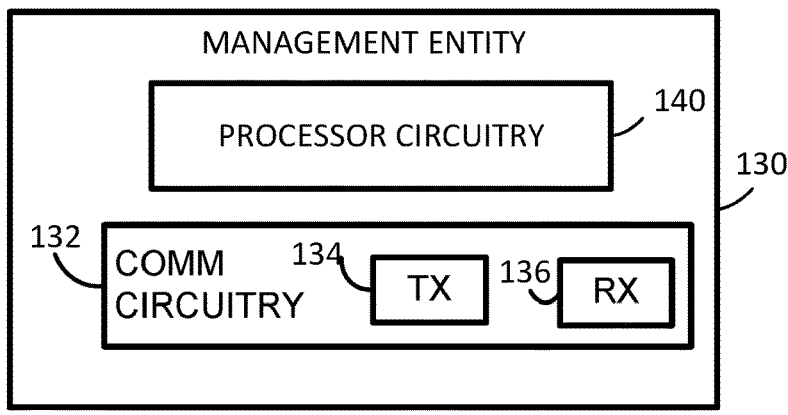
FIG. 9 is a schematic view of an example management entity for a core network.
Figure 10:
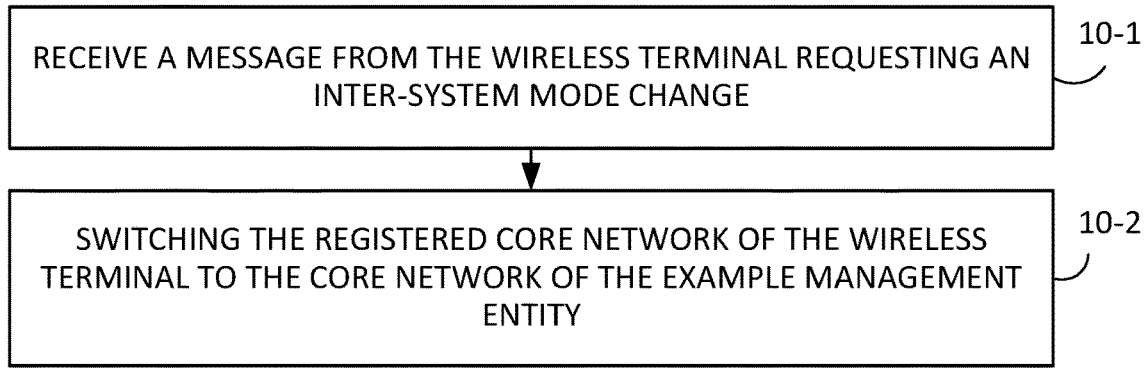
FIG. 10 is a flowchart showing example, non-limiting, basic acts or steps performed by the example management entity of FIG. 9

2-5; access control program 62-5 of FIG. 3-5; access control and network registration program 64-5 of FIG. 4-5; as well as other figures, such as FIG. 9 and FIG. 10, describing structure and operation of an example management entity, as well as (for example) FIG. 11-FIG. 16 illustrating various operational scenarios. FIG. 1-5 particularly shows the network architecture of the fifth embodiment, where the eNB-5G 22-5 may be connected to both EPC CN 21-5-EPC and 5GCN 21-5-5GCN. Similar to Embodiment 3, the eNB-5G 22-4 may broadcast, e.g., in MIB or SIB, the indication of supported core networks, e.g., indicating support of both EPC and 5GCN.

Figure 8:
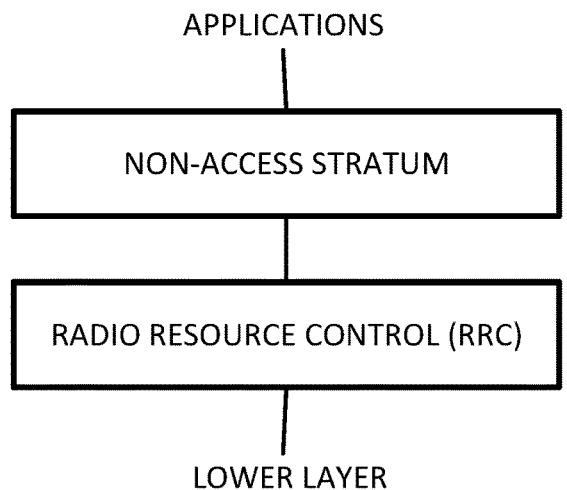
FIG. 8 is a diagrammatic view showing an example high-level structure of a UE protocol stack.

FIG. 8 shows an example high-level structure of the UE protocol stack, wherein Non-Access Stratum (NAS) is a functional layer to communicate with the core network and radio resource control (RRC) is responsible for managing the radio resource/connection between UE and eNB. The UE protocol stack is further reflected in FIG. 1-5 and FIG. 2-5, which show wireless terminal 26-5 as comprising terminal radio resource control (RRC) entity as terminal RRC entity 92 and NAS protocol unit 94. FIG. 1-5 and FIG. 2-5 further show LTE eNB 22-5 as comprising node radio resource control (RRC) entity, e.g., node RRC entity 96. The terminal RRC entity 92 and the node RRC entity 96 may communicate with one another as shown by the dotted line in FIG. 1-5. The NAS protocol unit 94 located in the wireless terminal 26-5 is capable of establishing a logical connection with Mobility Management Entity MME 98 in EPC 21-5-EPC, as shown by the single dot-dashed line in FIG. 1-5 and FIG. 2-5, or with Access and Mobility Management Function AMF 100 in 5GCN 21-5-5GCN, e.g., as shown by the double dot-dashed line in FIG. 1-5 and FIG. 2-5.

The radio communications system 20-5 of FIG. 2-5 is understood with reference to the radio communications systems 20 previously described, with similarly reference numbered entities and components having similar functionalities although sometimes illustrated with differing numerical dashed suffixes. By way of partial description, radio communications system 20-5 of FIG. 2-5 shows access node 22-5 and wireless terminal 26-5 for which access control is implemented. FIG. 2-5 shows, for example, that radio access node 22, e.g., LTE eNB/eNB-5G), communicates over air or radio interface 24, e.g., Uu interface, with wireless terminal 26-5. FIG. 2 also shows core networks Evolved Packet Core (EPC) network 21-5-EPC and a Fifth Generation or New Radio core network (5GCN) 21-5-5GCN. The access node 22-5 may connect to both EPC core network 21-5-EPC and 5GCN core network 21-5-5GCN.

The node 22-5 comprises node processor circuitry, "node processor 30", and node transceiver circuitry 32. The node transceiver circuitry 32 typically comprises node transmitter circuitry 34 and node receiver circuitry 36, which are also called node transmitter 34 and node receiver 36, respectively The wireless terminal 26-5 comprises terminal processor circuitry 40 ("terminal processor 40") and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically but is not required to comprise user interface 48.

For both the radio access node 22 and radio interface 24, the respective transceiver circuitries 22 include antenna(s). The respective transmitter circuits 34 and 44 may comprise, e.g., amplifier(s), modulation circuitry and other conventional transmission equipment. The respective receiver circuits 36 and 46 may comprise, e.g., e.g., amplifiers, demodulation circuitry, and other conventional receiver equipment.

In general operation node, 22 and wireless terminal 26 communicate with each other across radio interface 24 using predefined configurations of information. By way of non-limiting example, the radio access node 22 and wireless terminal 26 may communicate over radio interface 24 using "frames" of information, as previously discussed herein. To cater to the transmission of information between radio access node 22-5 and wireless terminal 26-5 over radio interface 24, the node processor 30 and terminal processor 40 of FIG. 2-5 are shown as comprising respective information handlers. For an example implementation in which the information is communicated via frames, the information handler for radio access node 22-5 is shown as node frame/signal scheduler/handler 50, while the information handler for wireless terminal 26-5 is shown as terminal frame/signal handler 52. Again it should be understood that, in differing technologies, the configurations of information may not necessarily be denominated as "frames" or have the LTE frame structure, but for such other differing technology the configurations of information may be otherwise structure and referenced.

The wireless terminal 26-5 also comprises a storage device or memory 54. As explained herein with reference to FIG. 17, for example, the memory 54 may take the form of read only memory (ROM), random access memory (RAM), cache memory, or semiconductor memory, just to name a few examples. One or more executable computer programs may be stored in program memory 56. One or more applications executed by the terminal processor 40 of wireless terminal 26 in conjunction with services rendered by or using wireless terminal 26-5 may be stored in applications memory 58.

The wireless terminal 26-5 comprises a terminal access controller 60-5, also known as access controller 60-5. As described herein, the terminal access controller 60-5 executes the access control program 62-5 shown in FIG. 3-5. Execution of the access control program 62-5 performs access control procedure 65-5, which includes example acts such as those shown in FIG. 4-5. Execution of the access control program 62-5 may employ access control information 64 obtained from the core network(s) 21 in making access control checks.

The access controller 60-5 may comprise or be realized by, for example, terminal processor 40. Thus, the wireless terminal 26-5 comprises a least one processor, e.g., terminal processor 40), and at least one memory 54, e.g., program memory 56, including computer program code stored on non-transient memory. The memory 54 and the computer program code, e.g., of the access control program 62-5, are configured to, working with the at least one processor, to perform access control operations of the access control procedure 65-5.

As mentioned above, the access control program 62-5 is performed in conjunction with access control information 64 which, in at least some example embodiments and modes, is received from the radio communications system. In example embodiments and modes, the access control information 64 may be transmitted to the wireless terminal 26 in broadcast system information. The broadcast system information may be formatted in system information, such as (for example) in one or more system information blocks (SIBs). Thus, FIG. 2-5 also shows the access node 22-5 as comprising system information generator 66-5G. The access control information 64, which may be included in the system information generated by system information generator 66-5G, is transmitted by node transmitter 34 over radio interface 24 to the terminal receiver 46 of wireless terminal 26-5, where it is handled by system information processor 68-5 of wireless terminal 26-5.

In this fifth embodiment, the eNB-5G 22-5 may broadcast the EPC access control information, such as a broadcast using SIB2 and/or SIB14 disclosed in the Embodiment 1, in order to support access control for EPC. In parallel, the eNB-5G 22-5 may also broadcast the 5G access category configuration information as disclosed in Embodiment 2 in order to support access control for 5GCN. Accordingly, to illustrate the parallel broadcast of different types of system information, the system information generator 66 of FIG. 2-5 as shown as comprising LTE system information generator 66-LTE and 5G system information generator 66-5G. The LTE system information may be included in an existing LTE/LTE-A SIB, e.g. SIB2. As described in Embodiment 3, the 5G access category configuration information may be incorporated into an existing LTE/LTE-A SIB, e.g. SIB2, or may be included in an independent SIB, SIBx.

The fifth embodiment is based on the network architecture disclosed in Embodiment 4, with the situation where the wireless terminal 26-5 is configured to register to a single core network at a given time. In this case, when an access attempt arrives, the wireless terminal 26-5 may examine the access control procedure for the currently registered core network using one of the aforementioned embodiments. If the procedure results in access to the cell as barred, the wireless terminal 26-5 of this fifth embodiment may initiate an inter-system mode change procedure that allows wireless terminal 26-5 to register to another core network also available to the serving eNB 21-5. The inter-system mode change procedure may also be referred to or known as an inter-system change procedure, an inter-system switching, or an inter-system mode switching. After this procedure, wireless terminal 26-5 may perform the access attempt for this other core network using the access control procedure designated for this other core network.

For the example embodiment and mode of FIG. 2-5, the terminal receiver circuitry and terminal transmitter circuitry are configured to communicate across radio interface 24 with radio access node 21-5, and also to one or more management entities of core networks via the radio access node. As shown in FIG. 1-5 and FIG. 2-5, the terminal receiver circuitry 46 and terminal transmitter circuitry 44 communicate with one or both of mobility management entity (MME) 98 of EPC core network 21-5-EPC and Access and Mobility Management Function (AMF) 100 of 5GCN core network 21-5-5GCN. The terminal processor 40 comprises terminal access controller 60-5, system information processor 68-5, and core network registration controller 120.

FIG. 3-5 shows access control program 62-5 executed by access controller 60-5 of FIG. 2-5. The access control program 62-5 comprises the access control program 62-1, shown in FIG. 3-1, which is an access control program for EPC; the access control program 62-2 shown in FIG. 3-1, which is an access control program for 5G; an access checker routine 116; and, a core network registration routine 118, which executes access control and network registration program 64-5 (described below). The access control and network registration program 64-5 may comprise or be a part of the overall access control program 62-5 and thus also the access control procedure 65-5.

Portions of the access control procedure 65-5 performed upon execution of the access control program 62-5 of FIG. 3-5 are shown in FIG. 4-5. The node processor 30 of the fifth embodiment is configured to perform the basic acts or steps of access control program 62-5 including the access control and network registration program 64-5 as shown in FIG. 4-5.

Act 4-5-1 comprises registering to a first core network. Act 4-5-2 comprises receiving first access control information and second access control information from the access node 22-5. Act 4-5-3 comprises, upon receipt or detection of an access attempt, determining if the access attempt is allowed for the first core network based on the first access control information. If the determination of act 4-5-3 is negative, i.e., if the access attempt is barred for the first core network, act 4-5-4 is performed. Act 4-5-4 comprises determining if a second core network allows the access attempt, based on the second access control information. If the determination of act 4-5-4 is positive, i.e., if the access attempt is allowed for the second core network, act 4-5-5 is performed. Act 4-5-5 comprises initiating an inter-system mode change procedure to designate the second core network as a registered network. In other words, as act 4-5-5 an inter-system mode change procedure is initiated to switch the registered network to the second core network.

If the determination of act 4-5-3 is positive, then as act 4-5-6 an access attempt is made toward the first core network. If the determination of act 4-5-4 is negative, e.g., if an access attempt is not allowed for either the first core network or the second core network, then act 4-5-7 is performed. If an access attempt is not allowed for either the first core network or the second core network, act 4-5-7 is performed. Act 4-5-7 comprises keeping the registration status on the first core network, and performing normal cell selection.

In an example, non-limiting embodiment and mode, the act of registering to the first core network, act 4-5-1, may be performed by the core network registration controller 120 of wireless terminal 26-5. The first access control information and second access control information from the access node 22-5, involved in act 4-5-2 may be received by receiver circuitry 46 and acquired via system information as describe above, as originated from system information generator 66, e.g., LTE system information from LTE system information generator 66-LTE and 5G system information from 5G system information generator 66-5G, and processed by system information processor 68-5. The determination of act 4-5-3, e.g., determining if the access attempt is allowed for the first core network based on the first access control information, and the determination of act 4-5-4, e.g., determining if a second core network allows the access attempt based on the second access control information, may be performed by terminal access controller 60-5. Act 4-5-5, comprising initiating an inter-system mode change procedure to designate the second core network as a registered network, may be performed by core network registration controller 120, and core registration switch unit 122 in particular.

FIG. 1-5 and FIG. 2-5 show the first core network as being one of EPC core network 21-5-EPC and 5GCN core network 21-5-5GCN, and the second core network as being the other of EPC core network 21-5-EPC and 5GCN core network 21-5-5GCN. In one example implementation, first core network and the second core networks belong to a same PLMN, but in another example implementation the first core network and the second core networks belong to different PLMNs. Moreover, although only two core networks are shown, the technology disclosed herein may be extended to more than two, e.g., three or more, core networks, so that the wireless terminal 26-5 may have opportunity to attempt access to more than two core networks if necessary.

For the fifth embodiment FIG. 9 shows an example management entity 130 for a core network. The example management entity 130 of FIG. 9 could be either the mobility management entity (MME) 98 of EPC core network 21-5-EPC, or the Access and Mobility Management Function (AMF) 100 of 5GCN core network 21-5-5GCN, and thus is a generic illustration of a management entity. The example management entity 130 comprises management entity communications circuitry 132, which in turn comprises management entity transmitting circuitry 134 and management entity receiving circuitry 136, as well as management entity processor circuitry 140.

FIG. 10 shows example, non-limiting, basic acts or steps performed by the example management entity 130 of FIG. 9. Act 10-1 comprises the example management entity 130 receiving a message from the wireless terminal requesting an inter-system mode change. Act 10-2 comprises the example management entity 130 switching the registered core network of the wireless terminal to the core network of the example management entity 130. The message received as act 10-1 may be an inter-system mode change requested by act 4-5-5.

Two example scenarios of the operation of the fifth embodiment are described below.

Fifth Embodiment—First Scenario

In a first example scenario of the fifth embodiment, the wireless terminal 26-5 registers to 5GCN core network 21-5-5GCN, which may be available through the eLTE eNB 21-5. While being registered to the core network, the wireless terminal 26-5 generates an access attempt.

Figure 11:
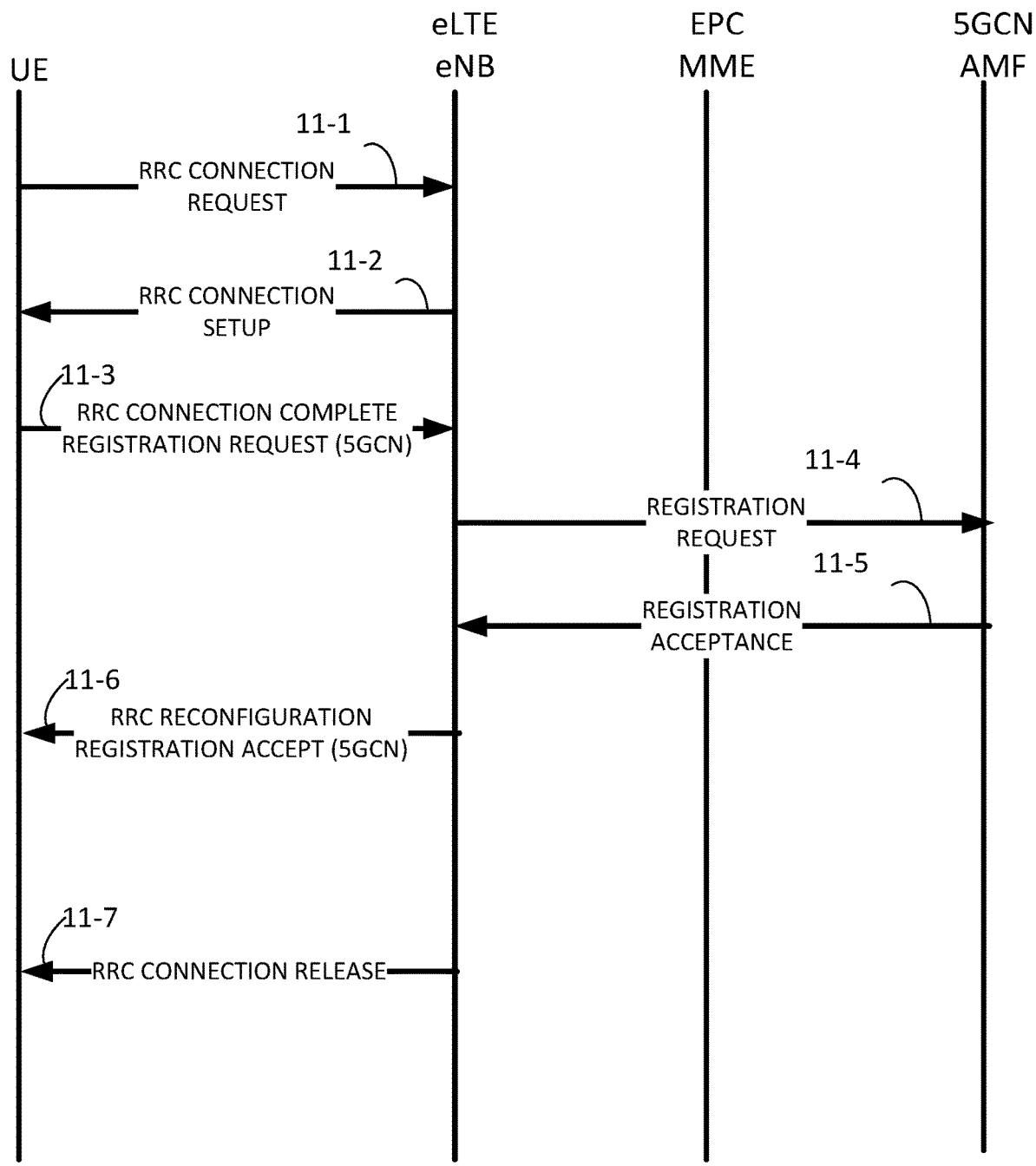
FIG. 11 is a diagrammatic view showing example, representative basic acts or steps comprising an example message sequence for a wireless terminal to register to a 5GCN core network in a first scenario of a fifth embodiment.

FIG. 11 illustrates example, representative basic acts or steps comprising an example message sequence for the wireless terminal 26-5 to register to 5GCN core network 21-5-5GCN. As act 11-1, the wireless terminal 26-5 may initiate RRC connection establishment by sending a RRC Connection Request message to the eLTE eNB 22-5. As act 11-2, in response the wireless terminal 26-5 may receive a RRC Connection Setup message, indicating that the connection request is accepted by the access node 22-5. As act 11-3 wireless terminal 26-5 may then send to access node 22-5 a RRC Connection Complete message. The RRC Connection Complete message may include a Registration Request message, which is a NAS layer message, to request registration. The RRC Connection Complete message of act 11-3 may also include an indication or an identification of the core network that the UE desires to register, e.g., 5GCN core network 21-5-5GCN in this case. Upon receipt of the message of act 11-3, as act 11-4 the eLTE eNB 22-5 may transfer the NAS message to Access and Mobility Management Function (AMF) 100 in 5GCN core network 21-5-5GCN. If the Registration Request message of act 11-4 is accepted, as act 11-5 the Access and Mobility Management Function (AMF) 100 AMF may respond back to the eLTE eNB 22-5 with a Registration Accept message, also a NAS layer message. As act 11-6 the eLTE eNB 22-5 may then include this NAS message in a RRC Connection Reconfiguration message and send the RRC Connection Reconfiguration message with the Registration Accept message same to wireless terminal 26-5. Following this process, the wireless terminal 26-5 may continue communicating with the eLTE eNB 22-5 and/or AMF 100 for user data/signaling data transactions, such as security setup, bearer establishment, etc. The eLTE eNB 22-5 may then eventually have the wireless terminal 26-5 go back to IDLE by sending a RRC Connection Release message, as shown by act 11-7. At this moment, the wireless terminal 26-5 is still registered to the core network, e.g., 5GCN core network 21-5-5GCN, even if the RRC connection is released.

Figure 12:
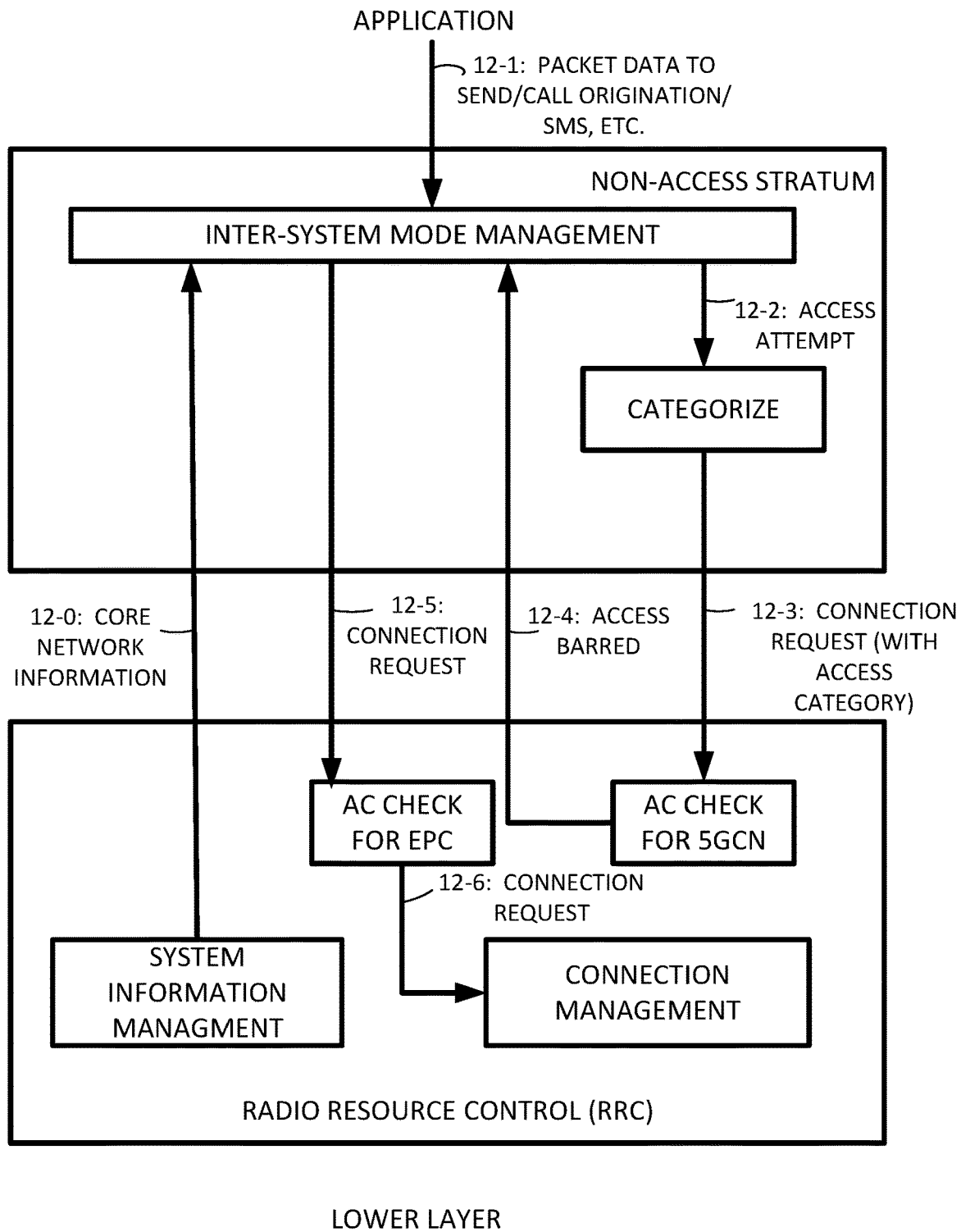
FIG. 12 is a diagrammatic view showing example, representative basic acts or steps performed by a wireless terminal upon receiving an access attempt in the first scenario of the fifth embodiment.

FIG. 12 shows example acts or steps performed by wireless terminal 26-5 when the wireless terminal 26-5 receives an access attempt in the first scenario of the fifth embodiment. FIG. 12 particularly shows the constituent units or functionalities of wireless terminal 26-5 involved in handling an access attempt, particularly including terminal RRC entity 92 and NAS protocol unit 94 for the first scenario. The acts of FIG. 12 are:

Act 12-0: When camping on the current cell, the terminal RRC entity 92 receives system information from the eLTE eNB 22-5. The received system information includes information of available core networks and types, e.g. EPC/5GCN.

Act 12-1: NAS protocol unit 94 receives a request, such as packet data transmission, call origination and short message transmission, from an application executed by wireless terminal 26-5.

Act 12-2: Inter-system Mode Management, a functional entity comprising the NAS protocol unit 94 which handles multi-core network configurations, generates an access attempt based on the request from the application.

Act 12-3: The access attempt of act 12-2 is categorized into an access category, using the procedure disclosed in Embodiment 2. The NAS protocol unit 94 then submits a connection request addressed to 5GCN core network 21-5-5GCN to the terminal RRC entity 92, the connection request of act 12/3 including the access category.

Act 12-4: The terminal RRC entity 92 performs an access control check for 5GCN core network 21-5-5GCN, by examining the access category, which so happens to be barred in this scenario based on the current system information. The terminal RRC entity 92 informs NAS protocol unit 94 that access is barred.

Act 12-5: Due to the access to 5GCN core network 21-5-5GCN being barred, Inter-system Mode Management unit of NAS protocol unit 94 may perform an inter-system mode change procedure, 5GCN to EPC, and accordingly sends to terminal RRC entity 92 a connection request addressed to EPC core network 21-5-EPC.

Act 12-6: The terminal RRC entity 92 performs an access control check for EPC core network 21-5-EPC and, in so doing, examines the connection request using the procedure disclosed in Embodiment 1. In the first scenario of the fifth embodiment, the access attempt is granted based on the system information, and results in initiating the connection request procedure.

It should be noted that if the access control check of act 12-6 also results in the access as being barred, the wireless terminal 26-5 may take no further action to switch the serving core network and may suspend the service request that has triggered the access attempt, while the wireless terminal 26-5 may stay in the current serving cell and may apply normal cell reselection process. The service request procedure may be started if it is still necessary when the access attempt for is granted by either of the core networks connected to the eLTE eNB, e.g. change on access control information in the system information, or because of a cell change.

Figure 13:
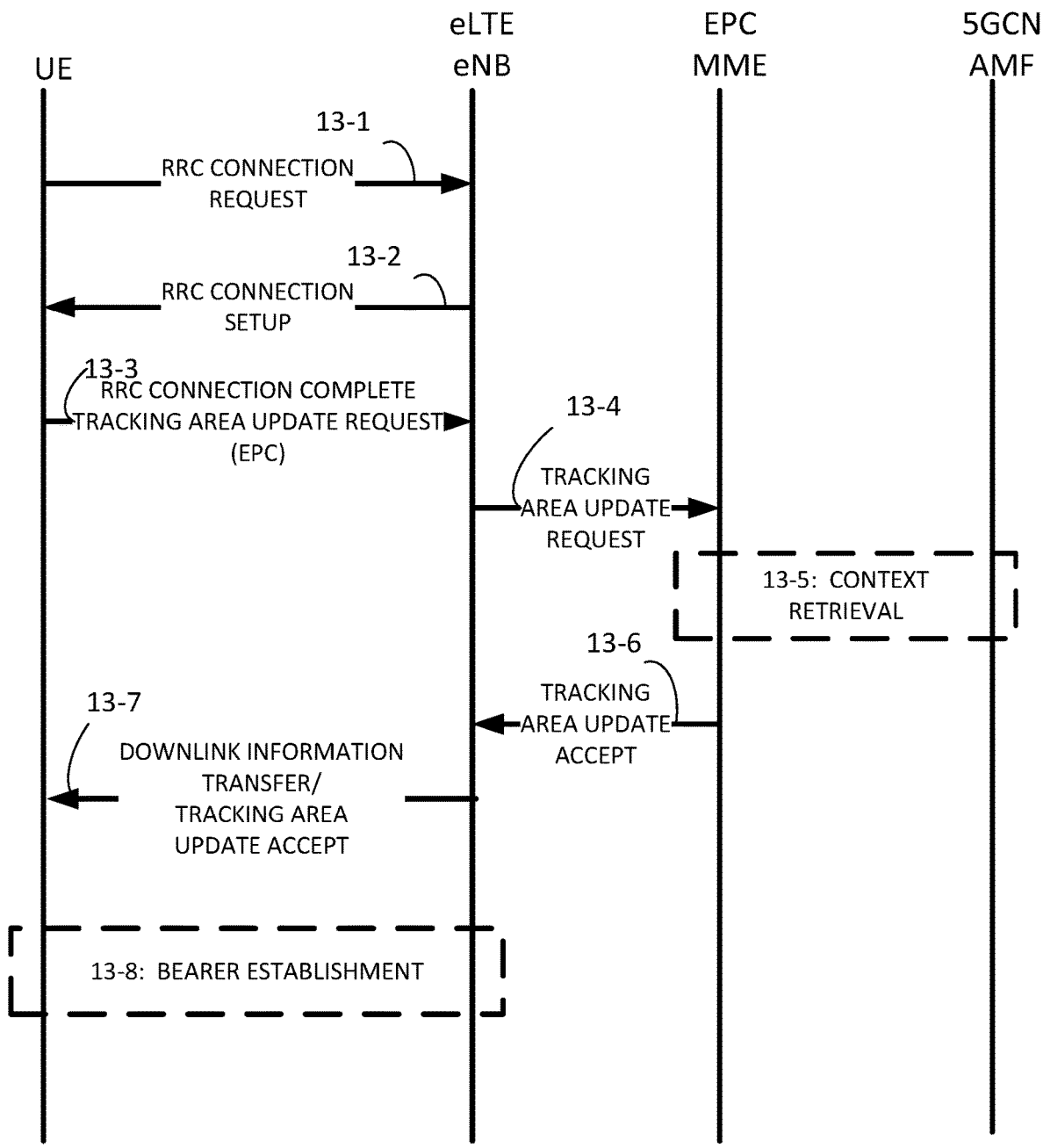
FIG. 13 a diagrammatic view showing example, representative basic acts or steps comprising an example message flow for a wireless terminal to initiate an inter-system mode change procedure to the network after acts of FIG. 12.

FIG. 13 shows an example message flow for wireless terminal 26-5 to initiate the inter-system mode change procedure to the network after act 12-6 of FIG. 12. The steps are as follows:

Act 13-1: The wireless terminal 26-5 sends RRC Connection Request message to eLTE eNB 22-5.

Act 13-2: The eLTE eNB 22-5 responds back to the wireless terminal 26-5 with a RRC Connection Setup message.

Act 13-3: The wireless terminal 26-5 sends a RRC Connection Complete message. The RRC Connection Complete message includes a Tracking Area Update Request, which is a NAS message, addressed to the mobility management entity (MME) 98 of the EPC core network 21-5-EPC.

Act 13-4: The eLTE eNB 22-5 forwards the Tracking Area Update Request message to the mobility management entity (MME) 98 of the EPC core network 21-5-EPC.

Act 13-5: The mobility management entity (MME) 98 of the EPC core network 21-5-EPC communicates with the Access and Mobility Management Function (AMF) 100 of 5GCN core network 21-5-5GCN, where the wireless terminal 26-5 was registered, and retrieves a UE context.

Act 13-6: The mobility management entity (MME) 98 of the EPC core network 21-5-EPC sends a Tracking Area Update Accept message to the eLTE eNB 22-5.

Act 13-7: The eLTE 22-5 sends a Downlink Information Transfer, an RRC message containing the Tracking Area Update Accept message, to wireless terminal 26-5.

Act 13-8: The wireless terminal 26-5 may proceed to establishing user data/signaling bearers with EPC core network 21-5-EPC.

In the example of FIG. 13, the NAS layer of the wireless terminal 26-5 uses Tracking Area Update Request messages to switch the serving core network. In some other configurations, the NAS layer may use a different NAS message, such as an Attach Request message or a Service Request message.

Fifth Embodiment—Second Scenario

In this scenario, the wireless terminal 26-5 registers to the EPC core network 21-5-EPC which is available through the eLTE eNB 22-5. While being registered to the core network, the wireless terminal 26-5 generates an access attempt.

Figure 14:
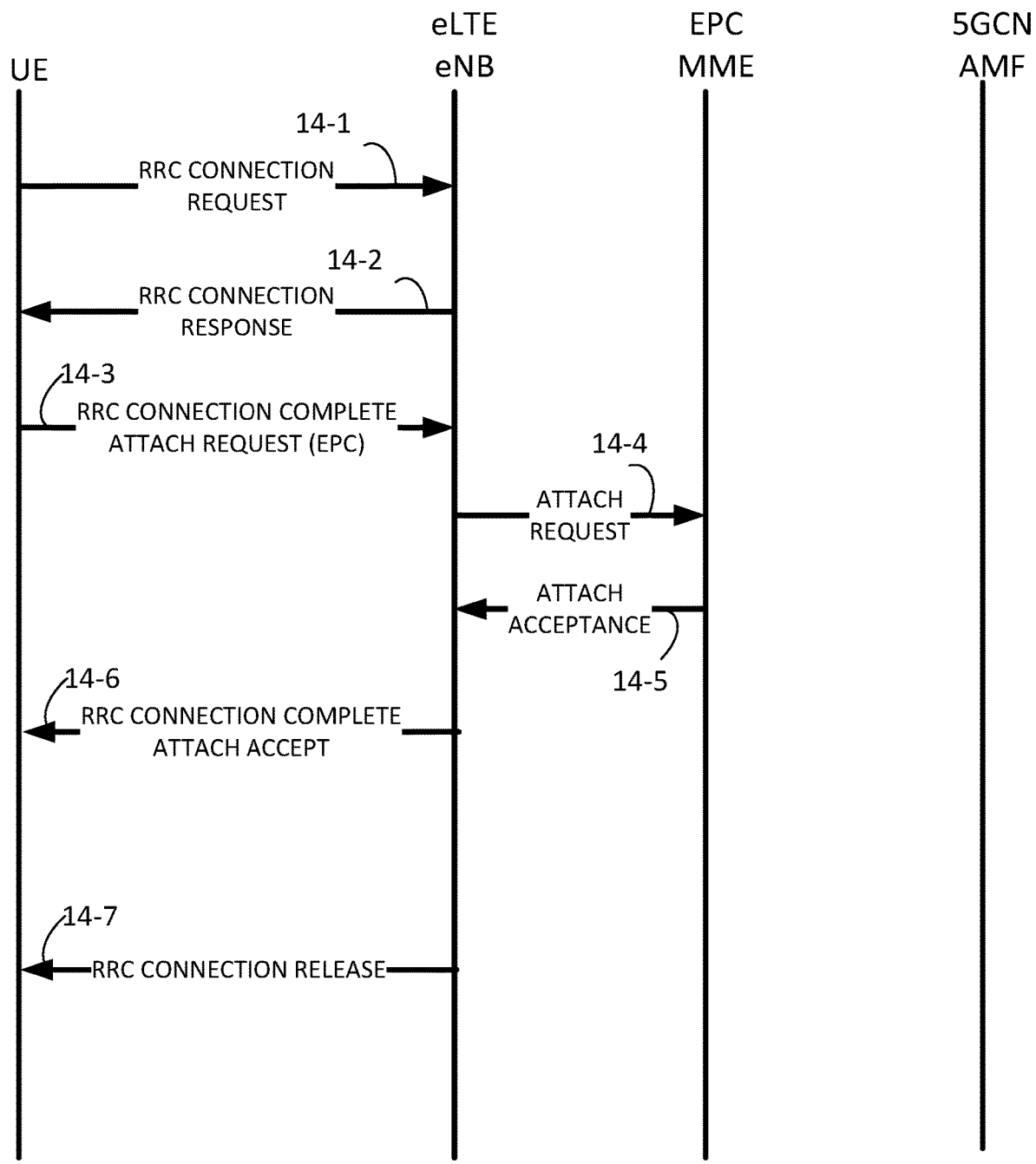
FIG. 14 is a diagrammatic view showing example, representative basic acts or steps comprising an example message sequence for a wireless terminal to register to an EPC core network in a second scenario of a fifth embodiment.

FIG. 14 illustrates example, representative basic acts or steps comprising in an example message sequence for the wireless terminal 26-5 to register to EPC core network 21-5-EPC. FIG. 14 similar to FIG. 11 with similarly suffixed act numbers, with the following differences: (i) for EPC, Attach Request/Accept messages, e.g., NAS messages, are used, as shown by acts 14-3 through 14-6, and (ii) for act 14-4, the Attach Request message is addressed to mobility management entity (MME) 98 of EPC core network 21-5-EPC.

Figure 15:
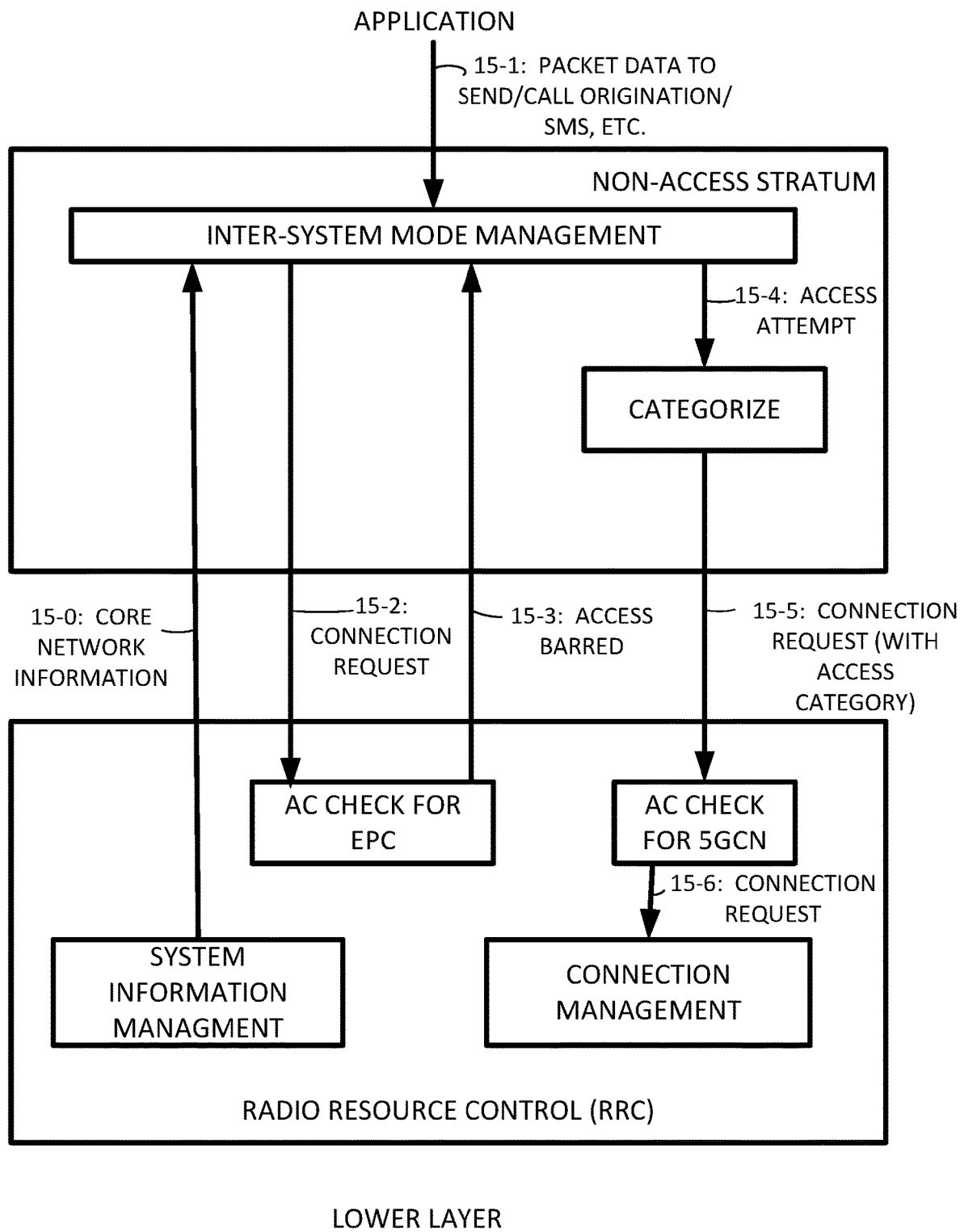
FIG. 15 is a diagrammatic view showing example, representative basic acts or steps performed by a wireless terminal upon receiving an access attempt in the second scenario of the fifth embodiment.

FIG. 15 shows example acts or steps performed by wireless terminal 26-5 when the wireless terminal 26-5 receives an access attempt in the second scenario of the fifth embodiment. FIG. 15 particularly shows the constituent units or functionalities of wireless terminal 26-5 involved in handling an access attempt, particularly including terminal RRC entity 92 and NAS protocol unit 94 for the second scenario. Similar to FIG. 12, the acts of FIG. 15 are:

Act 15-0: When camping on the current cell, the terminal RRC entity 92 receives system information from the eLTE eNB 22-5. The received system information includes information of available core networks and types, e.g. EPC/5GCN.

Act 15-1: NAS protocol unit 94 receives a request (such as packet data transmission, call origination and short message transmission) from an application executed by wireless terminal 26-5.

Act 15-2: Inter-system Mode Management, a functional entity comprising the NAS protocol unit 94 which handles multi-core network configurations, sends to terminal RRC entity 92 a connection request addressed to EPC core network 21-5-EPC.

Act 15-3: The terminal RRC entity 92 performs an access control check by examining the connection request using the procedure disclosed in Embodiment 1. For this instance of the second scenario, it so happens that the connection request is barred based on the system information. The terminal RRC entity 92 informs NAS protocol unit 94 that the access is barred.

Act 15-4: Due to the access barred at EPC core network 21-5-EPC, the Inter-system Mode Management of NAS protocol unit 94 may perform an inter-system mode change procedure, e.g., EPC to 5GCN, and generates an access attempt based on the request from the application.

Act 15-5: The access attempt of act 15-4 is categorized into an access category, using the procedure disclosed in Embodiment 2. The NAS protocol unit 94 submits a connection request addressed to 5GCN core network 21-5-5GCN to terminal RRC entity 92 with the access category.

Act 15-6: The terminal RRC entity 92 performs an access control check for 5GCN core network 21-5-5GCN by examining the access category. In this second scenario, the access attempt is granted based on the system information, and results in initiating the connection request procedure.

Similar to the first scenario of the fifth embodiment, it should be noted that if the AC Check of act 15-6 results in the access as barred, the wireless terminal 26-5 may take no further action to switch the serving core network and may suspend the service request that has triggered the access attempt, while the wireless terminal 26-5 may stay in the current serving cell and may apply normal cell reselection process. The service request procedure may be started if it is still necessary when the access attempt for is granted by either of the core networks connected to the eLTE eNB, e.g. change on access control information in the system information, or because of a cell change.

Figure 16:
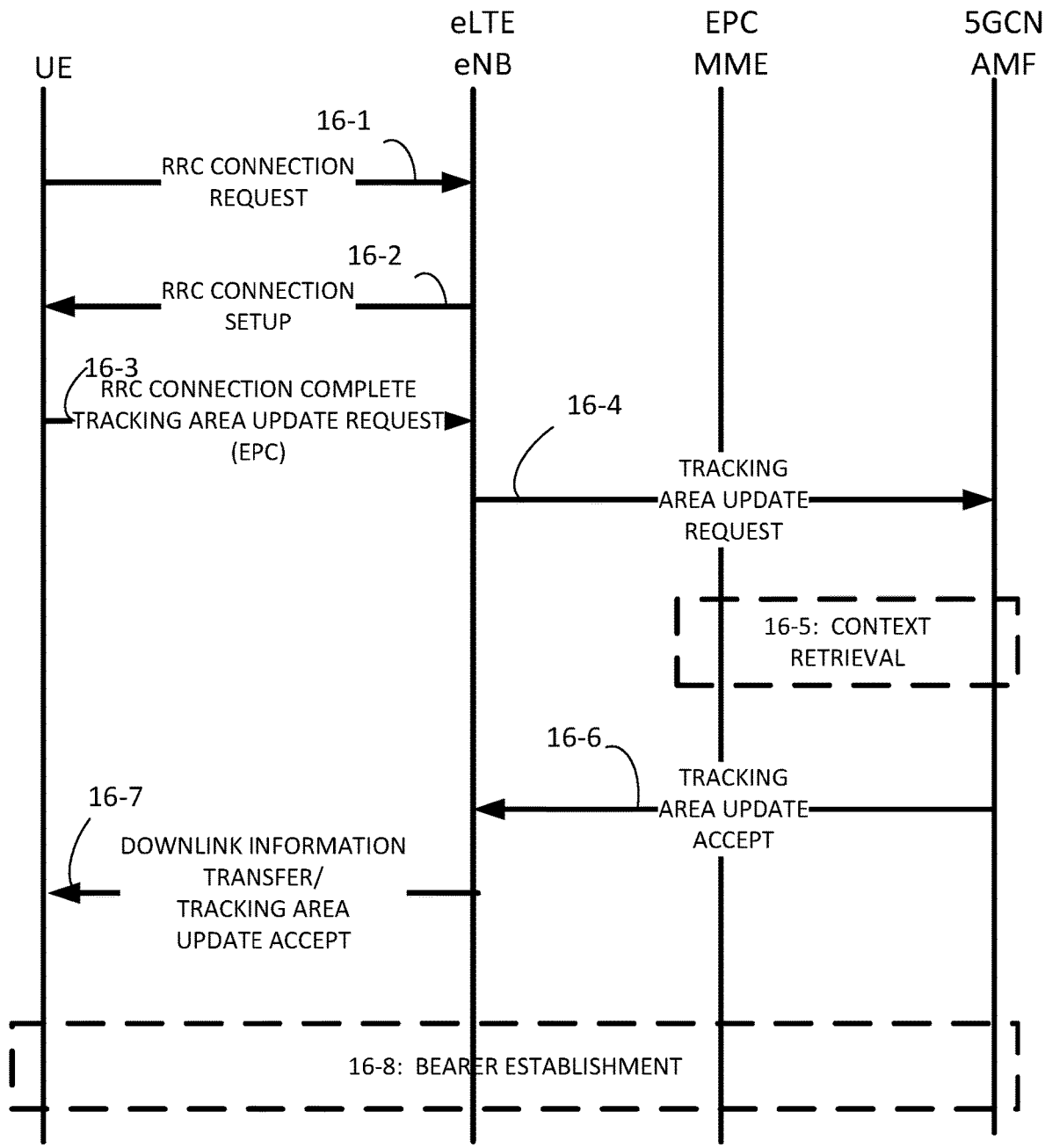
FIG. 16 a diagrammatic view showing example, representative basic acts or steps comprising an example message flow for a wireless terminal to initiate an inter-system mode change procedure to the network after acts of FIG. 15.

FIG. 16 is an example message flow diagram for the wireless terminal 26-5 to initiate the inter-system mode change procedure to the network after act 15-6 of FIG. 15. The acts of FIG. 16 are essentially identical to correspondingly suffixed acts of FIG. 12, except that the Tracking Area Update Request/Accept is addressed to/sent from 5GCN AMF.

Likewise, in the second scenario of the fifth embodiment, the NAS layer of the wireless terminal 26-5 uses Tracking Area Update Request messages to switch the serving core network. In some other configurations, the NAS layer may use a different NAS message, such as Registration Request message or a Service Request message, for example.

Figure 17:
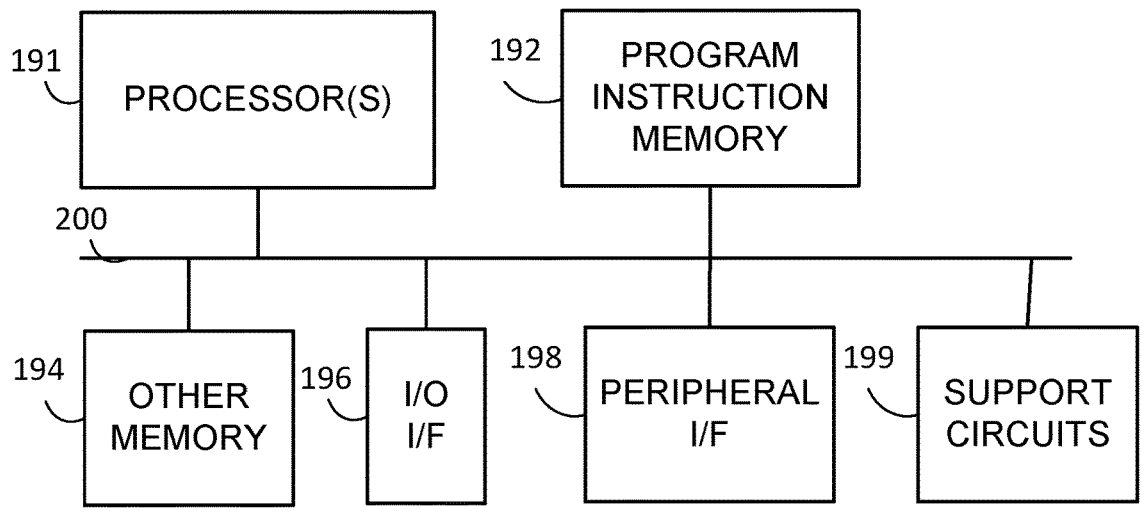
FIG. 17 is a diagrammatic view showing example electronic machinery which may comprise node electronic machinery or terminal electronic machinery.

Certain units and functionalities of access node 22 and wireless terminal 26 of the various foregoing example embodiments and modes are, in example embodiments, implemented by electronic machinery, computer, and/or circuitry. For example, the node processors 30 and terminal processors 40 of the example embodiments herein described and/or encompassed may be comprised by the computer circuitry of FIG. 17. FIG. 17 shows an example of such electronic machinery or circuitry, whether node or terminal, as comprising one or more processor(s) circuits 191, program instruction memory 192; other memory 194 (e.g., RAM, cache, etc.); input/output interfaces 196; peripheral interfaces 198; support circuits 199; and busses 200 for communication between the aforementioned units.

The program instruction memory 192 may comprise coded instructions which, when executed by the processor(s), perform acts including but not limited to those described herein. Thus is understood that each of node processor 30 and terminal processor 40, for example, comprise memory in which non-transient instructions are stored for execution.

The memory 194, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 199 are coupled to the processors 191 for supporting the processor in a conventional manner. These circuits include cache, power supplies, clock circuits, input/output circuitry and subsystems, and the like.

The technology of this application thus encompasses but is not limited to the following example embodiments, example features, and example advantages:

Example Embodiment 1

A wireless terminal comprising:
receiver circuitry and transmitter circuitry configured to communicate across a radio interface with a radio access node and to one or more management entities of core networks via the radio access node;
processor circuitry configured to:
register to a first core network;
receive first access control information and second access control information from a radio access node;
upon an access attempt, determine if the access attempt is allowed for the first core network based on the first access control information;
when the access attempt is barred for the first core network, determine if the access attempt is permitted by a second core network based on the second access control information;
when the access attempt is allowed for the second core network, initiate an inter-system mode change procedure to designate the second core network as a registered network.

Example Embodiment 2

The wireless terminal of Example Embodiment 1, wherein the first and second core networks belong to a same Public Land Mobile Network (PLMN).

Example Embodiment 3

The wireless terminal of Example Embodiment 1, wherein the first and second core networks belong to different Public Land Mobile Networks (PLMNs).

Example Embodiment 4

The wireless terminal of Example Embodiment 1, wherein the wireless terminal is configured to send a non-access stratum (NAS) layer message to the management entity of the second core network upon the inter-system mode change.

Example Embodiment 5

The wireless terminal of Example Embodiment 4, wherein the non-access stratum (NAS) message is Tracking Area Update message.

Example Embodiment 6

The wireless terminal of Example Embodiment 1, wherein the wireless terminal is configured to maintain a registration status for the first core network as the registered network when the access attempt for the second core network is also barred.

Example Embodiment 7

The wireless terminal of Example Embodiment 1, wherein the first core network is an Evolved Packet Core (EPC) network and the second core network is a 5th Generation Core network (5GCN).

Example Embodiment 8

The wireless terminal of Example Embodiment 7, wherein the first core network is a $5^{th}$ Generation Core network (5GCN) and the second core network is an Evolved Packet Core (EPC) network.

Example Embodiment 9

A management entity in a core network comprising:
receiver circuitry and transmitter circuitry configured to communicate to a wireless terminal via at least one radio access node;
processor circuitry configured to:
receive a message from the wireless terminal requesting an inter-system mode change;
switch the registered core network of the wireless terminal to the core network of the management entity Example Embodiment 10

The management entity of Example Embodiment (ME app), wherein the message is received due to the access attempt being barred for another core network.

Example Embodiment 11

The management entity of Example Embodiment (ME app), wherein the message is a non-access stratum (NAS) message.

Example Embodiment 12

The management entity of Example Embodiment (preceding), wherein the non-access stratum (NAS) message is Tracking Area Update Request message.

Example Embodiment 13

The management entity of Example Embodiment (ME app), wherein the core network is an Evolved Packet Core (EPC) network.

Example Embodiment 14

The management entity of Example Embodiment (ME app), wherein the core network is a 5th Generation Core network (5GCN).

Example Embodiment 15

A method in a wireless terminal (UE method) that communicates across a radio interface with radio access node and to one or more management entities of core networks via the radio access node(s), the method comprising:

registering to a first core network;

receiving first access control information and second access control information from radio access nodes;

upon an access attempt, determining if the access attempt is allowed for the first core network based on the first access control information;

when the access attempt is barred for the first core network, determining if the access attempt is permitted for a second core network based on the second access control information;

when the access attempt is allowed for the second core network, initiating an inter-system mode change procedure to designate the second core network as a registered network.

Example Embodiment 16

The method of Example Embodiment (UE method), wherein the first and second core networks belong to a same Public Land Mobile Network (PLMN).

Example Embodiment 17

The method of Example Embodiment (UE method), wherein the first and second core networks belong to different Public Land Mobile Networks (PLMNs).

Example Embodiment 18

The method of Example Embodiment (UE method), wherein comprising sending a non-access stratum (NAS) layer message to the management entity of the second core network upon the inter-system mode change.

Example Embodiment 19

The method of Example Embodiment (preceding), wherein the non-access stratum (NAS) message is Tracking Area Update message.

Example Embodiment 20

The method of Example Embodiment (UE method), wherein comprising maintaining the registration status for the first core network when the access attempt for the second core network is also barred.

Example Embodiment 21

The method of Example Embodiment (UE method), wherein the first core network is an Evolved Packet Core (EPC) network and the second core network is a $5^{th}$ Generation Core network (5GCN).

Example Embodiment 22

The method of Example Embodiment (UE method), wherein the first core network is a 5th Generation Core network (5GCN) and the second core network is an Evolved Packet Core (EPC) network.

Example Embodiment 23

(ME method) A method in a management entity in a core network that communicates to a wireless terminal via at least one radio access node, the method comprising receiving a message from the wireless terminal requesting an inter-system mode change;

switching the registered core network of the wireless terminal to the core network of the management entity.

Example Embodiment 24

The method of Example Embodiment (ME method), wherein the message is received due to the access attempt barred for another core network.

Example Embodiment 25

The method of Example Embodiment (ME method), wherein the message is a non-access stratum (NAS) message.

Example Embodiment 26

The method of Example Embodiment (ME method), wherein the non-access stratum (NAS) message is Tracking Area Update Request message.

Example Embodiment 27

The method of Example Embodiment (ME method), wherein the core network is an Evolved Packet Core (EPC) network.

Example Embodiment 28

The method of Example Embodiment (ME method), wherein the core network is a 5th Generation Core network (5GCN).

Example Embodiment 29

A wireless terminal that communicates across a radio interface with a radio access node(s) and to one or more management entities of core networks via the radio access node(s), the wireless terminal comprising:

receiver circuitry configured to receive, from the radio access node(s), first access control information and separately to receive, from the radio access node(s), second access control information;

processor circuitry configured to:

register to a first core network;

upon an access attempt, determine whether or not the access attempt is allowed for the first core network based on the first access control information;

in a case that the access attempt is barred for the first core network, determine whether or not the access attempt is allowed by a second core network based on the second access control information, and;

in a case that the access attempt is not barred for the second core network, perform an inter-system change procedure to designate the second core network as a registered network by sending a non-access stratum (NAS) layer message to a management entity of the second core network.

Example Embodiment 30

The wireless terminal of Example Embodiment 29, wherein the NAS layer message is Attach message.

Example Embodiment 31

The wireless terminal of Example Embodiment 29, wherein the NAS layer message is Registration message.

Example Embodiment 32

The wireless terminal of Example Embodiment 29, wherein the wireless terminal is configured to maintain a registration status for the first core network as the registered network when the access attempt for the second core network is also barred.

Example Embodiment 33

The wireless terminal of Example Embodiment 29, wherein the first core network is an Evolved Packet Core (EPC) network and the second core network is a 5th Generation Core network (5GCN).

Example Embodiment 34

The wireless terminal of Example Embodiment 29, wherein the first core network is a 5th Generation Core network (5GCN) and the second core network is an Evolved Packet Core (EPC) network.

Example Embodiment 35

A management entity in a core network comprising:
receiver circuitry and transmitter circuitry configured to communicate with a wireless terminal via at least one radio access node;
processor circuitry configured to:
receive a non-access stratum (NAS) layer message from the wireless terminal requesting an inter-system change;
switch the registered core network of the wireless terminal to the core network of the management entity.

Example Embodiment 36

The management entity of Example Embodiment 35, wherein the NAS layer message is received due to the access attempt being barred for another core network.

Example Embodiment 37

The management entity of Example Embodiment 35, wherein the NAS layer message is Attach message.

Example Embodiment 38

The management entity of Example Embodiment 35, wherein the NAS layer message is Registration message.

Example Embodiment 39

The management entity of Example Embodiment 35, wherein the core network is an Evolved Packet Core (EPC) network.

Example Embodiment 40

The management entity of Example Embodiment 35, wherein the core network is a 5th Generation Core network (5GCN).

Example Embodiment 41

A method in a wireless terminal that communicates across a radio interface with a radio access node(s) and to one or more management entities of core networks via the radio access node(s), the method comprising:
registering to a first core network;
receiving first access control information and second access control information from the radio access node(s);
upon an access attempt, determining whether or not the access attempt is allowed for the first core network based on the first access control information;
in a case that the access attempt is barred for the first core network, determining if the access attempt is allowed for a second core network based on the second access control information;
in a case that the access attempt is not barred for the second core network, performing an inter-system change procedure to designate the second core network as a registered network by sending a non-access stratum (NAS) layer message to a management entity of the second core network.

Example Embodiment 42

The method of Example Embodiment 41, wherein the NAS layer message is Attach message.

Example Embodiment 43

The method of Example Embodiment 41, wherein the NAS layer message is Registration message.

Example Embodiment 44

The method of Example Embodiment 41, wherein comprising maintaining the registration status for the first core network when the access attempt for the second core network is also barred.

Example Embodiment 45

The method of Example Embodiment 41, wherein the first core network is an Evolved Packet Core (EPC) network and the second core network is a 5th Generation Core network (5GCN).

Example Embodiment 46

The method of Example Embodiment 41, wherein the first core network is a 5th Generation Core network (5GCN) and the second core network is an Evolved Packet Core (EPC) network.

Example Embodiment 47

A method in a management entity in a core network that communicates to a wireless terminal via at least one radio access node, the method comprising
receiving a non-access stratum (NAS) layer message from the wireless terminal requesting an inter-system change;
switching the registered core network of the wireless terminal to the core network of the management entity.

Example Embodiment 48

The method of Example Embodiment 47, wherein the message is received due to the access attempt barred for another core network.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively when attempting to make access to a network.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless terminal that communicates across a radio interface with at least one radio access node and to one or more management entities of core networks via the radio access node, the wireless terminal comprising:

receiver circuitry configured to receive, from the at least one radio access node, first access control information and separately to receive, from the at least one radio access node, second access control information;

the first access control information comprising one or more access categories and access barring status for each of the access categories, the second access control information comprising one or more access categories and access barring status for each of the access categories, processor circuitry configured to:

register to a first core network;

upon initiating an access attempt associated with an access category, determine whether or not the access attempt is allowed for the first core network based on the access barring status of the access category included in the first access control information;

in a case that the access attempt is barred for the first core network, determine whether or not the access attempt is allowed by a second core network based on the access barring status of the access category included in the second access control information, and;

in a case that the access attempt is allowed for the second core network, perform an inter-system change procedure to designate the second core network as a registered network by sending a non-access stratum (NAS) layer message to a management entity of the second core network.

2. The wireless terminal of claim 1, wherein the NAS layer message is an Attach message.

3. The wireless terminal of claim 1, wherein the NAS layer message is a Registration message.

4. The wireless terminal of claim 1, wherein the wireless terminal is configured to maintain a registration status for the first core network as the registered network when the access attempt for the second core network is also barred.

5. The wireless terminal of claim 1, wherein the first core network is an Evolved Packet Core (EPC) network and the second core network is a $5^{th}$ Generation Core network (5GCN).

6. The wireless terminal of claim 1, wherein the first core network is a $5^{th}$ Generation Core network (5GCN) and the second core network is an Evolved Packet Core (EPC) network.

7. A method in a wireless terminal that communicates across a radio interface with at least one radio access node and to one or more management entities of core networks via the radio access node, the method comprising:
registering to a first core network;
receiving first access control information and second access control information from the at least one radio access node;
the first access control information comprising one or more access categories and access barring status for each of the access categories,
the second access control information comprising one or more access categories and access barring status for each of the access categories,
upon initiating an access attempt associated with an access category, determining whether or not the access attempt is allowed for the first core network based on the access barring status of the access category included in the first access control information;
in a case that the access attempt is barred for the first core network, determining whether or not the access attempt is allowed by a second core network based on the access barring status of the access category included in the second access control information;
in a case that the access attempt is allowed for the second core network, performing an inter-system change procedure to designate the second core network as a registered network by sending a non-access stratum (NAS) layer message to a management entity of the second core network.

8. The method of claim 7, wherein the NAS layer message is an Attach message.

9. The method of claim 7, wherein the NAS layer message is a Registration message.

10. The method of claim 7, wherein comprising maintaining the registration status for the first core network when the access attempt for the second core network is also barred.

11. The method of claim 7, wherein the first core network is an Evolved Packet Core (EPC) network and the second core network is a $5^{th}$ Generation Core network (5GCN).

12. The method of claim 7, wherein the first core network is a $5^{th}$ Generation Core network (5GCN) and the second core network is an Evolved Packet Core (EPC) network.

* * * * *